US011115915B2

(12) United States Patent
Lou et al.

(10) Patent No.: US 11,115,915 B2
(45) Date of Patent: Sep. 7, 2021

(54) NETWORK SELECTION METHOD AND APPARATUS

(71) Applicant: HUAWEI TECHNOLOGIES CO., LTD., Guangdong (CN)

(72) Inventors: Chong Lou, Shanghai (CN); Mingzeng Dai, Shanghai (CN); Rui Wang, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/401,457

(22) Filed: May 2, 2019

(65) Prior Publication Data

US 2019/0261264 A1 Aug. 22, 2019

Related U.S. Application Data

(63) Continuation of application No. PCT/CN2017/109386, filed on Nov. 3, 2017.

(30) Foreign Application Priority Data

Nov. 3, 2016 (CN) .......................... 201610974104.1
Sep. 29, 2017 (CN) .......................... 201710910424.5

(51) Int. Cl.
*H04W 48/18* (2009.01)
*H04W 48/16* (2009.01)
*H04W 84/04* (2009.01)

(52) U.S. Cl.
CPC .......... *H04W 48/18* (2013.01); *H04W 48/16* (2013.01); *H04W 84/042* (2013.01)

(58) Field of Classification Search
None
See application file for complete search history.

(56) References Cited

U.S. PATENT DOCUMENTS

2004/0264435 A1* 12/2004 Chari .................. H04L 45/04
  370/351
2006/0183502 A1* 8/2006 Jeong .................. H04W 8/02
  455/560

(Continued)

FOREIGN PATENT DOCUMENTS

CN 1934891 A 3/2007
CN 1968501 A 5/2007

(Continued)

OTHER PUBLICATIONS

3GPP TR 38.801 V0.4.0 (Aug. 2016);3rd Generation Partnership Project;Technical Specification Group Radio Access Network;Study on New Radio Access Technology;Radio Access Architecture and Interfaces(Release 14);total 36 pages.

(Continued)

*Primary Examiner* — Anh Vu H Ly
(74) *Attorney, Agent, or Firm* — Womble Bond Dickinson (US) LLP

(57) ABSTRACT

A network selection method and an apparatus are provided, so that a core network to be accessed by next-generation UE via an eLTE eNB can be determined. The method includes: a terminal device receives a first message from a radio access network device, wherein the first message carries access reference information, and generates first information based on the access reference information, wherein the first information indicating that the terminal device requests to access a first network, and sends a second message to the radio access network device, wherein the second message carries the first information.

20 Claims, 18 Drawing Sheets

(56) References Cited

U.S. PATENT DOCUMENTS

| | | | | |
|---|---|---|---|---|
| 2012/0315913 | A1* | 12/2012 | Yang | H04W 48/16 |
| | | | | 455/438 |
| 2013/0265954 | A1* | 10/2013 | Dahlen | H04W 48/14 |
| | | | | 370/329 |
| 2014/0023016 | A1* | 1/2014 | Mildh | H04L 5/0037 |
| | | | | 370/329 |
| 2014/0171096 | A1 | 6/2014 | Hwang et al. | |
| 2014/0213258 | A1* | 7/2014 | Dahlen | H04W 8/22 |
| | | | | 455/436 |
| 2014/0357285 | A1* | 12/2014 | Smith | H04W 16/14 |
| | | | | 455/450 |
| 2015/0103804 | A1 | 4/2015 | Gao et al. | |
| 2015/0282048 | A1* | 10/2015 | Zhang | H04W 28/08 |
| | | | | 455/432.3 |
| 2015/0365829 | A1* | 12/2015 | Grayson | H04W 36/0083 |
| | | | | 455/454 |
| 2017/0078910 | A1 | 3/2017 | Li et al. | |
| 2017/0374695 | A1* | 12/2017 | Lau | H04L 65/1053 |
| 2018/0026958 | A1 | 1/2018 | Liu et al. | |
| 2018/0288649 | A1* | 10/2018 | Lee | H04L 47/2475 |
| 2018/0324182 | A1 | 11/2018 | Huang et al. | |
| 2019/0014515 | A1* | 1/2019 | Zee | H04W 48/18 |
| 2019/0037436 | A1* | 1/2019 | Wang | H04W 48/18 |
| 2019/0045351 | A1* | 2/2019 | Zee | H04W 76/16 |
| 2020/0092795 | A1* | 3/2020 | Raval | H04L 63/101 |

FOREIGN PATENT DOCUMENTS

| | | |
|---|---|---|
| CN | 101291525 A | 10/2008 |
| CN | 102118839 A | 7/2011 |
| CN | 103167558 A | 6/2013 |
| CN | 103517264 A | 1/2014 |
| CN | 104160730 A | 11/2014 |
| CN | 104639522 A | 5/2015 |
| CN | 105101311 A | 11/2015 |

OTHER PUBLICATIONS

3GPP TS 36.331 V14.0.0 (Sep. 2016);3rd Generation Partnership Project;Technical Specification Group Radio Access Network;Evolved Universal Terrestrial Radio Access (E-UTRA);Radio Resource Control (RRC);Protocol specification(Release 14);total 644 pages.

3rd Generation Partnership Project; Technical Specification Group Services and System Aspects;Study on Architecture for Next Generation System(Release 14), 3GPP Standard;3GPP TR 23.799,vol. SA WG2,no.v1.1.0,Oct. 31, 2016,pp. 1-503, XP051173181.

Nokia:"Solution to KI 17:PLMN+RAT discovery and selection",3GPP Draft;S2-165870,vol. SA WG2,No. Kaohsiung,Taiwan, 20161017-20161021, Oct. 16, 2016, XP051155450, 5 pages.

3GPP TS 25.304 V13.0.0 (Dec. 2015);3rd Generation Partnership Project;Technical Specification Group Radio Access Network;User Equipment (UE) procedures in idle mode and procedures for cell reselection in connected mode (Release 13);total 58 pages.

3GPP TS 36.304 V14.0.0 (Sep. 2016);3rd Generation Partnership Project;Technical Specification Group Radio Access Network;Evolved Universal Terrestrial Radio Access (E-UTRA); User Equipment (UE) procedures in idle mode (Release 14);total 46 pages.

3GPP TS 36.304 V12.8.0 (Jun. 2016);3rd Generation Partnership Project;Technical Specification Group Radio Access getwork;Evolved Universal Terrestrial Radio Access (E-UTRA); User Equipment (UE) procedures in idle mode (Release 12),Total 38 Pages.

* cited by examiner

NETWORK SELECTION METHOD AND APPARATUS

CROSS-REFERENCE TO RELATED APPLICATIONS

This application is a continuation of International Application No. PCT/CN2017/109386, filed on Nov. 3, 2017, which claims priority to Chinese Patent Application No. 201610974104.1, filed on Nov. 3, 2016, and Chinese Patent Application No. 201710910424.5, filed on Sep. 29, 2017. All of the aforementioned patent applications are incorporated herein by reference in their entireties.

TECHNICAL FIELD

Embodiments of the present invention relate to the field of communications technologies, and in particular, to a network selection method and an apparatus.

BACKGROUND

With development of communications technologies, a Long Term Evolution (LTE for short) system may evolve into an evolved LTE (eLTE for short) system.

In the eLTE system, an evolved packet core (EPC for short) network coexists with a next-generation core (NG Core for short) network in a 4th generation communications technology (4G for short). The EPC network is a 4G core network. It should be noted that the next-generation core network may also be a 5th generation core (5G Core or 5GC for short). An evolved node base station (eNB for short) in the eLTE system is also referred to as an eLTE eNB. The eLTE eNB may access both the EPC network and the NG core network. Correspondingly, user equipment (UE for short) with a function of accessing the NG core network is also referred to as next-generation UE. The next-generation UE may access both the EPC network and the NG core network by using the eLTE eNB.

However, in a scenario in which the next-generation UE accesses a network by using the eLTE eNB, there is currently no method for determining a core network to be accessed by the UE.

SUMMARY

Embodiments of the present invention provide a network selection method and an apparatus, so that a core network to be accessed by next-generation UE by using an eLTE eNB can be determined.

According to a first aspect, a network selection method is provided. A first core network device receives a first message that carries first information and that is sent by a radio access network device, where the first information is used to indicate that a terminal device requests to access a first network to which the first core network device belongs. When the first core network device does not accept access of the terminal device to the first network, the first core network device sends, to the radio access network device, a second message that carries second information, where the second information is used to instruct to connect the terminal device to a second network.

The first information carried in the first message in this embodiment of the present invention is used to indicate that the terminal device requests to access the first network to which the first core network device belongs, and indirectly indicates that the terminal device independently chooses to access the first network. When the first core network device does not accept the access of the terminal device to the first network, the first core network device sends the second message that carries the second information used to instruct to connect the terminal device to the second network, so that a device receiving the second message performs, based on the second information, a procedure for triggering the terminal device to access the second network, thereby completing the access of the terminal device. In other words, in the network selection method provided in this embodiment of the present invention, while the terminal device independently selects a network that is to be accessed by the terminal device, the first core network device also selects a to-be-accessed network for the terminal device. Therefore, selection on a terminal device side and selection on a network side are comprehensively considered, so that a network to be accessed by the terminal device can be accurately determined.

In one embodiment, the first message further carries third information, and the third information is used to indicate that the terminal device requests to access the second network. The first message carries the third information in addition to the first information. Therefore, the first message indirectly indicates that the terminal device requests to access the first network or the second network, in other words, a network to be accessed by the terminal device is not selected on the terminal device side. In this case, the network selection method provided in this embodiment of the present invention is that the first core network device determines, for the terminal device, a network that is to be accessed by the terminal device.

In one embodiment, on the basis that the first message carries the first information and the third information, when the first core network device does not accept the access of the terminal device to the first network, the first core network device may further send, to a second core network device, a third message that carries the third information, where the third information is used to indicate that the terminal device requests to access the second network, and the second core network device belongs to the second network.

It can be learned from the foregoing description that in a scenario in which the first core network device receives the first message that carries the first information and the third information, when the first core network device does not accept the access of the terminal device to the first network, the first core network device may interact with the radio access network device, to connect the terminal device to the second network, or may interact with the second core network device, to notify the second core network device that the terminal device requests to access the second network to which the second core network device belongs.

In a scenario in which the first core network device instructs the radio access network device to connect the terminal device to the second network, the first core network device is connected to the radio access network device, and cannot directly communicate with the second core network device. In a scenario in which the first core network device notifies the second core network device that the terminal device requests to access the second network to which the second core network device belongs, the first core network device is not only connected to the radio access network device, but also connected to the second core network device, and therefore can directly communicate with the second core network device.

In one embodiment, when the first core network device does not accept the access of the terminal device to the first network, the first core network device further determines to connect the terminal device to the second network. In one embodiment, a method for determining, by the first core network device, to connect the terminal device to the second network includes: obtaining, by the first core network device, subscription data of the terminal device, load information of the first network, and load information of the second network, and determining, based on the subscription data of the terminal device, the load information of the first network, and the load information of the second network that are obtained by the first core network device, to connect the terminal device to the second network.

According to a second aspect, a network selection method is provided. After receiving a fourth message that is sent by a terminal device and that carries first information used to indicate that the terminal device requests to access a first network, a radio access network device sends, to a first core network device in the first network, a first message that carries the first information. The radio access network device receives a second message sent by the first core network device, where the second message carries second information, and the second information is used to instruct to connect the terminal device to a second network.

In one embodiment, the fourth message further carries third information, and the third information is used to indicate that the terminal device requests to access the second network.

In one embodiment, in a scenario in which the fourth message carries the first information and the third information, after receiving the fourth message sent by the terminal device, before sending the first message to the first core network device, the radio access network device further preferentially connects the terminal device to the first network.

The fourth message carries the first information and the third information, and therefore the fourth message indirectly indicates that the terminal device requests to access the first network or the second network. In a scenario in which the radio access network device receives the fourth message, the radio access network device may select a to-be-accessed network for the terminal device. In addition, in this scenario, the terminal device only needs to trigger one access procedure to implement network access. Therefore, air interface resource occupancy is relatively low.

In one embodiment, if the fourth message carries only the first information, after receiving the second message sent by the first core network device, the radio access network device further sends, to the terminal device, a fifth message that carries the second information.

In a scenario in which the fourth message carries only the first information, and the radio access network device receives the second message that carries the second information, the radio access network device sends, to the terminal device, a fifth message that carries the second information, so that the terminal device generates the third information based on the second information, and then initiates network access by using the third information.

In one embodiment, if the fourth message carries the first information and the third information, and the first message carries only the first information, after receiving the second message sent by the first core network device, the radio access network device sends, to the second core network device in the second network based on the second information in the second message, a sixth message that carries the third information.

It is easy to understand that if the fourth message carries the first information and the third information, the radio access network device may directly obtain the first information and the third information from the fourth message. After receiving the second message sent by the first core network device, the radio access network device may directly send the third information obtained by the radio access network device to the second core network device, and does not need to further communicate with the terminal device, thereby reducing air interface resource occupancy.

In one embodiment, before the radio access network device receives the fourth message sent by the terminal device, the radio access network device further sends, to the terminal device, a seventh message that carries access reference information, so that the terminal device determines a to-be-accessed network based on the access reference information.

In one embodiment, on the basis that the fourth message carries the first information and the third information, in other words, on the basis that the radio access network device obtains the first information and the third information, the first message sent by the radio access network device to the first core network device further carries the third information. In this case, the third information is used to indicate that the terminal device requests to access the second network.

In a scenario in which the first message sent by the radio access network device to the first core network device carries the first information and the third information, the network selection method provided in this embodiment of the present invention is that the first core network device selects a to-be-accessed network for the terminal device.

According to a third aspect, a network selection method is provided. A terminal device generates first information corresponding to a first network and third information corresponding to a second network, where the first information is used to indicate that the terminal device requests to access the first network, and the third information is used to indicate that the terminal device requests to access the second network. Then the terminal device sends, to a radio access network device, a fourth message that carries the first information and the third information.

In a scenario in which the terminal device can access one of the two networks, the terminal device independently generates the first information corresponding to the first network and the third information corresponding to the second network, and sends, to the radio access network device, the fourth message that carries the first information and the third information, so that the radio access network device determines a to-be-accessed network for the terminal device, and sends information (the first information or the third information) corresponding to the network to a core network device in the network, or the radio access network device sends the first information and the third information to a core network device, and then the core network device determines a to-be-accessed network for the terminal device.

In one embodiment, before the terminal device generates the first information and the third information, the terminal device further receives a seventh message sent by the radio access network device, where the seventh message carries access reference information. After receiving the seventh message, the terminal device generates the first information and the third information based on the access reference information in the seventh message.

According to a fourth aspect, a network selection method is provided. First a terminal device receives a seventh message sent by a radio access network device, where the seventh message carries access reference information. Then the terminal device generates, based on the access reference information in the seventh message, first information used to indicate that the terminal device requests to access a first network. Finally the terminal device sends, to the radio access network device, a fourth message that carries the first information.

The terminal device independently determines a to-be-accessed network based on the access reference information sent by the radio access network device.

In one embodiment, after the terminal device sends the fourth message to the radio access network device, the terminal device receives a fifth message sent by the radio access network device, where the fifth message carries second information used to instruct to connect the terminal device to a second network, and generates, based on the second information, third information used to indicate that the terminal device requests to access the second network. Then the terminal device sends, to the radio access network device, an eighth message that carries the third information.

In a scenario in which the terminal device independently determines to access the first network, a first core network device in the first network may not accept access of the terminal device to the first network. It can be learned from the foregoing description that when the first core network device in this embodiment of the present invention does not accept the access of the terminal device to the first network, the terminal device receives the fifth message that carries the second information, and initiates, based on the second information, a procedure for accessing the second network. Therefore, in the network selection method provided in this embodiment of the present invention, selection on a terminal device side and selection on a network side are comprehensively considered, so that a to-be-accessed network can be accurately determined.

According to a fifth aspect, a core network device is provided, where the core network device includes a receiving unit, a processing unit, and a sending unit.

A function implemented by each unit module provided in this embodiment of the present invention is In one embodiment as follows:

The receiving unit is configured to receive a first message sent by a radio access network device, where the first message carries first information, and the first information is used to indicate that a terminal device requests to access a first network to which a core network device belongs. The processing unit is configured to: after the receiving unit receives the first message, determine whether to accept access of the terminal device to the first network. The sending unit is configured to: when the processing unit does not accept the access of the terminal device to the first network, send a second message to the radio access network device, where the second message carries second information, the second information is used to instruct to connect the terminal device to a second network, and the second network coexists with the first network.

In one embodiment, the first message further carries third information, and the third information is used to indicate that the terminal device requests to access the second network.

In one embodiment, the sending unit is further configured to: when the processing unit does not accept the access of the terminal device to the first network, send a third message to a core network device that belongs to the second network, where the third message carries the third information, and the third information is used to indicate that the terminal device requests to access the second network.

According to a sixth aspect, a core network device is provided, where the core network device includes a transceiver, a processor, and a memory, the transceiver, the processor, and the memory are connected by using a system bus, the memory is configured to store a computer instruction, and the processor is configured to execute the computer instruction stored in the memory, so that the core network device performs the network selection method according to the first aspect and the various implementations of the first aspect.

According to a seventh aspect, a computer-readable storage medium is further provided, where the computer-readable storage medium includes one or more pieces of program code, and when a processor in a core network device executes the program code, the core network device performs the network selection method according to the first aspect and the various possible implementations of the first aspect.

In the embodiments of the present invention, a name of the core network device constitutes no limitation on the device or the functional modules. In actual implementation, the device or the functional modules may have other names. Any device or functional module with a function similar to that in the embodiments of the present invention falls within the scope of the following claims and their equivalent technologies of the embodiments of the present invention.

For detailed descriptions of the fifth aspect, the sixth aspect, the seventh aspect, and the various implementations of the fifth aspect, the sixth aspect, and the seventh aspect in the embodiments of the present invention, refer to the detailed descriptions in the first aspect and the various implementations of the first aspect.

According to an eighth aspect, a radio access network device is provided, where the radio access network device includes a receiving unit and a sending unit.

A function implemented by each unit module provided in this embodiment of the present invention is In one embodiment as follows:

The receiving unit is configured to receive a fourth message sent by a terminal device, where the fourth message carries first information, and the first information is used to indicate that the terminal device requests to access a first network. The sending unit is configured to send a first message to a first core network device, where the first message carries the first information received by the receiving unit, and the first core network device belongs to the first network. The receiving unit is further configured to receive a second message sent by the first core network device, where the second message carries second information, the second information is used to instruct to connect the terminal device to a second network, and the second network coexists with the first network.

In one embodiment, the fourth message further carries third information, and the third information is used to indicate that the terminal device requests to access the second network.

In one embodiment, the radio access network device further includes a processing unit, and the processing unit is configured to: after the receiving unit receives the fourth message, before the sending unit sends the first message, preferentially connect the terminal device to the first network.

In one embodiment, the sending unit is further configured to send a fifth message to the terminal device after the receiving unit receives the second message sent by the first core network device, where the fifth message carries the second information.

In one embodiment, the sending unit is further configured to: after the receiving unit receives the second message sent by the first core network device, send a sixth message to a second core network device based on the second information, where the sixth message carries the third information, and the second core network device belongs to the second network.

In one embodiment, the first message further carries the third information.

In one embodiment, the sending unit is further configured to send a seventh message to the terminal device before the receiving unit receives the fourth message sent by the terminal device, where the seventh message carries access reference information, and the access reference information is used by the terminal device to determine a to-be-accessed network.

According to a ninth aspect, a radio access network device is provided, where the radio access network device includes a transceiver, a processor, and a memory, the transceiver, the processor, and the memory are connected by using a system bus, the memory is configured to store a computer instruction, and the processor is configured to execute the computer instruction stored in the memory, so that the radio access network device performs the network selection method according to the second aspect and the various implementations of the second aspect.

According to a tenth aspect, a computer-readable storage medium is further provided, where the computer-readable storage medium includes one or more pieces of program code, and when a processor in a radio access network device executes the program code, the radio access network device performs the network selection method according to the second aspect and the various possible implementations of the second aspect.

In the embodiments of the present invention, a name of the radio access network device constitutes no limitation on the device or the functional modules. In actual implementation, the device or the functional modules may have other names. Any device or functional module with a function similar to that in the embodiments of the present invention falls within the scope of the following claims and their equivalent technologies of the embodiments of the present invention.

For detailed descriptions of the eighth aspect, the ninth aspect, the tenth aspect, and the various implementations of the eighth aspect, the ninth aspect, and the tenth aspect in the embodiments of the present invention, refer to the detailed descriptions in the second aspect and the various implementations of the second aspect.

According to an eleventh aspect, a terminal device is provided, where the terminal device includes a processing unit and a sending unit.

A function implemented by each unit module provided in this embodiment of the present invention is In one embodiment as follows:

The processing unit is configured to generate first information and third information, where the first information is used to indicate that the terminal device requests to access a first network, and the third information is used to indicate that the terminal device requests to access a second network. The sending unit is configured to send a fourth message to a radio access network device, where the fourth message carries the first information and the third information that are generated by the processing unit.

In one embodiment, the terminal device in this embodiment of the present invention further includes a receiving unit, and the receiving unit is configured to: before the processing unit generates the first information and the third information, receive a seventh message sent by the radio access network device, where the seventh message carries access reference information, and the access reference information is used by the terminal device to determine a to-be-accessed network.

According to a twelfth aspect, a terminal device is provided, where the terminal device includes a receiving unit, a processing unit, and a sending unit.

A function implemented by each unit module provided in this embodiment of the present invention is In one embodiment as follows:

The receiving unit is configured to receive a seventh message sent by a radio access network device, where the seventh message carries access reference information. The processing unit is configured to generate first information based on the access reference information received by the receiving unit, where the first information is used to indicate that the terminal device requests to access a first network. The sending unit is configured to send a fourth message to the radio access network device, where the fourth message carries the first information generated by the processing unit.

In one embodiment, the receiving unit is further configured to: after the sending unit sends the fourth message to the radio access network device, receive a fifth message sent by the radio access network device, where the fifth message carries second information, and the second information is used to instruct to connect the terminal device to a second network. The processing unit is further configured to generate third information based on the second information received by the receiving unit, where the third information is used to indicate that the terminal device requests to access the second network. The sending unit is further configured to send an eighth message to the radio access network device, where the eighth message carries the third information generated by the processing unit.

According to a thirteenth aspect, a terminal device is provided, where the terminal device includes a transceiver, a processor, and a memory, the transceiver, the processor, and the memory are connected by using a system bus, the memory is configured to store a computer instruction, and the processor is configured to execute the computer instruction stored in the memory, so that the terminal device performs the network selection method according to the third aspect, the fourth aspect, and the various implementations of the third aspect and the fourth aspect.

According to a fourteenth aspect, a computer-readable storage medium is further provided, where the computer-readable storage medium includes one or more pieces of program code, and when a processor in a terminal device executes the program code, the terminal device performs the network selection method according to the third aspect, the fourth aspect, and the various possible implementations of the third aspect and the fourth aspect.

In the embodiments of the present invention, a name of the terminal device constitutes no limitation on the device or the functional modules. In actual implementation, the device or the functional modules may have other names. Any device or functional module with a function similar to that in the embodiments of the present invention falls within the scope of the following claims and their equivalent technologies of the embodiments of the present invention.

For detailed descriptions of the eleventh aspect, the twelfth aspect, the thirteenth aspect, the fourteenth aspect, and the various implementations of the eleventh aspect, the twelfth aspect, the thirteenth aspect, and the fourteenth aspect in the embodiments of the present invention, refer to the detailed descriptions in the third aspect, the fourth aspect, and the various implementations of the third aspect and the fourth aspect.

In one embodiment, the first core network device in the embodiments of the present invention is a network device in a 5th generation communications technology (5G for short) network. The first core network device may be a device with a network selection function (NSF for short), or may be a device with a network selection function and a control plane function other than the NSF. This is not In one embodiment limited in the embodiments of the present invention. It should be noted that in this specification, a core network entity that is in a 5GC and that is connected to an eLTE eNodeB is also referred to as an access and mobility management function (AMF for short).

If the first core network device in the embodiments of the present invention is a device with only an NSF, a device with another control plane function also exists in the first network.

The first network and the second network in the embodiments of the present invention coexist, and the first network and the second network are different.

These aspects or other aspects in the embodiments of the present invention are clearer and more comprehensible in the following descriptions.

DESCRIPTION OF EMBODIMENTS

The following describes the technical solutions in the embodiments of the present invention in detail with reference to the accompanying drawings in the embodiments of the present invention.

In the specification, claims, and accompanying drawings of the present invention, the terms "first", "second", "third", "fourth", and the like are intended to distinguish between different objects but do not indicate a particular order.

The term "and/or" in the embodiments of the present invention describes only an association relationship for describing associated objects and indicates that three relationships may exist. For example, A and/or B may represent the following three cases: Only A exists, both A and B exist, and only B exists.

In the embodiments of the present invention, the word such as "example" or "for example" is used to represent giving an example, an illustration, or a description. Any embodiment or design scheme described as an "example" or "for example" in the embodiments of the present invention should not be explained as being more preferred or having more advantages than another embodiment or design scheme. Exactly, use of the word such as "example" or "for example" is intended to present a concept in a specific manner.

Figure 1:
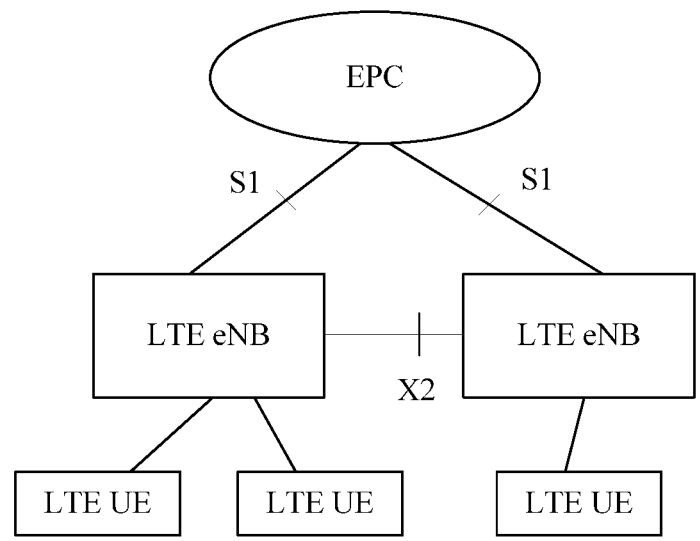
FIG. 1 is a schematic structural diagram of an existing LTE system.

In a current 4G network, each eNB (referred to as an LTE eNB in the embodiments of the present invention) in an LTE system accesses an EPC network by using an S1 interface, and different LTE eNBs are connected by using an X2 interface. Each LTE eNB is connected to at least one UE (referred to as LTE UE in the embodiments of the present invention) in the LTE system. FIG. 1 shows a network architecture of the LTE system. In actual application, a connection between the foregoing plurality of devices is a wireless connection. A solid line is used for illustration in FIG. 1 to conveniently and intuitively represent a connection relationship between devices.

With continuous development of mobile communications technologies, the 4G network gradually evolves into a 5th generation communications technology (5G for short) network. In the evolution process, the LTE system may evolve into an eLTE system.

Figure 2:
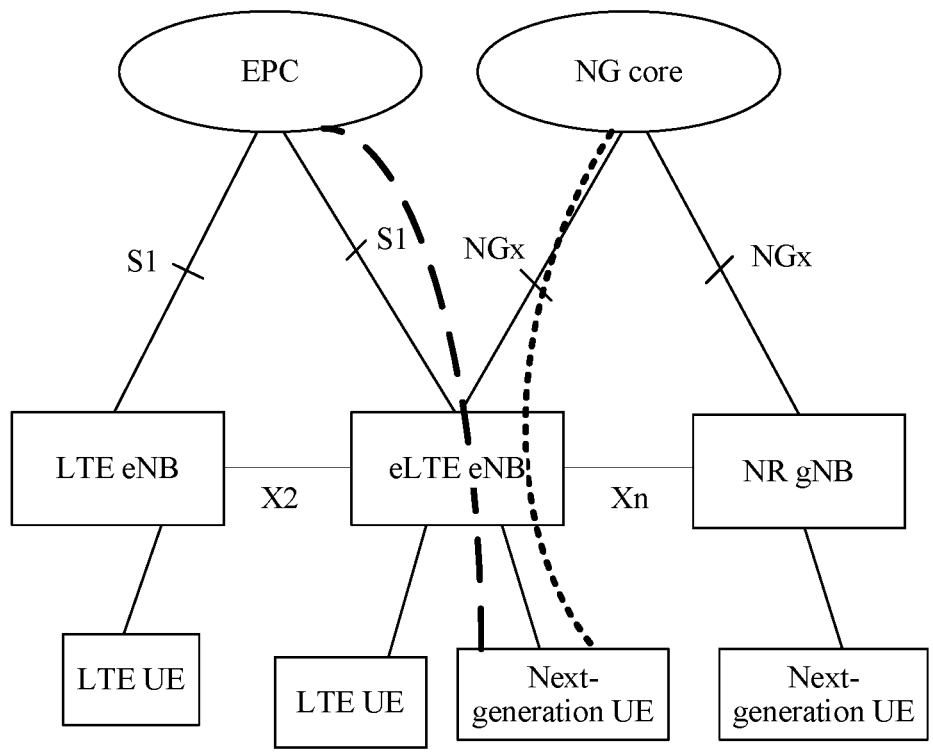
FIG. 2 is a schematic structural diagram of an eLTE system according to an embodiment of the present invention.

In the eLTE system, an EPC network coexists with an NG core network. An eLTE eNB may access both the EPC network and the NG core network. Next-generation UE wirelessly connected to the eLTE eNB may access both the EPC network and the NG core network by using the eLTE eNB. As shown in FIG. 2, the eLTE eNB may access the EPC network by using an S1 interface, and may also access the NG core network by using another corresponding interface (denoted by NGx in FIG. 2). The next-generation UE connected to the eLTE eNB may access both the EPC network and the NG core network by using the eLTE eNB. LTE UE connected to the eLTE eNB may access the EPC network by using an LTE eNB. In FIG. 2, an NR gNB is used to indicate a base station that accesses only the NG core network. The LTE eNB and the eLTE eNB are connected by using an X2 interface, and the eLTE eNB and the NR gNB are connected by using an Xn interface. Likewise, in actual application, a connection between the foregoing plurality of devices is a wireless connection. A solid line is used for illustration in FIG. 2 to conveniently and intuitively represent a connection relationship between devices.

However, in a scenario in which the next-generation UE wirelessly connected to the eLTE eNB accesses a network, there is currently no method for selecting a to-be-accessed network for the UE.

For this problem, the embodiments of the present invention provide a network selection method. Selection on a user equipment side and selection on a network side are comprehensively considered, so that a network to be accessed by the next-generation UE can be determined for the UE.

The network selection method provided in the embodiments of the present invention is applicable to the eLTE system shown in FIG. 2. With reference to FIG. 2, a radio access network device in the embodiments of the present invention may be an eLTE eNB, and a terminal device may be next-generation UE.

Figure 3:
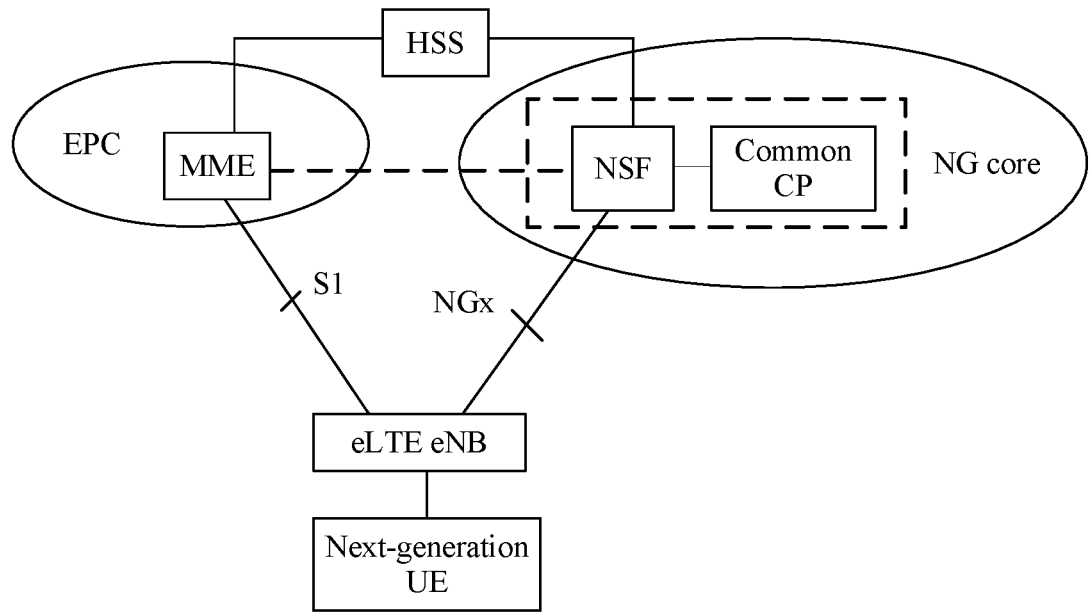
FIG. 3 is a schematic structural diagram 1 of composition of a device in an eLTE system according to an embodiment of the present invention.

With reference to FIG. 2, FIG. 3 shows a composition structure of the eLTE eNB and another device in the eLTE system.

A mobility management entity (MME for short) in FIG. 3 is a network device in the EPC network. The MME is connected to the eLTE eNB by using an S1 interface, and is further connected to a home subscriber server (HSS for short). A network device in the NG core network includes a device only with an NSF (the NSF is used to represent the device in the embodiments of the present invention) and a device with a control plane function other than the NSF (a common CP is used to represent the device in the embodiments of the present invention), or includes a device with an NSF function and a control plane function other than the NSF. In other words, the NSF and the common CP in FIG. 3 may be integrated into a same device, or may be independently disposed. Therefore, a dashed line box is used for representation in FIG. 3. If the NSF and the common CP are independently disposed, the NSF is connected to the eLTE eNB by using an NGx interface, and is further separately connected to the common CP and the HSS. In one embodiment, the NSF may be further connected to the MME. The HSS stores a database, and the database stores information about user equipment in the EPC network and the NG core network.

Figure 4:
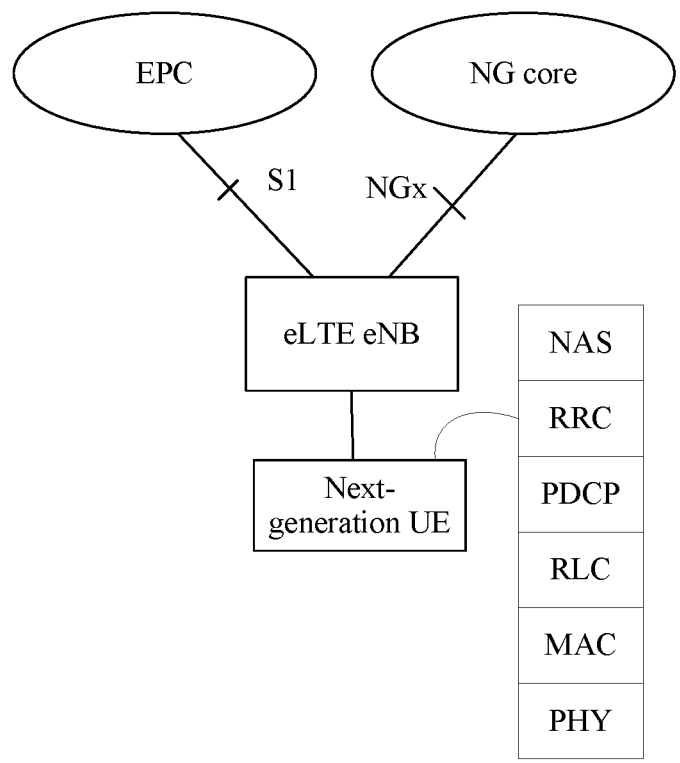
FIG. 4 is a schematic structural diagram 2 of composition of a device in an eLTE system according to an embodiment of the present invention.

With reference to FIG. 2, FIG. 4 shows a protocol stack of the next-generation UE in the embodiments of the present invention. As shown in FIG. 4, the protocol stack includes a physical layer (PHY layer for short), a Media Access Control (MAC for short) layer, a Radio Link Control (RLC for short) layer, a Packet Data Convergence Protocol (PDCP for short) layer, a radio resource control (RRC for short) layer, and a non-access stratum (NAS for short).

In one embodiment, with reference to FIG. 4, as shown in FIG. 5(a), the NAS stratum of the next-generation UE in the embodiments of the present invention may be considered to include an LTE NAS stratum corresponding to the LTE system and an eLTE NAS stratum corresponding to the eLTE system. The LTE NAS stratum may generate a NAS message used to access the EPC network, and the eLTE NAS stratum may generate a NAS message used to access the NG core network. For the LTE system and the eLTE system, the PHY layer, the MAC layer, the RLC layer, the PDCP layer, and the RRC layer are shared.

With reference to FIG. 4, as shown in FIG. 5(b), the NAS stratum of the next-generation UE in the embodiments of the present invention may be considered to include an LTE NAS stratum corresponding to the LTE system and an eLTE NAS stratum corresponding to the eLTE system. The RRC layer may be considered to include an LTE RRC layer corresponding to the LTE system and an eLTE RRC layer corresponding to the eLTE system. The LTE RRC layer may process an RRC message corresponding to the LTE system, and the eLTE RRC layer may process an RRC message corresponding to the eLTE system. For the LTE system and the eLTE system, the PHY layer, the MAC layer, the RLC layer, and the PDCP layer are shared.

In one embodiment, with reference to FIG. 4, as shown in FIG. 5(c), a control plane protocol stack of the next-generation UE in the embodiments of the present invention may include a NAS stratum and an AS stratum, and the NAS stratum may include one or more NAS functional modules such as a first NAS, a second NAS, and a third NAS. The first NAS is configured to transmit non-radio signaling (non-radio signaling) between the UE and a first core network. A procedure supported by the first NAS includes at least any one or any combination of the following: authentication (authentication), security mode control (Security mode control), mobility support, session management (session management), registration (registration)/attach (attach), de-registration (de-registration)/detach (detach), a location update, a tracking area update (, TAU for short), a service request, paging, first network bearer (bearer)/session (session) context activation/modification/deactivation, and the like. The second NAS is configured to transmit non-radio signaling (non-radio signaling) between the UE and a second core network. A procedure supported by the second NAS includes at least any one or any combination of the following: authentication (authentication), security mode control (Security mode control), mobility support, session management (session management), registration (registration)/attach (attach), de-registration (de-registration)/detach (detach), a location update, a tracking area update (TAU for short), a service request, paging, second network bearer (bearer)/session (session) context activation/modification/deactivation, and the like. A function of the third NAS is mainly performed on idle-state UE. A procedure supported by the third NAS includes at least any one or any combination of the following: public land mobile network (PLMN for short) selection, radio access technology (RAT for short) selection, core network (CN for short) selection, cell selection/reselection, closed subscriber group (CSG for short) selection, location registration, and the like. For example, a first network may be an evolved packet system (EPS for short), and correspondingly, the first core network is the EPC; and a second network may be a 5G system, and correspondingly, the second core network is the 5GC; or vice versa. It should be noted that the NAS functional modules are obtained through division based on only a logical function. Two or more NAS functional modules may be combined into one NAS functional module, or one of the NASs may be deployed on each of the other two or more NAS modules. This is not limited during actual deployment or software and hardware implementation. If all or some of functions of the first NAS are deployed together with the second NAS module or the third NAS module, information exchange between two NASs (for example, the first NAS and the second NAS/the third NAS) described in this specification is internal implementation of the NAS module, and may be omitted or considered to be not exposed to the outside. The AS stratum includes but is not limited to at least one of the following protocol stacks: a physical layer (PHY layer for short), a Media Access Control (MAC for short) layer, a Radio Link Control (RLC for short) layer, a Packet Data Convergence Protocol (PDCP) layer, and a radio resource control (RRC for short) layer. The AS stratum may communicate with one or more NAS modules in the NAS stratum. A function of the AS stratum may include but is not limited to at least one of the following: measurement, synchronization, receiving and processing of system information, sending of all or a part of information in received system information to a NAS stratum (for assistance in a function of the NAS stratum, where the NAS stratum herein may be the first NAS, the second NAS, or the third NAS), and the like. For example, the AS stratum is an AS stratum in LTE, and includes at least one of the following protocol stacks: an LTE RRC layer, an NR PDCP layer, an LTE PDCP layer, an LTE RLC layer, an LTE MAC layer, and an LTE PHY layer.

Figure 5:
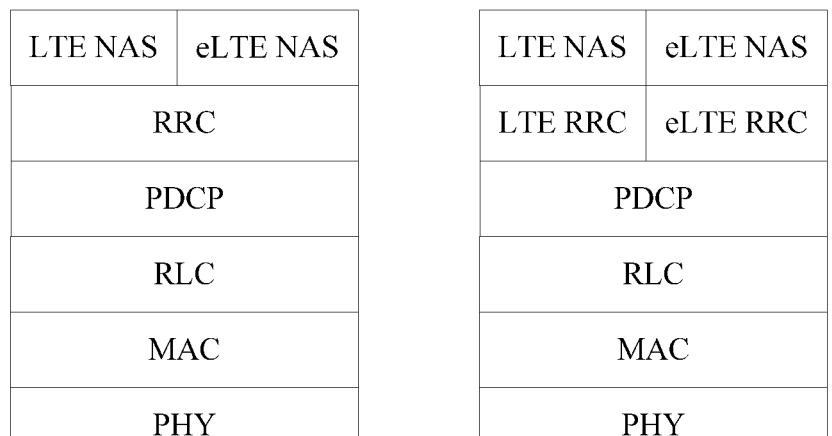
FIG. 5 is a schematic structural diagram of a protocol stack of next-generation UE according to an embodiment of the present invention.

In addition to the protocol stacks shown in FIG. 5(*a*), FIG. 5(*b*), and FIG. 5(*c*), in the protocol stack of the next-generation UE in the embodiments of the present invention, for the LTE system and the eLTE system, only the PHY layer, the MAC layer, and the RLC layer may be shared, or only the PHY layer and the MAC layer may be shared, or only the PHY layer may be shared, or no protocol layer may be shared. Details are not described herein.

The next-generation UE in the embodiments of the present invention may be a mobile phone, a tablet computer, a notebook computer, an ultra-mobile personal computer (UMPC for short), a netbook, a personal digital assistant (PDA for short), or the like.

Figure 6:
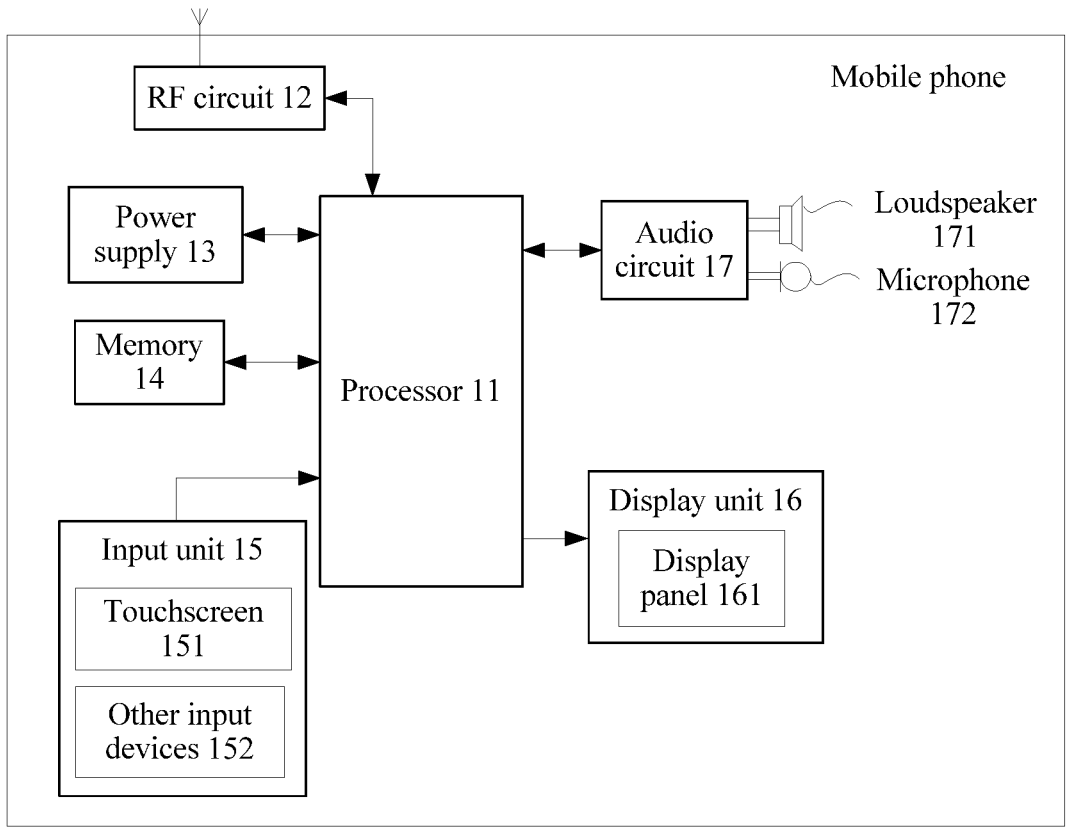
FIG. 6 is a schematic structural diagram of hardware of a mobile phone according to an embodiment of the present invention.

For example, in the embodiments of the present invention, the next-generation UE shown in FIG. 2 or FIG. 3 may be a mobile phone. The following describes each component of the mobile phone in the embodiments of the present invention in detail with reference to FIG. 6. As shown in FIG. 6, the mobile phone includes components such as a processor 11, a radio frequency (RF for short) circuit 12, a power supply 13, a memory 14, an input unit 15, a display unit 16, and an audio circuit 17. A person skilled in the art may understand that a structure of the mobile phone shown in FIG. 6 does not constitute a limitation to a mobile phone, and the mobile phone may include more or fewer components than the components shown in FIG. 6, or may include a combination of some of the components shown in FIG. 6, or may include components disposed differently from the components shown in FIG. 6.

The processor 11 is a control center of the mobile phone, connects various parts of the entire mobile phone by using various interfaces and lines, and performs various functions of the mobile phone and data processing by running or executing a software program and/or a module stored in the memory 14 and by invoking data stored in the memory 14, to perform overall monitoring on the mobile phone. In one embodiment, the processor 11 may include one or more processing units. Preferably, an application processor and a modem processor may be integrated into the processor 11. The application processor mainly processes an operating system, a user interface, an application program, and the like, and the modem processor mainly processes wireless communication. It may be understood that alternatively, the modem processor may not be integrated into the processor 11.

The RF circuit 12 may be configured to: receive and send information, or receive and send a signal in a call process; particularly, after receiving downlink information from a base station, send the downlink information to the processor 11 for processing; and send uplink data to the base station. Generally, the RF circuit includes but is not limited to an antenna, at least one amplifier, a transceiver, a coupler, a low noise amplifier (LNA for short), a duplexer, and the like. In addition, the RF circuit 12 may further communicate with a network and another device through wireless communication. The wireless communication may use any communication standard or protocol, including but not limited to Global System for Mobile Communications (GSM for short), general packet radio service (GPRS for short), Code Division Multiple Access (CDMA for short), Wideband Code Division Multiple Access (WCDMA for short), LTE, email, short message service (SMS for short), and the like.

The mobile phone includes the power supply 13 (such as a battery) that supplies power to each component. In one embodiment, the power supply may be logically connected to the processor 11 by using a power management system, so as to implement functions such as charging and discharging management and power consumption management by using the power management system.

The memory 14 may be configured to store a software program and a module. The processor 11 executes various functional applications of the mobile phone and data processing by running the software program and the module that are stored in the memory 14. The memory 14 may mainly include a program storage area and a data storage area. The program storage area may store an operating system, an application program required by at least one function (such as a sound play function or an image play function), and the like. The data storage area may store data (such as audio data, image data, or an address book) created based on use of the mobile phone, and the like. In addition, the memory 14 may include a high-speed random access memory, and may further include a nonvolatile memory, for example, at least one magnetic disk storage device, a flash memory device, or another volatile solid-state storage device.

The input unit 15 may be configured to: receive entered digit or character information, and generate key signal input related to user setting and function control of the mobile phone. In one embodiment, the input unit 15 may include a touchscreen 151 and other input devices 152. The touchscreen 151, also referred to as a touch panel, may collect a touch operation performed by a user on or near the touchscreen 151 (such as an operation performed by the user on or near the touchscreen 151 by using any proper object or accessory, such as a finger or a stylus), and drive a corresponding connection apparatus based on a preset program. In one embodiment, the touchscreen 151 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 11, and can receive and execute a command sent by the processor 11. In addition, the touchscreen 151 may be implemented by using a plurality of types such as a resistive type, a capacitive type, an infrared ray, and a surface acoustic wave. The other input devices 152 may include but are not limited to any one or more of a physical keyboard, a function key (such as a volume control key or an on/off key), a trackball, a mouse, a joystick, and the like.

The display unit 16 may be configured to display information entered by the user or information provided for the user, and various menus of the mobile phone. The display unit 16 may include a display panel 161. In one embodiment, the display panel 161 may be configured by using a liquid crystal display (LCD for short), an organic light-emitting diode (OLED for short), or the like. Further, the touchscreen 151 may cover the display panel 161. After detecting a touch operation on or near the touchscreen 151, the touchscreen 151 transmits the touch operation to the processor 11 to determine a type of a touch event, and then the processor 11 provides corresponding visual output on the display panel 161 based on the type of the touch event. Although the touchscreen 151 and the display panel 161 in FIG. 6 are used as two independent components to implement input and output functions of the mobile phone, in some embodiments, the touchscreen 151 and the display panel 161 may be integrated to implement the input and output functions of the mobile phone.

The audio circuit 17, a loudspeaker 171, and a microphone 172 are configured to provide an audio interface between the user and the mobile phone. The audio circuit 17 may convert received audio data into an electrical signal, and then transmit the electrical signal to the loudspeaker 171. The loudspeaker 171 converts the electrical signal into a sound signal for output. In addition, the microphone 172 converts a collected sound signal into an electrical signal, and the audio circuit 17 converts the electrical signal into audio data after receiving the electrical signal, and then outputs the audio data to the RF circuit 12 to send to, for example, another mobile phone, or outputs the audio data to the memory 14 for further processing.

In one embodiment, the mobile phone may further include various sensors (such as a gyroscope sensor, a hygrometer sensor, an infrared sensor, or a magnetometer sensor), a Wireless Fidelity (Wi-Fi for short) module, a Bluetooth module, and the like. The sensors are not shown in FIG. 6.

Figure 7:
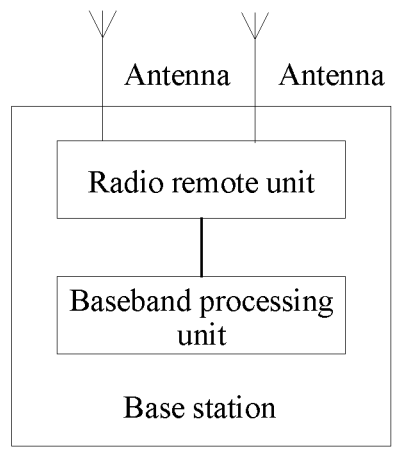
FIG. 7 is a schematic structural diagram of hardware of a base station according to an embodiment of the present invention.

In the embodiments of the present invention, hardware structures of the LTE eNB and the eLTE eNB shown in FIG. 2 are similar. For example, for the hardware structures of the LTE eNB and the eLTE eNB shown in FIG. 2, refer to components of a base station shown in FIG. 7. As shown in FIG. 7, the base station includes a baseband processing unit (English: Baseband Unit, BBU for short), a radio remote unit (RRU for short), and an antenna. The BBU and the RRU may be connected by using an optical fiber, and the RRU is further connected to the antenna by using a coaxial cable and a power splitter (coupler). One BBU may be usually connected to a plurality of RRUs.

The RRU may include four modules: a digital intermediate frequency module, a transceiver module, a power amplifier module, and a filter module. The digital intermediate frequency module is configured to perform optical transmission modulation and demodulation, digital up- and down-frequency conversion, digital-to-analog conversion, and the like. The transceiver module completes conversion from an intermediate frequency signal to a radio frequency signal. After being amplified by the power amplifier module and filtered by the filter module, the radio frequency signal is transmitted by using the antenna.

The BBU is configured to complete baseband processing functions (encoding, multiplexing, modulation, spread spectrum, and the like) of a Uu interface (namely, an interface between UE and the base station), an interface function of a logical interface between a radio network controller (RNC for short) and the base station, a signaling processing function, local and remote operation and maintenance functions, operating status monitoring and alarm information reporting functions of a base station system, and the like.

For a protocol stack of the eLTE eNB in the embodiments of the present invention, refer to the protocol stack of the next-generation UE, and details are not described herein again.

The embodiments of the present invention are intended to resolve a problem of how to determine, for next-generation UE when the next-generation UE accesses a network by using an eLTE eNB, a network that is to be accessed by the UE. Therefore, the solutions described in the embodiments of the present invention are mainly performed for the next-generation UE and the eLTE eNB. For ease of description, in subsequent parts of the embodiments of the present invention, UE is used to represent the next-generation UE, and a base station is used to represent the eLTE eNB.

Figure 8:
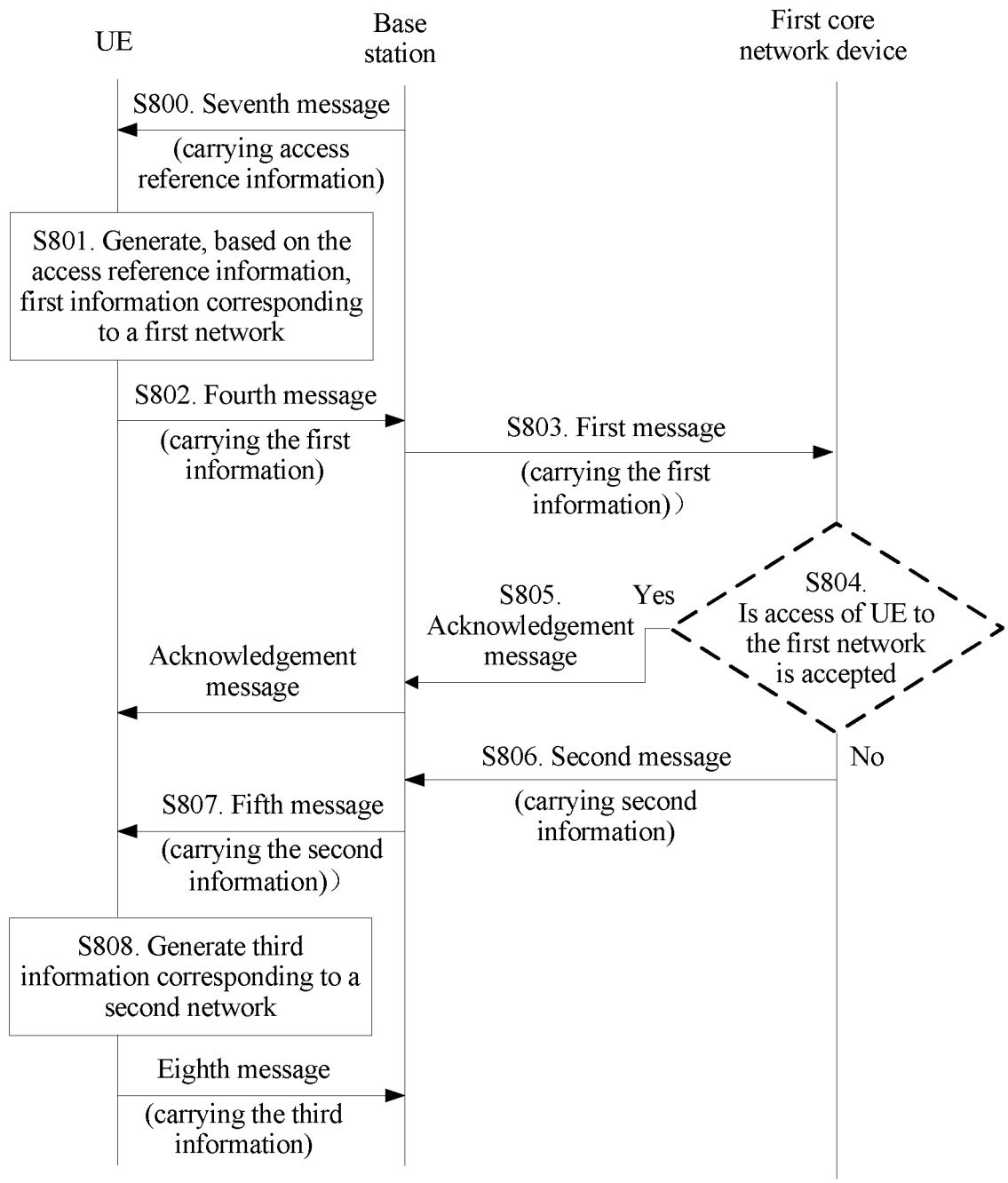
FIG. 8 is a schematic flowchart 1 of a network selection method according to an embodiment of the present invention.

It can be learned from FIG. 3 that the NSF and the common CP in the embodiments of the present invention may be independently disposed, or may be integrated into a same device. For ease of understanding, in the embodiments, an example in which the NSF and the common CP are integrated into a same device is used for description. FIG. 8 is a schematic flowchart of a network selection method according to an embodiment of the present invention. The method may be applied to the eLTE system shown in FIG. 2 or FIG. 3.

Referring to FIG. 8, the network selection method includes the following operations.

Operation S800. A base station sends, to UE, a seventh message that carries access reference information.

The access reference information includes at least one of cell barred information, radio access network (RAN for short) information, base station information, core network information, core network load information, core network service support capability information, and information about a slice type supported by a core network.

The radio access network information may be new radio (NR for short), LTE, eLTE, or the like. The core network information may be an EPC network or an NG core network. With reference to FIG. 2, the base station may be an LTE eNB, an eLTE eNB, or an NR gNB.

In one embodiment, the base station sends the seventh message in a broadcast manner. In this case, the seventh message may be system information (system information). The access reference information in this embodiment of the present invention may be carried in the system information in a form of a field, or may be carried in the system information in another form, and this is not In one embodiment limited in this embodiment of the present invention.

Operation S801. The UE generates, based on the access reference information, first information corresponding to a first network.

After receiving the seventh message, the UE determines a to-be-accessed network based on the access reference information. An example in which the UE determines, based on the access reference information, that the to-be-accessed network is the first network is used for description in this embodiment of the present invention.

In one embodiment, the UE determines, based on the access reference information, that the to-be-accessed network is the first network, and generates the first information corresponding to the first network. The first information is used to indicate that the UE requests to access the first network.

The first information is a NAS packet, and the first network is the EPC network or the NG core network.

For example, the NAS packet includes a NAS protocol data unit (NAS PDU for short) and a header.

In one embodiment, in this embodiment of the present invention, the header of the NAS packet carries information used to indicate a slice type/information used to indicate a core network type.

In one embodiment, the first information in this embodiment of the present invention may further carry information used to indicate a UE type. With reference to FIG. 2 or FIG. 3, the information is used to indicate that the user equipment is LTE UE or next-generation UE.

In one embodiment, if the first network is the NG core network described above, the first information may further carry a RAT identifier. The RAT identifier is used to indicate a type of the base station that communicates with the UE. With reference to FIG. 2, the RAT identifier herein is used to indicate that the base station is an eLTE eNB or an NR gNB. If the RAT identifier is used to indicate that the base station is an eLTE eNB, the to-be-accessed network is selected for the UE by using the network selection method provided in this embodiment of the present invention.

For example, if the first network is the NG core network, and load of the EPC network is far greater than load of the NG core network in the access reference information, the UE in this embodiment of the present invention determines that the to-be-accessed network is the NG core network, and generates first information corresponding to the NG core network.

Based on the example, In one embodiment, with reference to FIG. 5(a), a method for determining, by the UE, that the to-be-accessed network is the NG core network, and generating the first information corresponding to the NG core network is as follows: When being powered on, the UE automatically selects the to-be-accessed network, for example, the NG core network. Correspondingly, an eLTE NAS stratum triggers an RRC layer to obtain the seventh message. The RRC layer obtains the seventh message by using a lower-layer protocol layer of the RRC layer, and determines, based on the access reference information (for example, load of the EPC network is far greater than load of the NG core network) in the seventh message, to connect the UE to the NG core network. The RRC layer instructs the eLTE NAS stratum to connect the UE to the NG core network. The eLTE NAS stratum generates a NAS message corresponding to the NG core network, in other words, generates the first information.

In one embodiment, with reference to FIG. 5(a), a method for determining, by the UE, that the to-be-accessed network is the NG core network, and generating the first information corresponding to the NG core network is as follows: When being powered on, the UE automatically selects the to-be-accessed network, for example, the NG core network. Correspondingly, an eLTE NAS stratum triggers an RRC layer to obtain the seventh message. The RRC layer obtains the seventh message by using a lower-layer protocol layer of the RRC layer. The RRC layer transmits the access reference information (for example, load of the EPC network is far greater than load of the NG core network) in the seventh message upward to the eLTE NAS stratum. The eLTE NAS stratum determines, based on the access reference information, to connect the UE to the NG core network, and generates a NAS message corresponding to the NG core network, in other words, generates the first information.

In one embodiment, with reference to FIG. 5(a), a method for determining, by the UE, that the to-be-accessed network is the NG core network, and generating the first information corresponding to the NG core network is as follows: When being powered on, the UE automatically selects the to-be-accessed network, for example, the EPC network. Correspondingly, an LTE NAS stratum triggers an RRC layer to obtain the seventh message. The RRC layer obtains the seventh message by using a lower-layer protocol layer of the RRC layer, and determines, based on the access reference information (for example, load of the EPC network is far greater than load of the NG core network) in the seventh message, to connect the UE to the NG core network. Correspondingly, an eLTE NAS stratum generates a NAS message corresponding to the NG core network, in other words, generates the first information.

In one embodiment, with reference to FIG. 5(a), a method for determining, by the UE, that the to-be-accessed network is the NG core network, and generating the first information corresponding to the NG core network is as follows: When being powered on, the UE automatically selects the to-be-accessed network, for example, the EPC network. Correspondingly, an LTE NAS stratum triggers an RRC layer to obtain the seventh message. The RRC layer obtains the seventh message by using a lower-layer protocol layer of the RRC layer, and transmits the access reference information (for example, load of the EPC network is far greater than load of the NG core network) in the seventh message upward to an eLTE NAS stratum. The eLTE NAS stratum determines, based on the access reference information, to connect the UE to the NG core network. Correspondingly, the eLTE NAS stratum generates a NAS message corresponding to the NG core network, in other words, generates the first information.

In one embodiment, with reference to FIG. 5(a), if the first network is the NG core network, and a second network is the EPC network, a method for receiving, by the UE, the seventh message that carries the access reference information and that is sent by the base station, and generating the first information and third information based on the access reference information is as follows: When being powered on, the UE selects the NG core network and the EPC network as to-be-accessed networks. Correspondingly, both an eLTE NAS stratum and an LTE NAS stratum trigger an RRC layer to obtain the seventh message. The RRC layer obtains the seventh message by using a lower-layer protocol layer of the RRC layer, and determines, based on the access reference information (for example, load of the EPC network is far greater than load of the NG core network) in the seventh message, that the UE can access the NG core network and cannot access the EPC network. The RRC layer instructs the eLTE NAS stratum to connect the UE to the NG core network, and instructs the LTE NAS stratum not to connect the UE to the EPC network. The eLTE NAS stratum generates a NAS message corresponding to the NG core network, in other words, generates the first information.

If the first network is the EPC network, a method for determining, by the UE, that the to-be-accessed network is the EPC network, and generating first information corresponding to the EPC network is similar to the method for determining, by the UE, that the to-be-accessed network is the NG core network, and generating the first information corresponding to the NG core network. Details are not described herein again.

Operation S802. The UE sends, to the base station, a fourth message that carries the first information.

The fourth message is a radio resource control (RRC for short) message.

In one embodiment, after generating the first information corresponding to the first network, the UE carries a first information into the fourth message and sends the fourth message to the base station. Sending, by the UE, the fourth message to the base station is the same as making, by UE, a request for accessing a network to a base station in the prior art. Details are not described herein.

In one embodiment, the fourth message in this embodiment of the present invention may further carry the information used to indicate the UE type. With reference to FIG. 2 or FIG. 3, the information is used to indicate that the user equipment sending the fourth message is LTE UE or next-generation UE. If the information is used to indicate that the device sending the fourth message is LTE UE, the eLTE eNB may determine, based on the information, to connect the LTE UE to the EPC network. If the information is used to indicate that the device sending the fourth message is next-generation UE, the eLTE eNB selects a to-be-accessed network for the next-generation UE by using the network selection method provided in this embodiment of the present invention.

In one embodiment, the fourth message in this embodiment of the present invention may further carry a UE identifier.

Operation S803. The base station sends a first message to a first core network device.

The first core network device belongs to the first network, the first message carries the first information, and the first information is used to indicate that the UE requests to access the first network.

In one embodiment, after receiving the fourth message sent by the UE, the base station parses the fourth message, determines, based on the first information, to communicate with the first core network device, and sends, to the first core network device, the first message that carries the first information used to indicate that the UE requests to access the first network.

In one embodiment, the first message in this embodiment of the present invention may further carry the UE identifier and/or information used to indicate the first network corresponding to the first information.

In one embodiment, based on the foregoing description, if the first network is the NG core network, and the first information does not carry the RAT identifier, the first message in this embodiment of the present invention may further carry the RAT identifier.

Operation S804. The first core network device determines whether to accept access of the UE to the first network.

In one embodiment, after receiving the first message sent by the base station, the first core network device determines whether to accept the access of the UE to the first network. S804 is an optional operation, and therefore is represented by a dashed line in FIG. 8.

Operation S805. When the first core network device accepts the access of the UE to the first network, the first core network device sends an acknowledgement message to the base station, so as to enter a corresponding access procedure.

In one embodiment, when the first core network device accepts the access of the UE to the first network, the first core network device sends the acknowledgement message to the base station, so that the base station sends an acknowledgement message to the UE, to complete the access. For an access procedure in this scenario, refer to a procedure for accessing a network by UE in the prior art, and details are not described herein.

The acknowledgement message in this embodiment of the present invention may include an OK character, or may include an acknowledgement (ACK for short) character. This is not specifically limited in this embodiment of the present invention.

Operation S806. When the first core network device does not accept the access of the UE to the first network, the first core network device sends a second message to the base station.

The second message carries second information, and the second information is used to instruct to connect the UE to the second network.

In one embodiment, when the first core network device does not accept the access of the UE to the first network, the first core network device obtains and analyzes information such as subscription data of the UE, load information of the first network, and load information of the second network, to determine to connect the UE to the second network.

After determining to connect the UE to the second network, the first core network device sends the second message to the base station in response to the first message. The second message carries the second information used to instruct to connect the UE to the second network. In this case, after receiving the second message, the base station may perform, based on the second information, a corresponding procedure for connecting the UE to the second network.

Operation S807. The base station sends, to the UE, a fifth message that carries second information.

Operation S808. The UE generates, based on the second information, third information corresponding to a second network, and sends, to the base station, an eighth message that carries the third information.

The third information is used to indicate that the UE requests to access the second network.

For a procedure for requesting, by the UE, to access the second network, refer to a procedure for accessing a network by UE in the prior art, and details are not described herein.

The first core network device in this embodiment of the present invention may be a mobility management entity (MME for short) in a 4G network, or may be a core network device in a 5G network, for example, a device into which the NSF and the common CP shown in FIG. 3 are integrated. This is not specifically limited in this embodiment of the present invention. In actual application, deployment of the 4G network is relatively complete. Therefore, in this embodiment of the present invention, preferably, the first core network device is a core network device in the 5G network.

The first information carried in the first message in this embodiment of the present invention is used to indicate that the UE requests to access the first network to which the first core network device belongs, and indirectly indicates that the UE independently chooses to access the first network. When the first core network device does not accept the access of the UE to the first network, the first core network device sends the second message that carries the second information used to instruct to connect the UE to the second network, so that a device receiving the second message performs, based on the second information, a procedure for triggering the UE to access the second network, thereby completing the access of the UE. In other words, in the network selection method provided in this embodiment of the present invention, while the UE independently selects a network that is to be accessed by the UE, the first core network device also selects a to-be-accessed network for the UE. Therefore, selection on a UE side and selection on a network side are comprehensively considered, so that a network to be accessed by the UE can be accurately determined.

Based on the protocol stack architecture of the next-generation UE in FIG. 5(c), a specific implementation of operations S800 to S802 in the embodiment shown in FIG. 8 may be as follows:

Operation S800. A base station sends, to UE, a seventh message that carries access reference information.

The access reference information includes at least one of cell barred (cell Barred) information, radio access network (RAN for short) information, base station information, core network information, core network load information, core network service support capability information, and information about a slice type supported by a core network.

The cell barred (cell barred) information is used to indicate whether the UE is allowed to select/reselect the cell. If the information is set to barred, it indicates that the UE is not allowed to select/reselect the cell. The radio access network information may be new radio (NR for short), LTE, eLTE, or the like. With reference to FIG. 2, the base station may be an LTE eNB, an eLTE eNB, or an NR gNB. The core network information includes any one or any combination of the following information: an EPC network, a 5GC network, and an EPC network and a 5GC network. It should be noted that the core network information may be understood as core network type information supported by the cell, or may be understood as information about a core network type (referred to as core network type preference indication information for distinguishing) that the cell recommends the UE to access, or may be understood as including both the core network type information supported by the cell and the core network type preference indication information. The core network type preference indication information is used to indicate a core network type preferentially selected for a user equipment that who has a capability of accessing two or more core networks. For example, the core network type preference indication information may be the EPC or the 5GC. A specific manner in which the UE interprets a meaning of the core network information may be specified in a protocol specification, or may be indicated by the base station (for example, indicated in system information). This is not limited in this specification. In addition, one cell may provide a plurality of sets of core network information. For example, each PLMN corresponds to one set of core network information. If the core network type preference indication information is mentioned below, it indicates that the core network information included in the access reference information includes the core network type preference indication information. For example, if the core network information is the 5GC, and the EPC and the 5GC, the UE may interpret that the cell supports an EPC connection and a 5GC connection, but recommends the UE to access the 5GC. For another example, if the core network information is the 5GC, the UE may interpret that the cell supports only a 5GC connection. For another example, if the core network information is the 5GC, the UE may interpret that the core network type preference indication information of the cell is the 5GC.

In one embodiment, the base station sends the seventh message in a broadcast manner. In this case, the seventh message may be system information.

In one embodiment, the cell barred (cell barred) information may correspond to a core network type. For example, the cell barred (cell barred) information includes cell barred (cell barred) information corresponding to the EPC and cell barred (cell barred) information corresponding to the 5GC. For example, cell barred information included in system information in the prior art may be used as cell barred (cell barred) information corresponding to an EPC, and is used by UE whose target core network type is the EPC to determine a cell status. Based on the system information in the prior art, new cell barred (cell barred) information is extended, and is used by UE whose target core network type is the 5GC to determine a cell status. It may be understood that a purpose of camping on or accessing a cell by the UE is to accept a network service. Therefore, a meaning of the target core network type may be a core network type that the UE chooses to access. For example, the UE whose target core network type is the 5GC means that a purpose of selecting/reselecting the cell by the UE is to accept a 5GC service by using the cell. Similarly, the UE whose target core network type is the EPC means that a purpose of selecting/reselecting the cell by the UE is to accept an EPC service by using the cell. Alternatively, when the UE does not determine a selected core network type (selected CN type) in this case, but needs to evaluate whether the UE can access a core network in the cell, it may be considered that the to-be-evaluated core network type is a target core network type.

It should be noted that in this specification, it is assumed that an understanding of "camping" in the prior art does not change, in other words, after the UE camps on a cell, it indicates that the UE has selected the cell, and listens to system information and (in most cases) receives paging from a core network. In this case, the UE has selected a to-be-accessed core network, and a NAS corresponding to the selected core network has started to work. If a meaning of camping in a 5G network or a future network changes, it may be understood that the meaning of camping in the prior art is used as a reference for a meaning of camping in this specification.

For example, the core network information may be included in a PLMN list in system information. However, to avoid affecting reading a PLMN list in system information by UE in the prior art (for example, legacy UE, UE that can access only an EPC, or UE before Release 15), the core network information may be included in the PLMN list in the following two manners:

Manner 1: Based on existing system information X (for example, SystemInformationBlockType(X)), a new system information version Y (for example, SystemInformationBlockType(X)-v(Y)) is extended, where the new system information version Y includes at least any one or any combination of the following information: a new PLMN list (for example, plmn-IdentityList-r15), and cell barred information corresponding to the 5GC. The cell barred information corresponding to the 5GC is used to indicate whether UE that is to access the 5GC (or that has accessed the 5GC) is allowed to select/reselect the cell. If the information is set to barred, it indicates that UE whose target core network type is the 5GC is not allowed to select/reselect the cell. The PLMN list includes at least one of the following information: PLMN identification information, a core network type supported by each PLMN, and information of cell reserved for operator use. The information of cell reserved for operator use may be applied to all UEs in the cell, or may be separately set for UEs whose target core network types are different. For example, the information of cell reserved for operator use includes indication information used by UE whose target core network type is the EPC to determine whether the cell is reserved and/or indication information used by UE whose target core network type is the 5GC to determine whether the cell is reserved. In one embodiment, the PLMN list may be included in an information element (for example, cellAccessRelatedInfo-5GC) of cell access information corresponding to the 5GC. In one embodiment, when evolved UE (for example, the evolved UE may include any one or more of the following UEs: UE that has only a capability of accessing the 5GC, UE that has both the capability of accessing the 5GC and a capability of accessing the EPC (namely, the next-generation UE mentioned above), and UE that has only the capability of accessing the EPC) reads the system information (for example, the UE needs to read the system information to obtain the PLMN identification information in a PLMN selection process and/or a cell selection (reselection) process), the UE ignores a PLMN list in the system information in the prior art, and only needs to obtain the new PLMN list. A reason why the evolved UE that has only the capability of accessing the EPC also obtains only the new PLMN list is that in the prior art, the system information carries a PLMN list, and the PLMN list cannot be empty. However, when none of PLMNs in a cell supports access to the EPC, any valid PLMN identification information should not be included in the PLMN list in the prior art. Otherwise, PLMN selection/reselection of the UE fails. For example, a valid PLMN identifier value is placed in the PLMN list. In a possible case, the UE considers that the cell provides the PLMN, and selects the PLMN during PLMN selection. However, when the UE attempts to camp on the cell or access a core network by using the cell, there may be an exception such as a case in which the UE cannot camp on the cell or access of the UE is rejected when the cell actually does not support the PLMN. In a worse case, because the UE does not know that a reason why the exception occurs is that the cell actually does not support the PLMN, the UE may frequently select/reselect the PLMN, and therefore the exception frequently occurs, and the UE cannot normally receive a network service. In addition, if PLMNs supported by all cells in an area (for example, a same tracking area) in which the UE is located are the same, and core network types provided by each PLMN in different cells are also the same, the exception also frequently occurs if the UE always attempts to reselect the PLMN (for example, a priority of the PLMN in a PLMN list of the UE is relatively high) when the UE moves between cells. In one embodiment, the information element of the cell access information corresponding to the 5GC and/or the new PLMN list may be defined as an optional information element. Core network types supported by a plurality of PLMNs in a cell may be the same or different. When the core network types are different, a core network type supported by each PLMN may be accurately represented by using a PLMN list. When the core network types are the same, in one special case, none of the PLMNs supports access to the 5GC, and the UE should consider that the cell is unable to provide a 5GC connection. In another special case, none of the PLMNs supports access to the EPC, and the UE should consider that the cell is unable to provide an EPC connection. When none of the PLMNs in the cell supports access to the 5GC, information provided in the new PLMN list is the same as that in a list of PLMNs providing an EPC connection in the prior art. To reduce signaling overheads, system information may not carry a new PLMN list. In this case, the evolved UE may read a PLMN list in system information in the prior art. When none of the PLMNs in the cell supports access to the EPC, information provided in the new PLMN list does not include a list of PLMNs providing an EPC connection. In this case, the evolved UE may learn that the cell does not support an EPC connection, and the UE that has only the capability of accessing the EPC does not camp on the cell. Therefore, the information element of the cell access information related to the 5GC may be defined as optional. When none of the PLMNs in the cell provides a 5GC connection, the information element does not appear in the system information, and the UE that has the capability of accessing the 5GC cannot obtain the information element, and considers that the UE cannot access the 5GC by using the cell. Alternatively, the PLMN list may be defined as optional. When the information element does not appear in the system information, the UE that has the capability of accessing the 5GC cannot obtain the information element, and considers that the UE cannot access the 5GC by using the cell. The information element of the cell access information related to the 5GC and/or the PLMN list are or is defined as optional, so that when reading the system information to obtain an available (available) PLMN, the UE can determine that no PLMN that can provide the 5GC exists in the cell.

For example:

```
SystemInformationBlockType(X)-v(Y)-IEs ::=        SEQUENCE {
    cellAccessRelatedInfo-5GC                     SEQUENCE {
        cellBarred-5GC                            ENUMERATED {barred,
notBarred}—cell barred information corresponding to the 5GC
        plmn-IdentityList-r15                     PLMN-IdentityList-r15
OPTIONAL—new PLMN List
    }
OPTIONAL,
        nonCriticalExtension                      SEQUENCE { }
    OPTIONAL
}
    PLMN-IdentityList-r15::=  SEQUENCE  (SIZE  (1..maxPLMN))  OF
PLMN-IdentityInfo-r15
    PLMN-IdentityInfo-r15 ::=                     SEQUENCE {
        plmn-Identity                             PLMN-Identity—PLMN
```

```
identification information
        supportedCNType                                          ENUMERATED
{EPC, 5GC, both} OPTIONAL—supported core network information
        cnTypePreference                                         ENUMERATED
{EPC, 5GC} OPTIONAL—core network type preference indication information
        cellReservedForOperatorUse                    ENUMERATED {reserved,
notReserved}—information of cell reserved for operator use
        }
```

Manner 2: Based on existing system information X (for example, SystemInformationBlockType(X)), a new system information version Y (for example, SystemInformationBlockType(X)-v(Y)) is extended, where the new system information version Y includes at least any one or any combination of the following information: a new PLMN list (for example, plmn-IdentityList-r15), and cell barred information corresponding to the 5GC. The cell barred information corresponding to the 5GC is used to indicate whether UE that is to access the 5GC (or that has accessed the 5GC) is allowed to select/reselect the cell. If the information is set to barred, it indicates that UE whose target CN is the 5GC is not allowed to select/reselect the cell. The PLMN list includes at least one of the following information: PLMN identification information and information of cell reserved for operator use. The PLMN identification information is used to indicate a PLMN that provides a 5GC connection in the cell. In one embodiment, the PLMN list may be included in an information element (for example, cellAccessRelatedInfo-5GC) of cell access information corresponding to the 5GC. In one embodiment, when UE that has a capability of accessing the 5GC (which may include two types of UEs: UE that has only the capability of accessing the 5GC, and UE that has both the capability of accessing the 5GC and a capability of accessing the EPC (namely, the next-generation UE mentioned above)) reads system information (for example, the UE needs to read the system information to obtain the PLMN identification information in a PLMN selection process and/or a cell selection (reselection) process), when the UE only needs to learn identification information of a PLMN that supports a 5GC connection, the UE ignores a PLMN list included in system information in the prior art, and only obtains the new PLMN list; or when the UE needs to learn all PLMN identification information of the cell and/or a core network type supported by a corresponding PLMN, the UE not only reads a PLMN list included in system information in the prior art and considers that a PLMN included in the PLMN list supports an EPC connection, but also obtains the new PLMN list, considers that a PLMN included in the new PLMN list supports a 5GC connection, and considers that a PLMN included in the two PLMN lists supports both an EPC connection and a 5GC connection. In one embodiment, the information element of the cell access information corresponding to the 5GC and/or the new PLMN list may be defined as an optional information element. Core network types supported by a plurality of PLMNs in a cell may be the same or different. When the core network types are different, a core network type supported by each PLMN may be accurately represented by using a PLMN list. When the core network types are the same, when none of the PLMNs supports access to the 5GC, the UE should consider that the cell is unable to provide a 5GC connection. In the prior art, system information carries a PLMN list, and the PLMN list cannot be empty. However, when none of PLMNs in a cell supports access to the 5GC, any valid PLMN identification information should not be included in the new PLMN list. Otherwise, PLMN selection/reselection of the UE fails. For example, a valid PLMN identifier value is placed in the new PLMN list. In a possible case, the UE considers that the cell provides the PLMN, and selects the PLMN during PLMN selection. However, when the UE attempts to camp on the cell or access a core network by using the cell, there may be an exception such as a case in which the UE cannot camp on the cell or access of the UE is rejected when the cell actually does not support the PLMN. In a worse case, because the UE does not know that a reason why the exception occurs is that the cell actually does not support the PLMN, the UE may frequently select/reselect the PLMN, and therefore the exception frequently occurs, and the UE cannot normally receive a network service. In addition, if PLMNs supported by all cells in an area (for example, a same tracking area) in which the UE is located are the same, and core network types provided by each PLMN in different cells are also the same, the exception also frequently occurs if the UE always attempts to select the PLMN (which may occur because the UE considers that a priority of the PLMN is relatively high) when the UE moves between cells. Therefore, the information element of the cell access information corresponding to the 5GC may be defined as optional. When none of the PLMNs in the cell provides a 5GC connection, the information element does not appear in the system information, and the UE that has the capability of accessing the 5GC cannot obtain the information element, and considers that the UE cannot access the 5GC by using the cell. Alternatively, the new PLMN list may be defined as optional. When the information element does not appear in the system information, the UE that has the capability of accessing the 5GC cannot obtain the information element, and considers that the UE cannot access the 5GC by using the cell. The information element of the cell access information corresponding to the 5GC and/or the new PLMN list are or is defined as optional, so that when reading the system information to obtain an available (available) PLMN, the UE can determine that no PLMN that can provide the 5GC exists in the cell. In addition, a PLMN selection/reselection failure of the UE that is caused because a PLMN list cannot be empty in the prior art is avoided.

For example:

```
SystemInformationBlockType(X)-v(Y)-IEs ::=         SEQUENCE {
        cellAccessRelatedInfo-5GC                           SEQUENCE {
            cellBarred-5GC                              ENUMERATED {barred,
notBarred}—cell barred information corresponding to the 5GC
```

```
        plmn-IdentityList-r15            PLMN-IdentityList-r15
OPTIONAL—new PLMN List
            }
OPTIONAL,
        nonCriticalExtension             SEQUENCE { }
    OPTIONAL
        }
        PLMN-IdentityList-r15::=  SEQUENCE  (SIZE  (1..maxPLMN-r11))  OF
PLMN-IdentityInfo-r15
        PLMN-IdentityInfo-r15 ::=        SEQUENCE {
            plmn-Identity                    PLMN-Identity—PLMN
identification information
            cellReservedForOperatorUse       ENUMERATED {reserved,
notReserved}—information of cell reserved for operator use
        }
```

It should be added and noted that to support a 5GC connection, original LTE system information needs to be extended, to carry information related to the 5GC connection, for example, the foregoing new PLMN list. In this case, extended system information may include one bit (for example, a value tag bit), and the bit is used as a system information change indication related to the 5GC connection, and is used to indicate that the system information part related to the 5GC connection is changed, so that idle-state UE whose target core network type is the 5GC (or idle-state UE whose operating NAS is a 5GC NAS) re-reads the system information. The bit does not trigger UE whose operating NAS is an EPC NAS to re-read the system information. The change of the information related to the 5GC connection does not affect idle-state UE whose target core network type is the EPC (or UE whose operating NAS is an EPC NAS). If the value tag in the original system information is still used, the UE that accesses the EPC also needs to re-read the system information, causing unnecessary battery consumption. The system information change indication related to the 5GC connection is introduced to avoid the foregoing problem.

In addition, it should be added that the following problem is described in Manner 1: In the prior art, system information carries a PLMN list, and the PLMN list cannot be empty. However, when none of PLMNs in a cell supports access to the EPC, any valid PLMN identification information should not be included in the PLMN list in the prior art. Otherwise, PLMN selection/reselection of the UE fails. For example, a valid PLMN identifier value is placed in the PLMN list. In a possible case, the UE considers that the cell provides the PLMN, and selects the PLMN during PLMN selection. However, when the UE attempts to camp on the cell or access the EPC by using the cell, there may be an exception such as a case in which the UE cannot camp on the cell or access of the UE is rejected when the cell actually does not support the PLMN. In a worse case, because the UE does not know that a reason why the exception occurs is that the cell actually does not support the PLMN, the UE may frequently select/reselect the PLMN, and therefore the exception frequently occurs, and the UE cannot normally receive a network service. In addition, if PLMNs supported by all cells in an area (for example, a same tracking area) in which the UE is located are the same, and core network types provided by each PLMN in different cells are also the same, the exception may also frequently occur if the UE always attempts to select the PLMN (because the UE considers that a priority of the PLMN is relatively high) when the UE moves between cells. The extension of the new PLMN list on the basis of the existing system information in Manner 1 can resolve a problem only for the evolved UE in the scenario. UE in the prior art (for example, legacy UE or UE before Release 15) can read only a PLMN list in system information in the prior art. Therefore, a problem for the UE in the prior art in the scenario can be resolved by using the following method: A special value (for example, a maximum value or a minimum value) is selected from a PLMN identifier value range in the prior art, and the special value is set as a first PLMN identifier reservation value. When the PLMN list in the prior art includes only the first PLMN identifier reservation value, it indicates that no PLMN that supports an EPC connection exists in the cell. It is readily associative that the value may also be used in a new PLMN list. Because a case does not occur in which a plurality of PLMNs in a cell supports neither an EPC connection nor a 5GC connection, the new PLMN list in Manner 1 cannot be empty. For Manner 2, what is different from the solution provided in Manner 2 is that if a new PLMN list is also mandatory and cannot be empty, a special value (for example, a maximum value or a minimum value) may be selected from an existing PLMN identifier value range, and the special value may be set as a second PLMN identifier reservation value. When the new PLMN list includes only the second PLMN identifier reservation value, it indicates that no PLMN that supports a 5GC connection exists in the cell. Because a case cannot occur in which both the PLMN list in the prior art and the new PLMN list are empty, the first PLMN identifier reservation value and the second PLMN identifier reservation value may be the same, or certainly may be different. In the foregoing method, a problem of a PLMN selection failure that is caused because an existing PLMN list cannot be empty when a plurality of PLMNs in a cell supports only a 5GC connection for legacy UE can be resolved. Different from the method in Manner 2 that the new PLMN list is set to be optional, the method in which the new PLMN list includes the second PLMN identifier reservation value resolves a similar PLMN selection failure problem for UE that is allowed to access the 5GC.

Operation S801. The UE generates, based on the access reference information, first information corresponding to a first network.

After receiving the seventh message, the UE determines a to-be-accessed network based on the access reference information. An example in which the UE determines, based on the access reference information, that the to-be-accessed network is the first network is used for description in this embodiment of the present invention.

In one embodiment, the UE determines, based on the access reference information, that the to-be-accessed network is the first network, and generates the first information corresponding to the first network. The first information is used to indicate that the UE requests to access the first network.

The first information is a NAS message, and the first network is the EPC network or the NG core network.

Optionally, in this embodiment of the present invention, a header of the NAS message carries information used to indicate a slice type/information used to indicate a core network type.

Optionally, the first information in this embodiment of the present invention may further carry information used to indicate a UE type. With reference to FIG. 2 or FIG. 3, the information is used to indicate that the user equipment is LTE UE or next-generation UE.

In one embodiment, if the first network is the 5GC network described above, the first information may further carry a RAT identifier. The RAT identifier is used to indicate a type of the base station that communicates with the UE. With reference to FIG. 2, the RAT identifier herein is used to indicate that the base station is an eLTE eNB or an NR gNB. If the RAT identifier is used to indicate that the base station is an eLTE eNB, the to-be-accessed network is selected for the UE by using the network selection method provided in this embodiment of the present invention.

In one embodiment, a NAS stratum of the UE determines that the network to be accessed by the UE is the first network. An idea for selection is that an AS stratum of the UE sends the core network information included in the access reference information to the NAS stratum, to assist the NAS stratum in selecting a core network type, the NAS determines that the network to be accessed by the UE is the first network, and notifies the AS stratum of the result, and the AS stratum camps on a cell that provides the first network and/or accesses the first network. Further optionally, the NAS stratum of the UE notifies the AS stratum that a network that can be accessed by the UE includes the first network and/or a second network.

Based on the UE protocol stack described in FIG. 5(c), the following In one embodiment describes three optional solutions of a process in which the UE determines the to-be-accessed network based on the access reference information, and generates the first information corresponding to the to-be-accessed network. Solution 1 and Solution 2 focus on a method for selecting an initial core network by the UE, for example, in a scenario in which the UE is initially powered on, a cell selection scenario, or a scenario in which the UE moves to coverage again after moving out of the coverage. Solution 3 focuses on a method for reselecting a core network by the UE, for example, in a cell reselection scenario or a TAU scenario. It may be understood that the foregoing scenarios are for UE in a non-connected state, for example, idle-state UE and a third state (inactive-state) UE.

Figure 22:
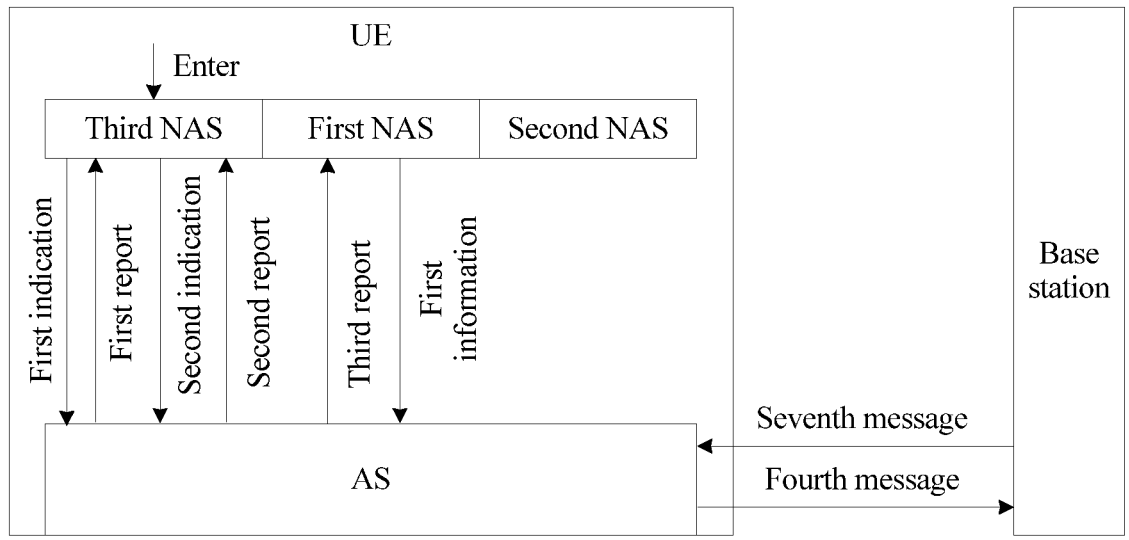
FIG. 22(a) is a flowchart of information exchange according to an embodiment of the present invention.
FIG. 22(b) is a flowchart of information exchange according to an embodiment of the present invention.
Figure 22:
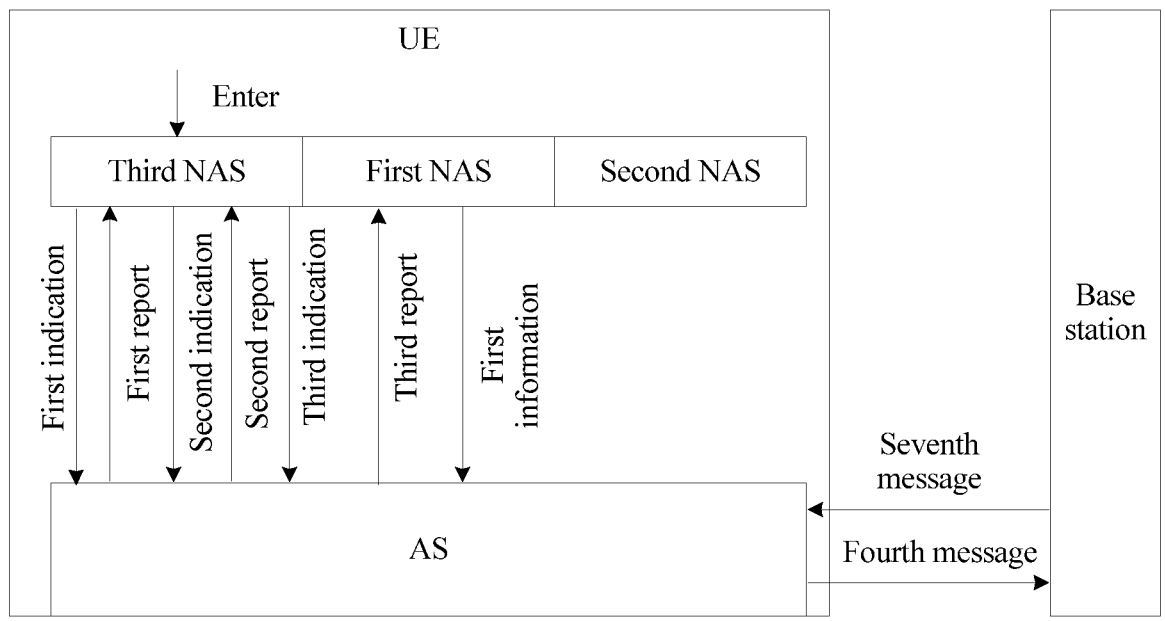

FIG. 22 is a flowchart of information exchange according to an embodiment of the present invention. Specifically, (a) provides an information exchange procedure of Solution 1.

(1) Enter a third NAS. In one embodiment, the action of entering the third NAS may be triggered by any one or any combination of the following reasons: UE finds no suitable cell (no suitable cell) when being powered on; a response "the PLMN is not allowed" is received during location registration; a response "the service is not allowed" is received during registration/attach; a response "the service is not allowed" is received during a tracking area update (tracking area update, TAU for short); a response "the service is not allowed" is received during a service request; a SIM card is inserted; the UE moves out of coverage of a selected PLMN (selected PLMN); the UE moves out of coverage of a selected core network (selected CN); the UE moves out of coverage of a selected core network corresponding to a selected PLMN; the UE moves out of coverage of a selected PLMN corresponding to a selected core network; the UE moves out of coverage of all accessible core network types corresponding to a selected PLMN; the UE moves out of a TA (tracking area) in a TA identity list stored by the UE (where a PLMN in which a new TA is located is not an equivalent (equivalent) PLMN); and the UE moves to coverage again from lack of coverage (lack of coverage). For example, the third NAS is a network selection NAS, and a function of the third NAS includes PLMN selection.

(2) In one embodiment, the third NAS sends a first indication to an AS, to request the AS to assist in PLMN selection. Further optionally, the first indication carries core network type related information, to indicate a core network that can be accessed by the UE. Further optionally, the third NAS determines the core network type related information based on any one or any combination of the following factors: user preference, user subscription information, USIM storage information, historical registration information, an NV value, a terminal device configuration, and the like. For example, the core network type related information includes an EPC and/or a 5GC. For example, the AS is an LTE AS, and further, the LTE AS includes an LTE RRC layer. Advantages of doing this are as follows: (1) The AS is prevented from reading PLMN identification information corresponding to a core network type that cannot be accessed by the UE. (2) PLMN reselection can be triggered as little as possible during a TAU.

(3) In one embodiment, the AS reads access reference information carried in a seventh message, to obtain PLMN identification information and/or corresponding core network information in the access reference information. In one embodiment, the AS obtains core network type preference indication information. In one embodiment, if the third NAS does not send the core network type related information to the AS, the AS may work in the following manner: By default, the AS obtains PLMN identification information corresponding to only one core network type (for example, the EPC or the 5GC), or by default, the AS obtains PLMN identification information corresponding to all core network types (for example, the EPC and the 5GC).

(4) In one embodiment, the AS sends a first report to the third NAS, where the first report includes any one or any combination of the following information: the PLMN identification information, the core network information, and the core network type preference indication information. It should be noted that In one embodiment, the UE may receive the access reference information for at least one of the following two purposes: the third NAS performs PLMN selection and/or core network selection; and the AS stratum performs cell selection/reselection. Therefore, when sending the access reference information to the third NAS to assist the third NAS in PLMN selection and/or core network selection, the AS stratum needs to send at least one of the following information that may be included in the access reference information to the third NAS: the PLMN identification information, the core network information, and the core network type preference indication information. If the access reference information further includes information such as cell barred information, the information may be used by the AS to subsequently perform cell selection/reselection, and does not need to be sent to the third NAS.

(5) The third NAS sends a second indication to the AS, where the second indication carries any one or any combination of the following information: a selected PLMN, RAT information corresponding to the selected PLMN, core network type information, and a list of equivalent PLMNs. The list of equivalent PLMNs includes one or more pieces of equivalent PLMN information, and the equivalent PLMN information includes any one or more of the following information: PLMN identification information, RAT information corresponding to the PLMN, and core network type information. The core network type information includes any one or any combination of the following information: selected core network type information, accessible core network type information, and information about accessible core network types arranged in a priority order. The RAT information corresponding to the selected PLMN may be any one or any combination of the following information: 4G 5G, LTE, eLTE, LTE that may be connected to the 5GC, NR, and the like. The selected core network type information is a core network type that the third NAS specifies the UE to access. In one embodiment, the information corresponds to the selected PLMN. The accessible core network type information is used to indicate one or more core network types that can be accessed by the UE. In one embodiment, the information corresponds to the selected PLMN. The information about the accessible core network types arranged in the priority order indicates that when the accessible core network type information includes a plurality of core network types, the plurality of core network types are arranged in the priority order, so as to implicitly represent a core network type that should be preferentially selected by the UE. When performing cell selection/reselection and handover, the UE considers, based on information provided by the NAS, that equivalent PLMNs are the same. In one embodiment, the third NAS sends the second indication to the AS based on any one or any combination of the following information: the user preference, the user subscription information, the USIM storage information, the historical registration information, the NV value, a default device setting, operator-specified core network type preference, the core network type preference indication information, and the like. For example, the selected core network type information is a core network type corresponding to a first NAS, or the selected core network type information is a core network type corresponding to a second NAS. For example, the accessible core network type information may be the core network type corresponding to the first NAS and/or the core network type corresponding to the second NAS.

(6) The AS performs cell selection/reselection based on any one or any combination of the following information: the selected PLMN, the RAT information corresponding to the selected PLMN, the selected core network type information, the accessible core network type information, the information about the accessible core network types arranged in the priority order, the list of equivalent PLMNs, and the core network type preference indication information. In one embodiment, the AS obtains the core network type preference indication information. In one embodiment, the AS performs cell selection/reselection including: searching for a cell that supports the selected PLMN and a selected core network type. Further optionally, that the AS searches for the cell that supports the selected PLMN and the selected core network type includes: reading a PLMN list that is in seventh message and that corresponds to the selected core network type information.

(7) In one embodiment, the AS sends a second report to the third NAS, where the second report carries a cell selection/reselection result.

(8) The AS sends a third report to a NAS module corresponding to the selected core network type information, where the third report carries any one or any combination of the following information: the cell selection/reselection result, the seventh message, a part of information (for example, NAS related information, information about a PLMN supporting the selected core network type, or cell access information corresponding to the selected core network) in the seventh message, and NAS system information (NAS system information). For example, if the selected core network type is a core network corresponding to the first NAS, the AS sends the third report to the first NAS.

(9) The NAS module corresponding to the selected core network type information sends first information to the AS. For example, if the selected core network type is a core network corresponding to the first NAS, the first NAS sends the first information to the AS.

It should be noted that if the second indication in operation (5) includes a list of accessible core network types (which may belong to a selected PLMN or an equivalent PLMN) arranged in the priority order, and in operation (6), the AS can obtain the core network type preference indication information, information to which the UE is subject needs to be specified. For example, the UE chooses to access a core network specified in the core network type preference indication information, or the UE ignores the core network type preference indication information and accesses a core network with a highest priority in the information about the accessible core network types arranged in the priority order. If the second indication in operation (5) does not include the information about the accessible core network types arranged in the priority order, and includes the accessible core network type information, and in operation (6), the AS can obtain the core network type preference indication information, in one embodiment, the UE chooses to access a core network specified in the core network type preference indication information.

In addition, it should be noted that the foregoing implementation examples include but are not limited to the following several implementations.

In a possible implementation, operation (2) to operation (4) are omitted and only other operations are performed. An advantage of this implementation is that complexity and overheads of PLMN selection are reduced, and a quantity of interactions between the NAS and the AS is reduced.

In another possible implementation, the first indication does not carry the core network type related information, in operation (3), the AS obtains all PLMN identification information (without distinguishing between core network types supported by PLMNs), and notifies the third NAS by using the first report, and the first report does not carry the core network type related information. In this case, operation (1) to operation (4) belong to an existing PLMN selection technology. In operation (5), in addition to the PLMN information, the second indication carries any one or any combination of the following information corresponding to a PLMN: the selected core network type information, the accessible core network type information, and the information about the accessible core network types arranged in the priority order. In this implementation, the NAS can also indicate a core network type when notifying the AS of a PLMN selection result.

In another possible implementation, the first indication does not carry the core network type related information. When reading a PLMN, the AS also obtains a core network type supported by the PLMN, adds the core network type to the first report, and sends the first report to the third NAS.

In addition to the PLMN information, the third NAS adds, to the second indication, any one or any combination of the following information corresponding to the PLMN: the selected core network type information, the accessible core network type information, and the information about the accessible core network types arranged in the priority order. In this implementation, the NAS can also indicate a core network type when notifying the AS of a PLMN selection result. In addition, the AS notifies the NAS of the core network type supported by the PLMN, so that the NAS performs accurate core network type selection during PLMN selection.

In another possible implementation, the first indication carries the core network type related information, for example, any one or any combination of the following information: the selected core network type information, the accessible core network type information, and the information about the accessible core network types arranged in the priority order. When reading a PLMN, the AS obtains the PLMN based on the core network type information carried in the first indication, and adds, to the first report, only a PLMN that supports a core network type included in the first indication. In addition to the PLMN information, the third NAS adds, to the second indication, any one or any combination of the following information corresponding to the PLMN: the selected core network type information, the accessible core network type information, and the information about the accessible core network types arranged in the priority order. In this implementation, the first indication carries the core network type related information, so that the AS can read and report only the PLMN that supports the core network type, thereby reducing operations of the AS and signaling overheads between the AS and the NAS.

The following provides two specific examples of Solution 1.

Example 1

For example, next-generation UE has 5G subscription information, but 5G coverage is limited. Therefore, core network type indication information may be configured as an EPC and a 5GC. In an area that is not covered by the 5GC, a third NAS determines that a selected core network type is the EPC.

(1) Enter the third NAS.

(2) The third NAS instructs an LTE RRC layer to assist in PLMN selection, and also indicates that the core network type information is the EPC and the 5GC.

(3) The LTE RRC layer reads cell system information, and obtains identification information of a PLMN that supports the EPC and identification information of a PLMN that supports the 5GC. In one embodiment, the operation specifically includes: Manner 1: Obtain a new PLMN list, and determine, based on information about a core network type supported by each PLMN carried in the new PLMN list, the core network type supported by the PLMN. Manner 2: Obtain a PLMN list in existing system information, consider a PLMN included in the PLMN list as a PLMN that supports the EPC, obtain a new PLMN list, and consider a PLMN included in the new PLMN list as a PLMN that supports the 5GC.

(4) The LTE RRC reports available PLMN (available PLMN) information to the third NAS, where the information includes PLMN information corresponding to the EPC and PLMN information corresponding to the 5GC.

(5) The third NAS notifies the LTE RRC of a selected PLMN and a corresponding selected core network type, namely, the EPC.

(6) The LTE RRC performs cell selection/reselection based on the PLMN identification information and the selected core network type. The operation in one embodiment includes: reading, from system information that is broadcast in a cell, PLMN identification information corresponding to the EPC, cell status information (for example, Cell status and cell reservations) corresponding to the EPC, and the like, and determining whether the cell can be used as a candidate cell.

(7) The LTE RRC uses an EPC NAS as an operating NAS, and the LTE RRC notifies the EPC NAS of the cell selection/reselection result, for example, transmits NAS system information (for example, NAS related content in the system information) to the EPC NAS.

Further optionally, when the next-generation UE moves to coverage of a cell provided by an eLTE eNodeB, the cell supports a selected PLMN of the UE. When the PLMN provides only a 5GC connection in the cell, the UE may access the 5GC without changing the selected PLMN of the UE, and use a NAS module corresponding to the 5GC as an operating NAS. The following specific operations may be included.

(8) After the next-generation UE camps on the cell, the next-generation UE needs to find a better cell according to a cell reselection criterion (cell reselection criterion). The UE learns, by reading system information, that a selected PLMN in a cell supports only the 5GC, and the cell meets the cell reselection criterion (cell reselection criterion). The cell is provided by the eLTE eNodeB.

(9) In operation (2), the third NAS indicates, to the LTE RRC, that available core network types are the EPC and the 5GC, the UE considers the cell as a better cell/a suitable cell, and camps on the cell. In one embodiment, the LTE RRC of the UE switches a NAS. A specific operation is that the LTE RRC suspends the NAS corresponding to the EPC and/or uses the NAS module corresponding to the 5GC as an operating NAS, and transmits NAS related system information content to the 5GC NAS.

It should be noted that a sequence of the EPC and the 5GC is not limited. For example, the next-generation UE may first select the 5GC in one cell, and then camps on another cell through cell reselection and selects the EPC.

Example 2

For example, next-generation UE does not have 5G subscription information. Therefore, core network type indication information may be configured as an EPC. In one embodiment, a third NAS does not need to indicate a selected core network type when indicating a selected PLMN, and the selected core network type is the EPC by default.

(1) The UE enters the third NAS.

(2) The third NAS instructs a LTE RRC layer to assist in PLMN selection, and in one embodiment, also indicates that the core network type is the EPC.

(3) The LTE RRC reads system information that is broadcast in a cell, and obtains identification information of a PLMN that supports the EPC in the system information. In one embodiment, the operation includes: Manner 1: Obtain a new PLMN list, and obtain, based on information about a core network type supported by each PLMN carried in the new PLMN list, a PLMN that supports the EPC. Manner 2: Obtain a PLMN list in existing system information, and consider a PLMN included in the PLMN list as a PLMN that supports the EPC. Manner 3: Obtain a PLMN list in the prior art.

(4) The LTE RRC reports available PLMN (available PLMN) information to the third NAS, where the information includes PLMN information corresponding to the EPC.

(5) The third NAS notifies the LTE RRC of the selected PLMN information. In one embodiment, the third NAS notifies the LTE RRC that a core network type corresponding to the selected PLMN information is the EPC.

(6) The LTE RRC performs cell selection/reselection based on the PLMN identification information and/or the core network type. The operation in one embodiment includes: reading, from the system information, the identification information of the PLMN that supports the EPC, cell status information (for example, cell status and cell reservations) corresponding to the EPC, and the like, and determining whether the cell can be used as a candidate cell.

(7) The LTE RRC uses an EPC NAS as an operating NAS, and the LTE RRC notifies the EPC NAS of the cell selection/reselection result, for example, transmits system information content (for example, NAS related information) to the EPC NAS.

Further optionally, when the next-generation UE moves to coverage of a cell provided by an eLTE eNodeB, the cell supports a selected PLMN of the UE. When the PLMN provides only a 5GC connection in the cell, the UE knows that the UE can access only the EPC without changing the selected PLMN of the UE. Therefore, in this case, the third NAS needs to be triggered to reselect a PLMN and a core network type. The following specific operations may be included.

(8) After the next-generation UE camps on the cell, the next-generation UE needs to find a better cell according to a cell reselection criterion (cell reselection criterion). The UE learns, by reading system information, that the selected PLMN in the cell supports only a 5GC. The cell is provided by the eLTE eNodeB. In one embodiment, the better cell may be a cell that ranks higher than a cell on which the UE currently camps and that is selected based on one or a combination of the following factors: a frequency priority, signal quality, and signal strength. It may be understood that in this case, whether a PLMN of the cell supports the selected core network type of the UE is not considered during selection of the better cell.

(9) Because in operation (2), the third NAS indicates the LTE RRC that the available core network type is the EPC, the UE performs PLMN reselection. In one embodiment, the operation includes: sending, by the LTE RRC, indication information to the third NAS, where the indication information is used to instruct the third NAS to perform PLMN selection. In one embodiment, the indication information carries any one or any combination of the following information: the originally selected PLMN, the core network type (the EPC herein) corresponding to the originally selected PLMN, identification information of all PLMNs in the better cell and/or corresponding supported core network type information, an indication indicating no suitable cell (no suitable cell), and an indication indicating no accessible core network type.

(10) Enter the third NAS. A subsequent PLMN selection procedure and a subsequent cell selection/reselection procedure are similar to those in the foregoing operations, and details are not described herein again.

FIG. 22(b) provides an information exchange procedure of Solution 2.

(1) Enter a third NAS. In one embodiment, the action of entering the third NAS may be triggered by any one or any combination of the following reasons: UE finds no suitable cell (suitable cell) when being powered on; a response "the PLMN is not allowed" is received during location registration; a response "the service is not allowed" is received during registration/attach; a response "the service is not allowed" is received during a tracking area update (tracking area update, TAU for short); a response "the service is not allowed" is received during a service request; a SIM card is inserted; the UE moves out of coverage of a selected PLMN; the UE moves out of coverage of a selected core network; the UE moves out of coverage of a selected core network corresponding to a selected PLMN; the UE moves out of coverage of a selected PLMN corresponding to a selected core network; the UE moves out of coverage of all accessible core network types corresponding to a selected PLMN; the UE moves out of a TA (tracking area) in a TA identity list stored by the UE (where a PLMN in which a new TA is located is not an equivalent (equivalent) PLMN); and the UE moves to coverage again from lack of coverage (lack of coverage). For example, the third NAS is a network selection NAS, and a function of the third NAS includes PLMN selection.

(2) In one embodiment, the third NAS sends a first indication to an AS, to request the AS to assist in PLMN selection. In one embodiment, the first indication carries core network type related information, to indicate a core network that can be accessed by the UE. In one embodiment, the third NAS determines the core network type related information based on any one or any combination of the following factors: user preference, user subscription information, USIM storage information, historical registration information, an NV value, a default terminal device configuration, and the like. For example, the core network type related information includes an EPC and/or a 5GC. For example, the AS is an LTE AS, and further, the LTE AS includes an LTE RRC layer. Advantages of doing this are as follows: (1) The AS is prevented from reading PLMN identification information corresponding to an inaccessible core network type. (2) PLMN reselection can be triggered as little as possible during a TAU.

(3) In one embodiment, the AS reads access reference information carried in a seventh message, to obtain PLMN identification information and/or corresponding core network type information in the access reference information. In one embodiment, the AS obtains core network type preference indication information. In one embodiment, if the third NAS does not send the core network type information to the AS, the AS may work in the following manner: By default, the AS obtains PLMN identification information corresponding to only one core network type (for example, the EPC or the 5GC), or by default, the AS obtains PLMN identification information corresponding to all core network types (for example, the EPC and the 5GC).

(4) In one embodiment, the AS sends a first report to the third NAS, where the first report includes any one or any combination of the following information: the PLMN identification information, the core network information, and the core network type preference indication information.

(5) The third NAS sends a second indication to the AS, where the second indication carries any one or any combination of the following information: a selected PLMN, RAT information corresponding to the selected PLMN, the core network type information, and a list of equivalent PLMNs. The list of equivalent PLMNs includes one or more pieces of equivalent PLMN information, and the equivalent PLMN information includes any one or more of the following information: PLMN identification information, RAT information corresponding to the PLMN, and core network type information. The core network type information includes any one or any combination of the following information: selected core network type information, accessible core network type information, and information about accessible core network types arranged in a priority order. The RAT information corresponding to the selected PLMN may be any one or any combination of the following information: 4G 5G, LTE, eLTE, LTE that may be connected to the 5GC, NR, and the like. The selected core network type information is a core network type that the third NAS specifies the UE to access. In one embodiment, the information corresponds to the selected PLMN. The accessible core network type information is used to indicate one or more core network types that can be accessed by the UE. In one embodiment, the information corresponds to the selected PLMN. The information about the accessible core network types arranged in the priority order indicates that when the accessible core network type information includes a plurality of core network types, the plurality of core network types are arranged in the priority order, so as to implicitly represent a core network type that should be preferentially selected by the UE. When performing cell selection/reselection and handover, the UE considers, based on information provided by the NAS, that equivalent PLMNs are the same. In one embodiment, the third NAS sends the second indication to the AS based on any one or any combination of the following information: the user preference, the user subscription information, the USIM storage information, the historical registration information, the NV value, a default device setting, operator-specified core network type preference, the core network type preference indication information, and the like. For example, the selected core network type information is a core network type corresponding to a first NAS, or the selected core network type information is a core network type corresponding to a second NAS. For example, the accessible core network type information may be the core network type corresponding to the first NAS and/or the core network type corresponding to the second NAS.

(6) The AS performs cell selection/reselection based on any one or any combination of the following information: the selected PLMN, the RAT information corresponding to the selected PLMN, the selected core network type information, the accessible core network type information, the information about the accessible core network types arranged in the priority order, and the list of equivalent PLMNs. In one embodiment, the AS performs cell selection/reselection includes: searching for a cell that supports the selected PLMN and a selected core network type. Further optionally, that the AS searches for the cell that supports the selected PLMN and the selected core network type includes: reading a PLMN list that is in seventh message and that corresponds to the selected core network type information.

(7) The AS sends a second report to the third NAS, where the second report carries a cell selection/reselection result and information about a core network type supported by the selected PLMN.

(8) The third NAS sends a third indication to the AS, where the third indication carries any one or any combination of the following information: the selected core network type information, the accessible core network type information, and the information about the accessible core network types arranged in the priority order.

(9) In one embodiment, the AS sends a third report to a NAS module corresponding to the core network type (for example, the selected core network type) information carried in the third indication, where the third report carries any one or any combination of the following information: the cell selection/reselection result, the seventh message, a part of information (for example, NAS related information, information about a PLMN supporting the selected core network type, or cell access information corresponding to the selected core network) in the seventh message, and NAS system information (NAS system information). For example, if the selected core network type is a core network corresponding to the first NAS, the AS sends the third report to the first NAS.

(10) The NAS module corresponding to the selected core network type information sends first information to the AS. For example, if the selected core network type is a core network corresponding to the first NAS, the first NAS sends the first information to the AS.

It should be noted that the core network type related information may not be carried in operation (2) to operation (6). In this case, a PLMN selection process is the same as that in the prior art. In operation (7) in a cell selection/reselection process, the AS sends, to the third NAS, the information about the core network type supported by the selected PLMN in a suitable cell, and the third NAS may select, for the selected PLMN and the suitable cell, a core network type that is to be accessed by the UE. It should be explained that it is assumed herein that a definition of the suitable cell is the same as that in the prior art, and if the definition of the suitable cell becomes different from that in the prior art because a core network selection procedure is introduced, it may be understood that the suitable cell herein is a cell that meets the definition of the suitable cell in the prior art. An advantage of the method is that a procedure for performing PLMN selection for existing idle-state UE changes little. However, a quantity of interactions between the AS and the NAS is increased. Another disadvantage of the method is that if an existing PLMN selection procedure does not change, and only core network selection is performed for a suitable cell in a cell selection process, the following case may occur: A core network type supported by a selected PLMN in the suitable cell is not a core network that can be accessed by the UE, and therefore the UE cannot be camp on the cell, or PLMN reselection is triggered. Therefore, by comparison, in a PLMN selection process, it is more proper to exchange core network related information between the AS and the NAS.

Figure 24:
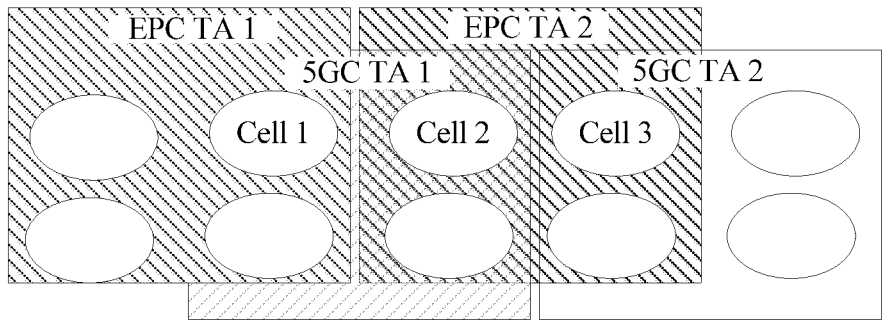
FIG. 24(a) is a schematic diagram of a scenario according to an embodiment of the present invention.
FIG. 24(b) is a schematic diagram of a scenario according to an embodiment of the present invention.
Figure 24:
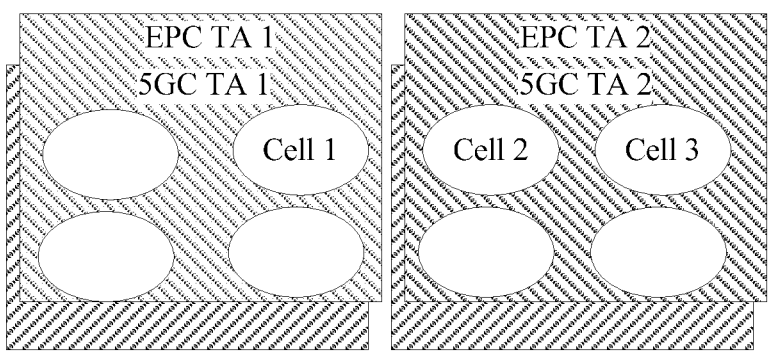

FIG. 24 is a schematic diagram of a scenario according to an embodiment of the present invention, and in one embodiment provides a scenario example of Solution 3. A scenario in FIG. 24(a) is used as an example. It is assumed that a tracking area similar to a tracking area of an EPC is deployed in a 5GC network (the tracking area of the 5GC may also be referred to as a TA, or uses a name different from the TA. In the present invention, the tracking area of the EPC is referred to as an EPC TA, and the TA of the 5GC is referred to as a 5GC TA for distinguishing). However, coverage of the EPC TA and coverage of the 5GC TA may not totally overlap. Therefore, an eLTE cell that supports both an EPC connection and a 5GC connection broadcasts two sets of tracking area codes (tracking area code, TAC for short), respectively referred to as an EPC TAC and a 5GC TAC. In the foregoing scenario, the following case may occur: For example, a cell 1, a cell 2, and a cell 3 each can provide an EPC connection and a 5GC connection. The cell 1 belongs to an EPC TA 1 and a 5GC TA 1, the cell 2 belongs to an EPC TA 2 and the 5GC TA 1, and the cell 3 belongs to the EPC TA 2 and a 5GC TA 2. It is assumed that the cell 2 is shared by a PLMN 1, a PLMN 2, and a PLMN 3, and in the cell 2, the PLMN 1 may provide an EPC connection, the PLMN 2 may provide a 5GC connection, and the PLMN 3 may provide two types of core network connections: an EPC connection and a 5GC connection. In a same TA area, PLMNs in each cell are the same, and core network connections provided by the PLMNs are also the same. Therefore, because the cell 1 and the cell 2 are in a same 5GC TA and different EPC TAs, PLMNs that provide the 5GC need to be the same, and PLMNs that provide the EPC may be different. For example, no PLMN 1 may exist in the cell 1, and if a PLMN 1 exists, the PLMN 1 cannot provide a 5GC connection; a PLMN 2 exists in the cell 1, and the PLMN 2 can provide only a 5GC connection; and a PLMN 3 exists in the cell 1, and the PLMN 3 can provide at least a 5GC connection, and can or cannot provide an EPC connection. For another example, because the cell 3 and the cell 2 are in a same EPC TA and different 5GC TAs, PLMNs that provide the EPC need to be the same, and PLMNs that provide the 5GC may be different. For example, a PLMN 1 exists in the cell 3, and the PLMN 1 can provide only an EPC connection; no PLMN 2 may exist in the cell 3, and if a PLMN 2 exists, the PLMN 2 cannot provide an EPC connection; and a PLMN 3 exists in the cell 3, and the PLMN 3 can provide at least an EPC connection, and can or cannot provide a 5GC connection. A scenario in FIG. 24(*b*) is used as an example. It is assumed that a tracking area similar to a tracking area of an EPC is deployed in a 5GC network, and the 5GC and the EPC have a same network plan, in other words, coverage of an EPC TA and coverage of a 5GC TA totally overlap. Therefore, an eLTE cell that supports both an EPC connection and a 5GC connection may broadcast two sets of tracking area codes or one set of tracking area codes that is applicable to both the EPC and the 5GC. The following still uses an example in which the eLTE cell broadcasts two sets of tracking area codes. However, in this case, the EPC TA and the 5GC TA are the same, and therefore the example may also represent a case in which only one set of tracking area codes is broadcast. It should be noted that for a core network (for example, the EPC or the 5GC), it is not limited in this patent that one cell belongs to only one TA. In actual network deployment, one cell may broadcast a plurality of TACs, and different PLMNs belong to different TACs. For UE, a process of determining whether a TAC of the cell is included in a TA list of the UE is not affected. This embodiment describes a solution only by using an example in which one cell broadcasts one TAC for one core network. A scenario in which one cell broadcasts a plurality of TACs for one core network is similar, and details are not described repeatedly. In the foregoing scenario, the following case may occur: For example, a cell 1, a cell 2, and a cell 3 each may provide an EPC connection and a 5GC connection. The cell 1 belongs to an EPC TA 1 and a 5GC TA 1, and the cell 2 and the cell 3 belong to an EPC TA 2 and a 5GC TA 2. It is assumed that the cell 2 is shared by a PLMN 1, a PLMN 2, and a PLMN 3, and in the cell 2, the PLMN 1 may provide an EPC connection, the PLMN 2 may provide a 5GC connection, and the PLMN 3 may provide two types of core network connections: an EPC connection and a 5GC connection. In a same TA area, PLMNs in each cell are the same, and core network connections provided by the PLMNs are also the same. Therefore, because the cell 1 and the cell 2 are in different 5GC TAs and different EPC TAs, PLMNs that provide the 5GC and the EPC may be different. For example, no PLMN 1 may exist in the cell 1, and if a PLMN 1 exists, the PLMN 1 can provide an EPC connection and/or a 5GC connection; no PLMN 2 may exist in the cell 1, and if a PLMN 2 exists, the PLMN 2 can provide an EPC connection and/or a 5GC connection; and no PLMN 3 may exist in the cell 1, and if a PLMN 3 exists, the PLMN 3 can provide an EPC connection and/or a 5GC connection. For another example, because the cell 3 and the cell 2 are in a same EPC TA and a same 5GC TA, PLMNs that provide the EPC need to be the same, and PLMNs that provide the 5GC also need to be the same. For example, if a PLMN 1 exists in the cell 3, and the PLMN 1 can provide only an EPC connection; a PLMN 2 exists in the cell 3, and the PLMN 2 can provide only a 5GC connection; and a PLMN 3 exists in the cell 3, and the PLMN 3 provides an EPC connection and a 5GC connection.

It may be understood that in the present invention, a quantity of PLMNs in a cell and a core network type supported by each PLMN are not limited, and the foregoing two scenarios are merely examples.

Figure 25:
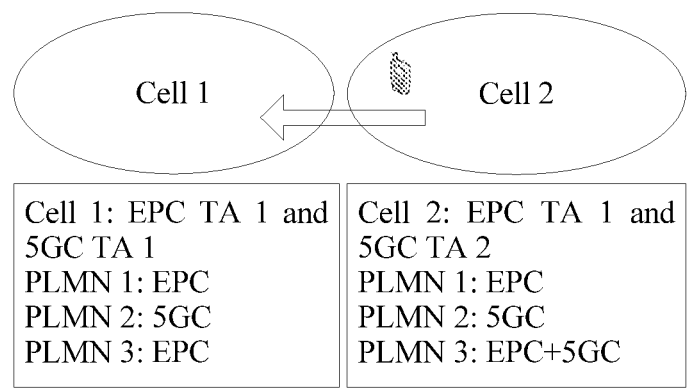
FIG. 25(a) is a schematic diagram of a scenario in which user equipment moves between cells according to an embodiment of the present invention.
FIG. 25(b) is a schematic diagram of a scenario in which user equipment moves between cells according to an embodiment of the present invention.
Figure 25:
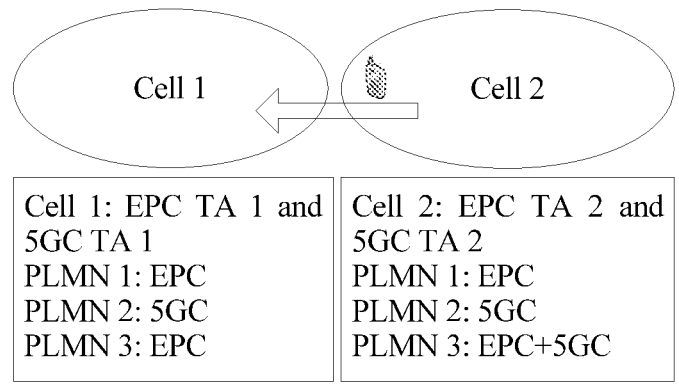

When inactive-state UE moves from one cell to another, it is possible that a TA of the new cell is not included in a TA list stored by the UE. In this case, the UE needs to perform a TAU. Corresponding to FIG. 24, FIG. 25 is a schematic diagram of a scenario in which user equipment moves between cells according to an embodiment of the present invention. In one embodiment, FIG. 25 is a diagram of a scenario in which the UE moves from a cell 2 to a cell 1. In FIG. 25(*a*), the cell 2 belongs to an EPC TA 1 and a 5GC TA 2. Three PLMNs exist in the cell 2. A PLMN 1 provides only an EPC connection, a PLMN 2 provides only a 5GC connection, and a PLMN 3 provides an EPC connection and a 5GC connection. The cell 1 belongs to the EPC TA 1 and a 5GC TA 1. In the cell 1, the PLMN 1 provides an EPC connection, the PLMN 2 provides a 5GC connection, and the PLMN 3 provides an EPC connection. In FIG. 25(*b*), the cell 2 belongs to an EPC TA 2 and a 5GC TA 2. Three PLMNs exist in the cell 2. A PLMN 1 provides only an EPC connection, a PLMN 2 provides only a 5GC connection, and a PLMN 3 provides an EPC connection and a 5GC connection. The cell 1 belongs to an EPC TA 1 and a 5GC TA 1. In the cell 1, the PLMN 1 provides an EPC connection, the PLMN 2 provides a 5GC connection, and the PLMN 3 provides an EPC connection. It is assumed that the UE is next-generation UE, and has the protocol stack architecture shown in FIG. 5(*c*). As shown in FIG. 25(*a*) and FIG. 25(*b*), when the UE is in the cell 2, the UE selects the PLMN 3 and accesses a 5GC. When moving to the cell 1, the UE finds that a 5GC TAC broadcast in the cell 1 is not in a 5G TA list of the UE. In this case, the UE needs to initiate a TAU. It is assumed that the PLMN 3 does not provide a 5GC connection in the cell 1. In this case, a behavior of the UE is unclear. For example, the UE has at least two options: 1. Perform PLMN reselection. 2. Choose, based on the PLMN 3, to perform a TAU to the EPC. This problem is a problem that is not disclosed or resolved in the prior art, and specific solutions are provided below.

(1) Next-generation UE performs PLMN selection and cell selection, to select a first PLMN, camp on a first cell, and access a first core network. It should be noted that optionally, the next-generation UE may be subsequently handed over to another cell, but does not reselect a PLMN and/or a to-be-accessed core network type. For example, PLMN selection and cell selection may be performed in the manner of Solution 1 or Solution 2. In one embodiment, an AS of the UE learns accessible core network type information corresponding to the first PLMN. For example, a third NAS notifies, by using an implicit or explicit indication, the AS of the accessible core network type information corresponding to the first PLMN.

(2) The next-generation UE enters an idle state, and performs cell reselection evaluation (cell reselection evaluation), and the next-generation UE finds that a second cell is a better cell, and attempts to camp on the second cell. It should be noted that in this operation, the next-generation UE may reselect a cell other than the second cell, but does not reselect a PLMN and/or a to-be-accessed core network type. In this operation, the next-generation UE may enter a connected state and then enter the idle state again.

(3) The next-generation UE learns, by reading PLMN identification information in system information of the second cell, that the first PLMN does not support a first core network connection, but supports only a second core network connection. In addition, the UE learns, by reading a TAC in the system information, that a TA in which the second cell is located is not in a TA list of the UE, and if the UE camps on the second cell, the UE needs to perform a TAU. Therefore, a NAS performing a TAU needs to be selected before the UE camps on the second cell.

(4) In one embodiment, the AS of the next-generation UE determines, based on the accessible core network type information corresponding to the first PLMN, whether the UE can access a second core network.

If the UE can access the second core network, an operating NAS is switched to a NAS module corresponding to the second core network. In one embodiment, the AS sends a fourth report to the NAS module, where the fourth report carries any one or any combination of the following information: a cell selection/reselection result; a seventh message; a part of information (for example, NAS related information) in the seventh message; a TA change indication; a TAU request indication; moving out of a TA in a TA (tracking area) identity list stored by the UE; moving out of the TA in the TA (tracking area) identity list stored by the UE (where a PLMN in which a new TA is located is not an equivalent (equivalent) PLMN), and NAS system information (NAS system information). In one embodiment, the AS suspends an original NAS corresponding to the first core network. In this case, it may be considered that the UE camps on the second cell. The NAS module corresponding to the second core network generates a first message and sends the first message to the AS. In one embodiment, the first message is a NAS message for making a TAU request.

If the UE cannot access the second core network, the AS sends a fifth report to the third NAS, where the fifth report includes any one or any combination of the following indication information: the UE moves out of coverage of a selected PLMN; the UE moves out of coverage of a selected core network; the UE moves out of coverage of a selected core network corresponding to a selected PLMN; the UE moves out of coverage of a selected PLMN corresponding to a selected core network; the UE moves out of coverage of all accessible core network types corresponding to a selected PLMN; the UE moves out of a TA in a TA (tracking area) identity list stored by the UE; the UE moves out of the TA in the TA (tracking area) identity list stored by the UE (where a PLMN in which a new TA is located is not an equivalent (equivalent) PLMN); and no suitable cell can be found. The third NAS reselects a PLMN and/or a core network type. In one embodiment, the AS performs cell selection/reselection according to an indication of the third NAS.

(5) Alternatively, instead of operation (4), the AS of the next-generation UE cannot directly switch, without an indication of the NAS, the operating NAS to the NAS corresponding to the second core network. In one embodiment, the AS sends a sixth report to the third NAS, where the sixth report includes any one or any combination of the following indication information: PLMN identification information of the second cell and/or a corresponding core network type; the UE moves out of coverage of a selected PLMN; the UE moves out of coverage of a selected core network; the UE moves out of coverage of a selected core network corresponding to a selected PLMN; the UE moves out of coverage of a selected PLMN corresponding to a selected core network; the UE moves out of coverage of all accessible core network types corresponding to a selected PLMN; the UE moves out of a TA in a TA (tracking area) identity list stored by the UE; the UE moves out of the TA in the TA (tracking area) identity list stored by the UE (where a PLMN in which a new TA is located is not an equivalent (equivalent) PLMN); and no suitable cell can be found. The third NAS reselects a PLMN and/or a core network type.

It should be emphasized that the following functions may be implemented by using the method described in the present invention:

(1) When UE is powered on, a NAS selects a PLMN, and sets core network type information corresponding to the selected PLMN. In one embodiment, the NAS provides a list of equivalent PLMNs for an AS. Further optionally, the list of equivalent PLMNs includes PLMN identification information and core network type information corresponding to a PLMN. In one embodiment, the core network type corresponding to the PLMN is indicated by any one or any combination of the following information: specified core network type information, accessible core network type information, and information about accessible core network types arranged in a priority order.

(2) For cell selection/reselection, the UE searches for a suitable cell based on the selected PLMN and the core network type information corresponding to the PLMN. It may be understood that a definition of the suitable cell herein is different from that in the prior art. In other words, a core network type of the suitable cell is not limited in the prior art, but the suitable cell herein is a cell that can provide a selected PLMN and a selected core network type corresponding to the selected PLMN and that meets a cell selection criterion in the prior art. In one embodiment, the UE performs, in a serving cell/camped cell through a NAS registration procedure, location registration with the core network type corresponding to the PLMN. After the registration succeeds, the selected PLMN becomes a registered PLMN (registered PLMN).

(3) If the UE moves out of coverage of the registered PLMN, an indication of an available PLMN and core network type information corresponding to the PLMN is provided to a user, so that the user can perform manual selection.

(4) In a PLMN selection process, a function of the NAS includes at least one of the following: maintaining a PLMN list in a priority order, where the list includes core network type information corresponding to a PLMN; determining, based on an available PLMN reported by the AS, core network type information corresponding to the PLMN; and maintaining a list of equivalent PLMNs, where the list includes core network type information corresponding to a PLMN. A function of the AS includes at least one of the following: searching for a PLMN based on core network type information; and reporting an available PLMN and information about a core network type supported by the PLMN to the NAS.

(5) In a cell selection process, a function of the NAS includes at least one of the following: indicating core network type information corresponding to a selected PLMN to the AS; sending NAS system information to a NAS module indicated by core network type information corresponding to the selected PLMN; and searching for the selected PLMN that supports a core network type indicated by the core network type information corresponding to the selected PLMN.

(6) The NAS maintains a list that includes accessible core network type information corresponding to a PLMN. The NAS sends the list to the AS. If a PLMN and a corresponding core network type that are provided by a cell are included in the list, the UE may camp on the cell. In one embodiment, the UE does not need to perform PLMN selection and/or core network type selection again.

S802. The UE sends, to the base station, a fourth message that carries the first information.

The fourth message is a radio resource control (RRC for short) message. For example, the fourth message may be an RRC connection request message or an RRC connection setup complete message.

In one embodiment, after generating the first information corresponding to the first network, the UE carries a first information into the fourth message and sends the fourth message to the base station.

In one embodiment, the fourth message in this embodiment of the present invention may further carry the information used to indicate the UE type. With reference to FIG. 2 or FIG. 3, the information is used to indicate that the user equipment sending the fourth message is LTE UE or next-generation UE. If the information is used to indicate that the device sending the fourth message is LTE UE, the eLTE eNB may determine, based on the information, to connect the LTE UE to the EPC network. If the information is used to indicate that the device sending the fourth message is next-generation UE, the eLTE eNB selects a to-be-accessed network for the next-generation UE by using the network selection method provided in this embodiment of the present invention.

In one embodiment, the fourth message in this embodiment of the present invention may further carry a UE identifier. The UE identifier may be used to indicate a core network type to be accessed by the UE (namely, a core network type corresponding to a NAS module generating the first information). For example, when a core network to be accessed by the UE is the EPC, the UE identifier is a temporary mobile subscriber identity (for example, an SAE-temporary mobile subscriber identity, S-TMSI for short) in LTE; or when a core network to be accessed by the UE is the 5GC, the UE identifier is a UE identifier used in a 5G system that is similar to the S-TMSI, for example, a 5G-S-TMSI. An example 5G-S-TMSI encoding mode is as follows:

```
5G-S-TMSI ::=         SEQUENCE {
    amfc              AMFC—identification
information of an AMF or identification information of an AMF group
    a-TMSI            BIT STRING
(SIZE (x))—identification information uniquely identifying the UE in the
AMF or the AMF group, with x bits
    }
```

In one embodiment, the fourth message in this embodiment of the present invention may further carry a core network functional module identifier, and the identifier may be used to indicate a core network type to be accessed by the UE (namely, a core network type corresponding to a NAS module generating the first information). For example, when a core network to be accessed by the UE is the EPC, the core network functional module identifier is registeredMME in LTE; or when a core network to be accessed by the UE is the 5GC, the core network functional module identifier is an identifier used in a 5G system that is similar to registeredMME, for example, registeredAMF, a GUAMFI (global AMF identifier), or an AMF group ID (identification information of an AMF group). For example, a registeredAMF/GUAMFI encoding mode is as follows:

```
RegisteredAMF/GUAMFI ::=      SEQUENCE {
    plmn-Identity             PLMN-Identity
OPTIONAL,
    amfgi                     BIT STRING
(SIZE (y))—identification information of an AMF group, with y bits
    amfc                      AMFC—identification
information of an AMF
    }
```

In one embodiment, the fourth message in this embodiment of the present invention may further carry core network type identification information, and the core network type identification information is used to indicate a core network type to be accessed by the UE (namely, a core network type corresponding to the first information). Significance of carrying the information is that for UE that performs initial access, the fourth message may not have the foregoing UE identifier and the foregoing core network functional module identifier. Therefore, to enable the base station to identify a core network to be accessed by the UE and therefore send the first information to a corresponding core network node, a core network type to be accessed by the UE needs to be explicitly indicated.

In one embodiment, the UE identifier/the core network functional module identifier/the core network type identification information may not be carried in a same message as the first information, but is implicitly used to indicate core network type information corresponding to the first information. For example, the first information is carried in the fourth message. Before the UE sends the fourth message to the base station, the UE sends a ninth message to the base station, where the ninth message carries any one or any combination of the following information: the UE identifier, the core network functional module identifier, and the core network type identification information. When the fourth message is an RRC connection setup complete message, the ninth message may be an RRC connection request message or another message that has all or some functions of an existing RRC connection request message.

Based on the protocol stack architecture of the next-generation UE in FIG. 5(c), a specific implementation of operations S804 and S806 to S808 in the embodiment shown in FIG. 8 may be as follows:

Operation S804. The first core network device determines whether to accept access of the UE to the first network.

In one embodiment, after receiving the first message sent by the base station, the first core network device determines whether to accept the access of the UE to the first network.

In one embodiment, a basis for determining, by the first core network device, whether to accept the access of the UE to the first network includes any one or any combination of the following information: subscription data (Subscription Data) of the UE, an area subscription restriction, an access restriction, a rejection indication of a home subscriber server (Home Subscriber Server, HSS for short), an indication of a unified data management (Unified Data Management, UDM for short) function, an authentication/security procedure failure (authentication/security procedure failure), load information of the first network, and information about the second network. For example, the information about the second network includes any one or any combination of the following information: whether there is an interface connection to a core network device in the second network; whether the base station is connected to the second network; coverage information of the second network, load information of the second network; and other information.

Operation S806. When the first core network device does not accept the access of the UE to the first network, the first core network device sends a second message to the base station.

The second message carries second information, and the second information is used to instruct to connect the UE to the second network. In one embodiment, the second information may include any one or any combination of the following information: a second network access indication, identification information of the second network, core network type information of the second network, and first cause value information. The second network access indication is used to instruct, by using explicit indication information, the UE to access the second network. For example, the identification information of the second network may be 4G or 5G and the identification information of the second network also implicitly indicates that a corresponding core network type is the EPC or the 5GC. For example, the core network type information of the second network may be the EPC or the 5GC. The first cause value information is used to indicate a reason why the access of the UE to the first network is rejected. For example, the first cause value information includes any one or any combination of the following reasons: the UE does not subscribe to the first network; the UE cannot accept a service of the first network in the TA; the first network cannot meet a service requirement of the UE in the TA; the first network is overloaded, load of the second network is lighter, and an operator prefers that the UE accesses the second network; and access of the UE is restricted. In one embodiment, the second information is a NAS message. For example, the NAS message is one of the following messages: attach reject, registration reject, location registration reject, location update reject, and tracking area update reject.

After determining to connect the UE to the second network, the first core network device sends the second message to the base station in response to the first message. The second message carries the second information used to instruct to connect the UE to the second network. In this case, after receiving the second message, the base station may perform, based on the second information, a corresponding procedure for connecting the UE to the second network.

Operation S807. The base station sends, to the UE, a fifth message that carries second information.

In one embodiment, the fifth message is an RRC message.

Operation S808. The UE generates, based on the second information, third information corresponding to a second network, and sends, to the base station, an eighth message that carries the third information. The third information is used to indicate that the UE requests to access the second network.

In one embodiment, the third information carries second cause value information. The second cause value information is used to indicate that a reason why the UE requests to access the second network is that the access of the UE to the first network is rejected. In one embodiment, the third information is a NAS message. For example, the NAS message is one of the following messages: an attach request, a registration request, a location registration request, a location update request, and a tracking area update request.

In one embodiment, the eighth message carries core network type indication information corresponding to the second network, and the core network type indication information is used by the base station to send the third information to a second core network device. For example, the core network type indication information may be any one or any combination of the following information: core network type information, a UE identifier, and a core network functional module identifier. The UE identifier and the core network functional module identifier are similar to the identifiers in the fourth message, and details are not described herein again. In one embodiment, the eighth message is an RRC message.

Figure 23:
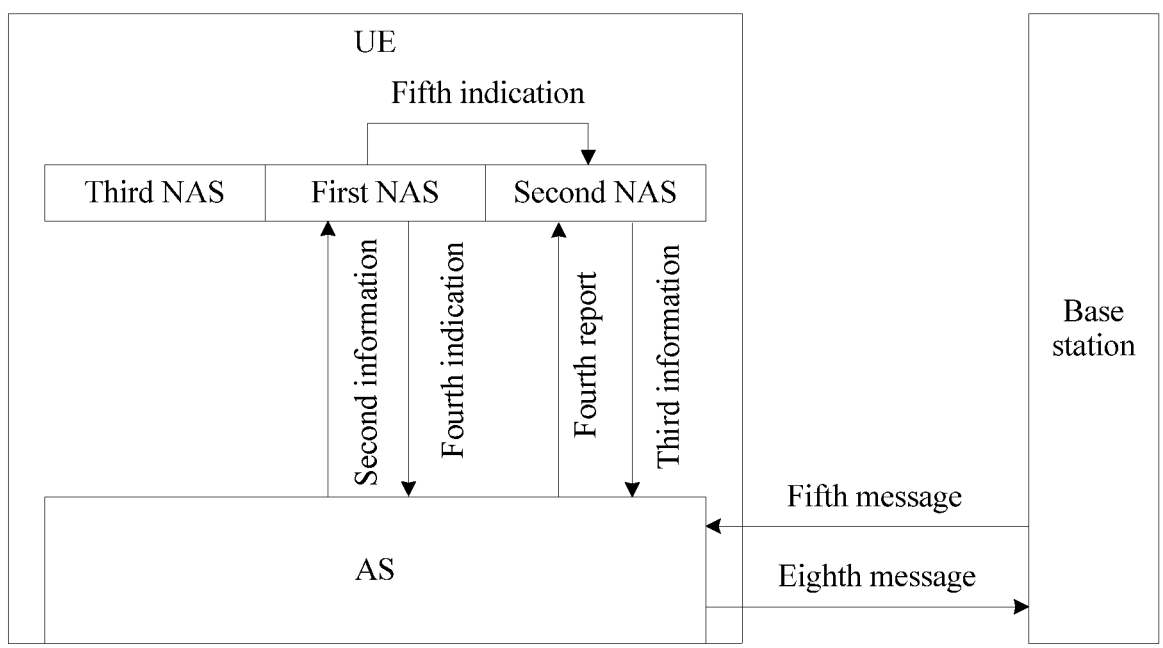
FIG. 23 is a flowchart of information exchange according to an embodiment of the present invention.

Based on the protocol stack architecture of the next-generation UE in FIG. 5(c), FIG. 23 is a flowchart of information exchange according to an embodiment of the present invention, and In one embodiment provides an example of a process in which UE sends an eighth message after receiving a fifth message.

(1) An AS of the UE receives a fifth message sent by a base station, and sends second information in the fifth message to a first NAS corresponding to a first network.

(2) The first NAS learns, by reading the second information, that the first network instructs to connect the UE to a second network. In one embodiment, the first NAS learns, by obtaining any one or any combination of the following information carried in the second information, that the first network instructs to connect the UE to the second network: a second network access indication, identification information of the second network, core network type information of the second network, and first cause value information.

(3) In one embodiment, the first NAS sends a fourth indication to the AS, to instruct the AS to switch a used NAS from the first NAS to a second NAS corresponding to the second network. In one embodiment, the fourth indication includes any one or any combination of the following information: an indication for replacing a currently used NAS, information for identifying the second NAS (for example, an identifier of the second NAS), the identification information of the second network, and the core network type information of the second network.

(4) In one embodiment, the first NAS sends a fifth indication to the second NAS corresponding to the second network, to instruct the second NAS to take over work of the first NAS. In one embodiment, the fifth indication includes any one or any combination of the following information: an activation indication, a NAS operating status, a specified PLMN, accessible core network type information, the first cause value information, a cell selection result, and NAS system information. The activation indication is used to instruct the second NAS to start to work. The NAS operating status indicates a stage at which the first NAS performs a NAS procedure, and is used by the second NAS to synchronize with the first NAS. The NAS system information is NAS system information that is sent by the AS and received by the second NAS.

(5) In one embodiment, the AS sends a fourth report to the second NAS, where the fourth report includes any one or any combination of the following information: the activation indication, the cell selection result, all information included in system information of a serving cell/camped cell, NAS system information of the serving cell/camped cell, a part of information (for example, PLMN information, supported core network type information, and a TAC) included in the system information of the serving cell/camped cell, a selected PLMN, and the accessible core network type information.

(6) The second NAS generates third information and sends the third information to the AS, where the third information is used to indicate that the UE requests to access the second network. In one embodiment, the second NAS indicates the selected PLMN and/or the core network type information to the AS.

(7) The AS generates an eighth message, where the eighth message includes the third information. In one embodiment, the eighth message further includes core network type indication information corresponding to the second network, and the core network type indication information is used by the base station to send the third information to a second core network device.

It should be noted that a sequence of operation (3) and operation (4) is not limited. For example, the first NAS may send the fifth indication to the second NAS before sending the fourth indication to the AS.

Figure 9:
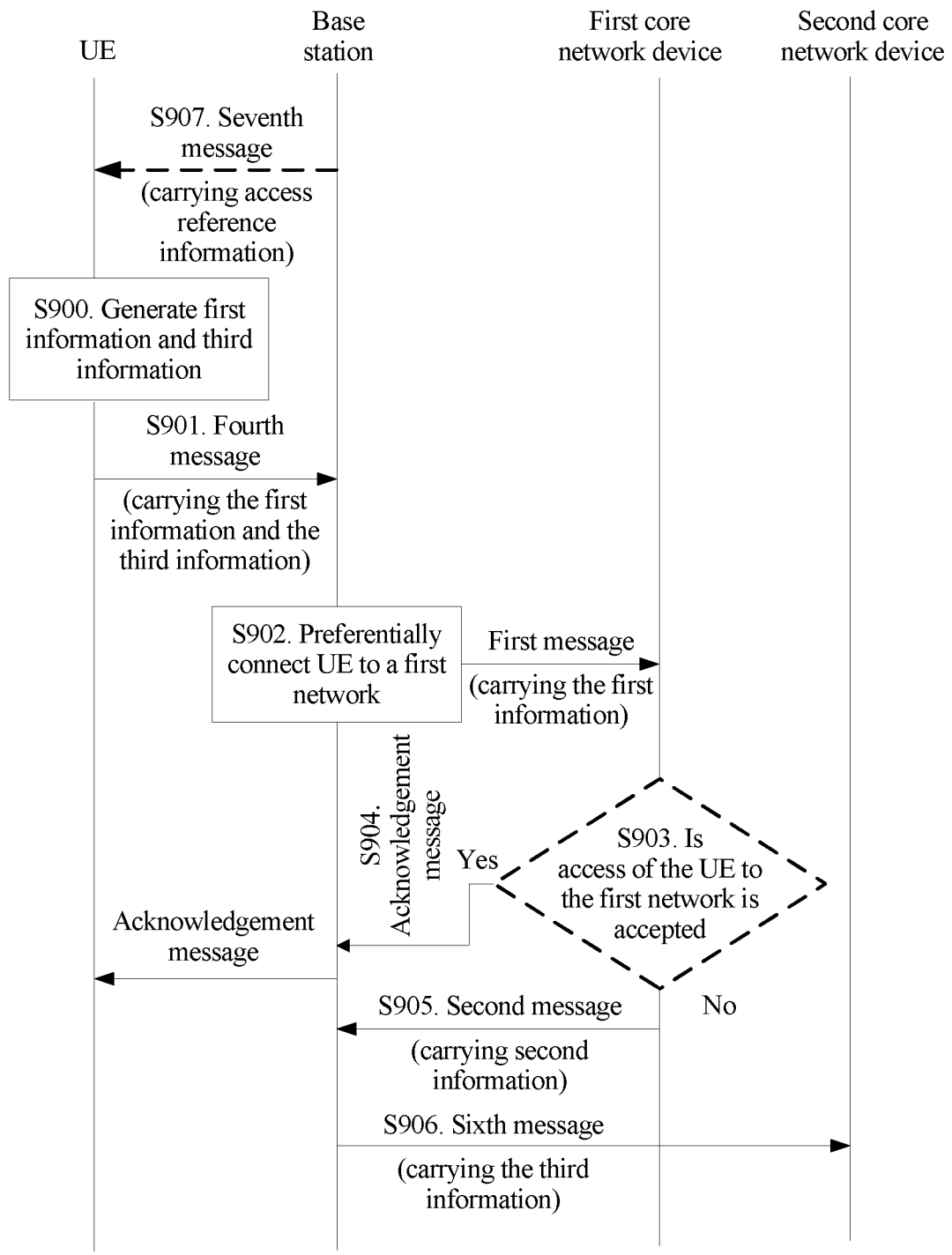
FIG. 9 is a schematic flowchart 2 of a network selection method according to an embodiment of the present invention.

FIG. 9 is a schematic flowchart of a network selection method according to another embodiment of the present invention. The method may be applied to the eLTE system shown in FIG. 2 or FIG. 3. In this embodiment, an example in which an NSF and a common CP are integrated into a same device is still used for description.

Referring to FIG. 9, the network selection method includes the following operations.

Operation S900. UE generates first information corresponding to a first network and third information corresponding to a second network.

Operation S901. The UE sends, to a base station that serves the UE, a fourth message that carries the first information and the third information.

Operation S902. The base station preferentially connects the UE to the first network, and sends, to a first core network device, a first message that carries the first information.

The first core network device belongs to the first network.

Operation S903. The first core network device determines whether to accept access of the UE to the first network.

S903 is an optional operation, and therefore is represented by a dashed line in FIG. 9.

Operation S904. When the first core network device accepts the access of the UE to the first network, the first core network device sends an acknowledgement message to the base station, so as to enter a corresponding access procedure.

Operation S905. When the first core network device does not accept the access of the UE to the first network, the first core network device sends, to the base station, a second message that carries second information.

Operation S906. The base station sends, to a second core network device based on the second information, a sixth message that carries the third information.

The second core network device belongs to the second network.

S902 to S905 in this embodiment are the same as S803 to S806 in the embodiment shown in FIG. 8, and details are not described herein again.

A difference from the embodiment shown in FIG. 8 is that the UE generates the first information and the third information in S900 in this embodiment.

For the first information in this embodiment, refer to the descriptions of the first information in the foregoing embodiment, and details are not described herein again. A structure of the third information is similar to a structure of the first information, and therefore details are not described herein again.

A method for generating the first information and the third information by the UE in this embodiment may be as follows: After being powered on, the UE generates the first information and the third information based on a preset setting; or the UE receives a seventh message that carries access reference information and that is sent by the base station, and generates the first information and the third information based on the access reference information.

In one embodiment, with reference to FIG. 5(a), if the first network is an NG core network, and the second network is an EPC network, a method for receiving, by the UE, the seventh message that carries the access reference information and that is sent by the base station, and generating the first information and the third information based on the access reference information is as follows: When being powered on, the UE automatically selects a to-be-accessed network, for example, the NG core network. Correspondingly, an eLTE NAS stratum triggers an RRC layer to obtain the seventh message. The RRC layer obtains the seventh message by using a lower-layer protocol layer of the RRC layer, and determines, based on the access reference information (for example, load of the EPC network is approximate to load of the NG core network) in the seventh message, that the UE can access both the NG core network and the EPC network. The RRC layer instructs the eLTE NAS stratum to connect the UE to the NG core network, and instructs an LTE NAS stratum to connect the UE to the EPC network. The eLTE NAS stratum generates a NAS message corresponding to the NG core network, in other words, generates the first information. The LTE NAS stratum generates a NAS message corresponding to the EPC network, in other words, generates the third information.

In one embodiment, with reference to FIG. 5(a), if the first network is an NG core network, and the second network is an EPC network, a method for receiving, by the UE, the seventh message that carries the access reference information and that is sent by the base station, and generating the first information and the third information based on the access reference information is as follows: When being powered on, the UE automatically selects a to-be-accessed network, for example, the NG core network. Correspondingly, an eLTE NAS stratum triggers an RRC layer to obtain the seventh message. The RRC layer obtains the seventh message by using a lower-layer protocol layer of the RRC layer. The RRC layer transmits the access reference information (for example, load of the EPC network is approximate to load of the NG core network) in the seventh message upward to the eLTE NAS stratum. The eLTE NAS stratum determines, based on the access reference information, that the UE can access both the NG core network and the EPC network. The eLTE NAS stratum generates a NAS message corresponding to the NG core network, in other words, generates the first information. The eLTE NAS stratum instructs an LTE NAS stratum to connect the UE to the EPC network. The LTE NAS stratum generates a NAS message corresponding to the EPC network, in other words, generates the third information.

In one embodiment, with reference to FIG. 5(a), if the first network is an NG core network, and the second network is an EPC network, a method for receiving, by the UE, the seventh message that carries the access reference information and that is sent by the base station, and generating the first information and the third information based on the access reference information is as follows: When being powered on, the UE selects the NG core network and the EPC network as to-be-accessed networks. Correspondingly, both an eLTE NAS stratum and an LTE NAS stratum trigger an RRC layer to obtain the seventh message. The RRC layer obtains the seventh message by using a lower-layer protocol layer of the RRC layer, and determines, based on the access reference information (for example, load of the EPC network is approximate to load of the NG core network) in the seventh message, that the UE can access both the NG core network and the EPC network. The RRC layer instructs the eLTE NAS stratum to connect the UE to the NG core network, and instructs the LTE NAS stratum to connect the UE to the EPC network. The eLTE NAS stratum generates a NAS message corresponding to the NG core network, in other words, generates the first information. The LTE NAS stratum generates a NAS message corresponding to the EPC network, in other words, generates the third information.

After generating the first information and the third information, the UE sends the fourth message to the base station that serves the UE, in other words, performs S901. A difference from the fourth message in the foregoing embodiment is that the fourth message in this embodiment further carries the third information, in other words, the UE in this embodiment of the present invention no longer independently selects a to-be-accessed network.

Correspondingly, after receiving the fourth message, the base station in this embodiment selects a to-be-accessed network for the UE. In this embodiment, an example in which the base station preferentially connects the UE to the first network is used for description.

In one embodiment, the base station in this embodiment obtains load information of the first network and load information of the second network, and determines, based on the load information of the first network and the load information of the second network that are obtained by the base station, to preferentially connect the UE to the first network.

In one embodiment, after receiving the fourth message, the base station in this embodiment may obtain the first information and the third information. Therefore, after the first core network device performs S905, the base station does not need to further communicate with the UE, and may directly send, to the second core network device by using the third information obtained by the base station, the sixth message that carries the third information, in other words, perform S906.

The sixth message in this embodiment is similar to the first message in the foregoing embodiment. A difference is that the first message carries the first information, and the sixth message carries the third information.

For a subsequent procedure for sending, by the base station, the sixth message to the second core network device in this embodiment, refer to a procedure for accessing a network by UE in the prior art, and details are not described herein.

In one embodiment, it can be learned from the foregoing description that, before generating the first information and the third information, the UE in this embodiment may receive the seventh message that carries the access reference information and that is sent by the base station.

In one embodiment, as shown in FIG. 9, before S900, the method further includes the following operation:

Operation S907. The base station sends, to the UE, a seventh message that carries access reference information.

Operation S907 in this embodiment is the same as S800 in the embodiment shown in FIG. 8, and details are not described herein again.

Operation S907 is an optional operation, and therefore is represented by a dashed line in FIG. 9.

Compared with the embodiment shown in FIG. 8, in this embodiment, the UE only needs to trigger one access procedure on an air interface to implement network access. Therefore, air interface resource occupancy is relatively low. In addition, the UE in this embodiment does not need to independently select a to-be-accessed network. In the network selection method provided in this embodiment, selection by the first core network device and selection by the base station are comprehensively considered, to select a to-be-accessed network for the UE.

Figure 10:
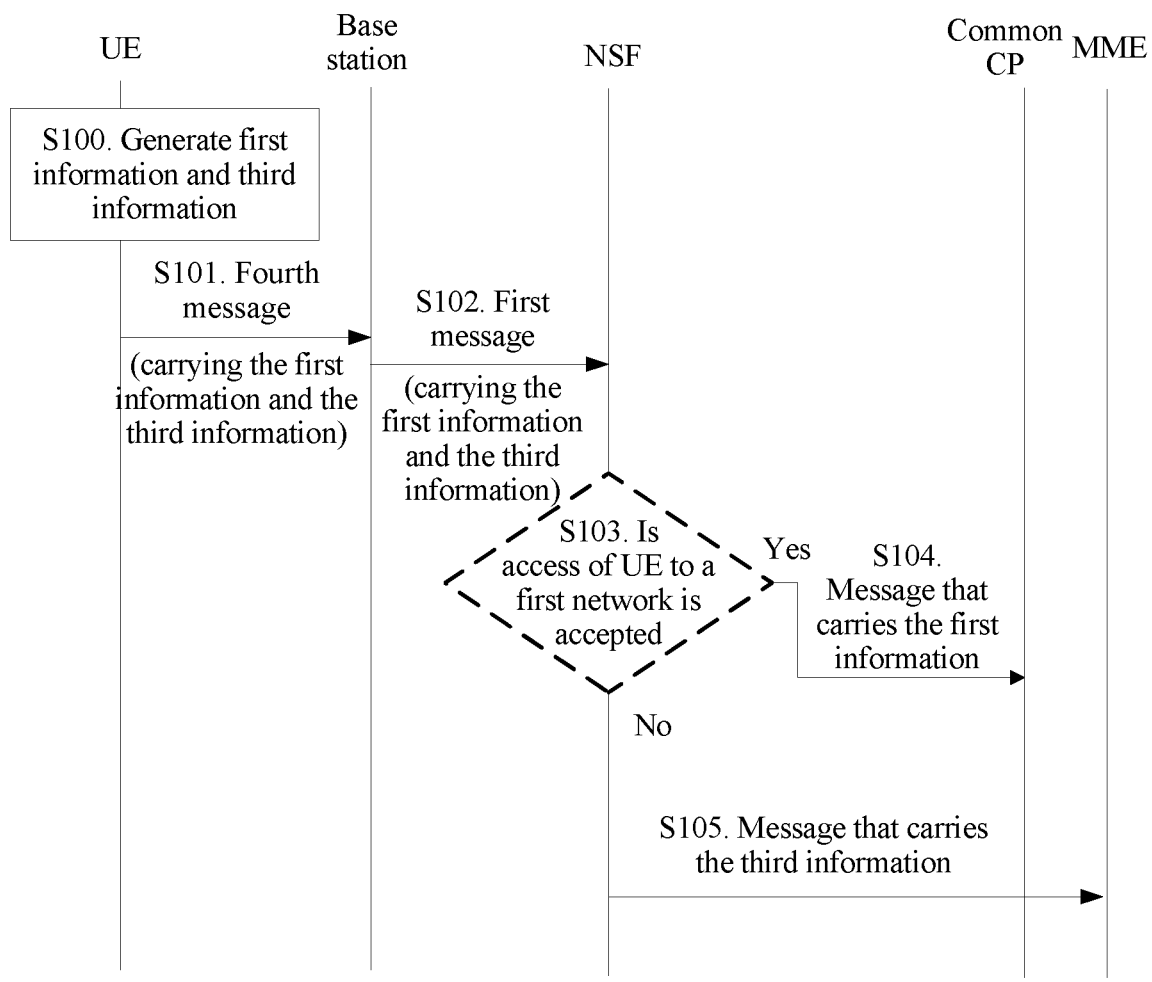
FIG. 10 is a schematic flowchart 3 of a network selection method according to an embodiment of the present invention.

It can be learned from FIG. 3 that, in a scenario in which the NSF and the common CP are independently disposed in the embodiments of the present invention, the NSF may be connected to an MME, or the NSF may not be connected to an MME. For ease of understanding, in the embodiments, an example in which the NSF and the common CP are independently disposed and the NSF is connected to the MME is used for description. In the embodiments, an example in which a first core network device is the NSF and a second core network device is the MME is used for description. FIG. 10 is a schematic flowchart of a network selection method according to an embodiment of the present invention. The method may be applied to the eLTE system shown in FIG. 2 or FIG. 3.

Referring to FIG. 10, the network selection method includes the following operations.

Operation S100. UE generates first information corresponding to a first network and third information corresponding to a second network.

Operation S101. The UE sends, to a base station that serves the UE, a fourth message that carries the first information and the third information.

Operation S102. The base station sends, to an NSF, a first message that carries the first information and the third information.

The NSF belongs to the first network.

Operation S103. The NSF determines whether to accept access of the UE to the first network.

S103 is an optional operation, and therefore is represented by a dashed line in FIG. 10.

Operation S104. When the NSF accepts the access of the UE to the first network, the NSF sends, to a common CP, a message that carries the first information, so as to enter a corresponding access procedure.

Operation S105. When the NSF does not accept the access of the UE to the first network, the NSF sends, to an MME, a message that carries the third information, so as to enter a corresponding access procedure.

S100 and S101 in this embodiment are the same as S900 and S901 in the embodiment shown in FIG. 9, and S103 is the same as S903 in the embodiment shown in FIG. 9. Therefore, details are not described herein again.

A difference from the embodiment shown in FIG. 9 is that, in this embodiment, the base station no longer independently selects a to-be-accessed network for the UE, but sends, to the NSF, the first message that carries the first information and the third information, so that the NSF selects a to-be-accessed network for the UE, in other words, performs S102.

After receiving the first message, the NSF obtains the first information and the third information from the first message. Because the NSF is separately connected to the MME and the common CP, when the NSF accepts the access of the UE to the first network, the NSF may directly send, to the common CP, the message that carries the first information, so as to enter a corresponding access procedure; or when the NSF does not accept the access of the UE to the first network, the NSF may directly send, to the MME, the message that carries the third information, so as to enter a corresponding access procedure. In other words, after S103, the NSF performs S104 or S105.

For a subsequent procedure for sending, by the NSF to the common CP, the message that carries the first information and a subsequent procedure for sending, by the NSF to the MME, the message that carries the third information, refer to a procedure for accessing a network by UE in the prior art, and details are not described herein.

Compared with the embodiment shown in FIG. 9, in this embodiment, the base station does not need to select a to-be-accessed network for the UE, and only determines a to-be-accessed network for the UE by using the NSF. Therefore, interactions between the base station and the NSF are reduced, and efficiency of accessing the network by the UE is improved.

Figure 11:
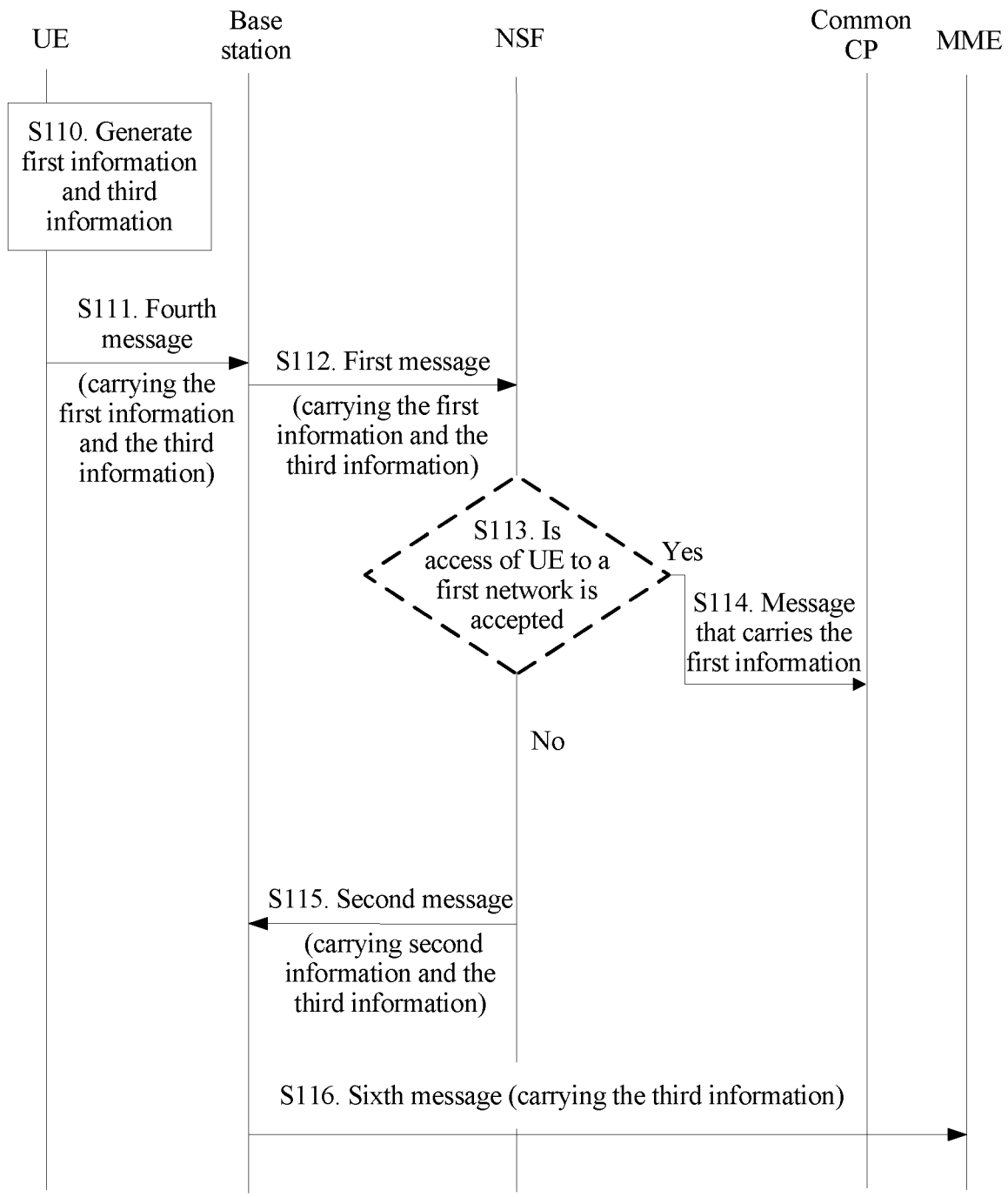
FIG. 11 is a schematic flowchart 4 of a network selection method according to an embodiment of the present invention.

For ease of understanding, in the embodiments, an example in which the NSF and the common CP are independently disposed and the NSF is not connected to the MME is used for description. In the embodiments, an example in which a first core network device is the NSF and a second core network device is the MME is used for description. FIG. 11 is a schematic flowchart of a network selection method according to an embodiment of the present invention. The method may be applied to the eLTE system shown in FIG. 2 or FIG. 3.

Referring to FIG. 11, the network selection method includes the following operations.

Operation S110. UE generates first information corresponding to a first network and third information corresponding to a second network.

Operation S111. The UE sends, to a base station that serves the UE, a fourth message that carries the first information and the third information.

Operation S112. The base station sends, to an NSF, a first message that carries the first information and the third information.

The NSF belongs to the first network.

Operation S113. The NSF determines whether to accept access of the UE to the first network.

Operation S113 is an optional operation, and therefore is represented by a dashed line in FIG. 11.

Operation S114. When the NSF accepts the access of the UE to the first network, the NSF sends, to a common CP, a message that carries the first information, so as to enter a corresponding access procedure.

Operation S115. When the NSF does not accept the access of the UE to the first network, the NSF sends, to the base station, a second message that carries second information and the third information.

The second information is used to instruct to connect the UE to the second network.

Operation S116. The base station sends, to an MME based on the second information, a sixth message that carries the third information.

The MME belongs to the second network.

S110 to S114 in this embodiment are the same as S100 to S104 in the embodiment shown in FIG. 10, and S116 is the same as S906 in the embodiment shown in FIG. 9. Therefore, details are not described herein again.

A difference from the embodiment shown in FIG. 10 is that, in S115 in this embodiment, because the NSF in this embodiment of the present invention is not connected to the MME, after the NSF determines to connect the UE to the second network, the NSF can communicate only with the base station, to instruct to connect the UE to the second network.

In addition, in S112, the base station sends both the first information and the third information to the NSF. Therefore, when the NSF does not accept the access of the UE to the first network, the NSF needs to return the third information obtained by the NSF to the base station. Therefore, the second message in this embodiment further carries the third information.

Figure 12:
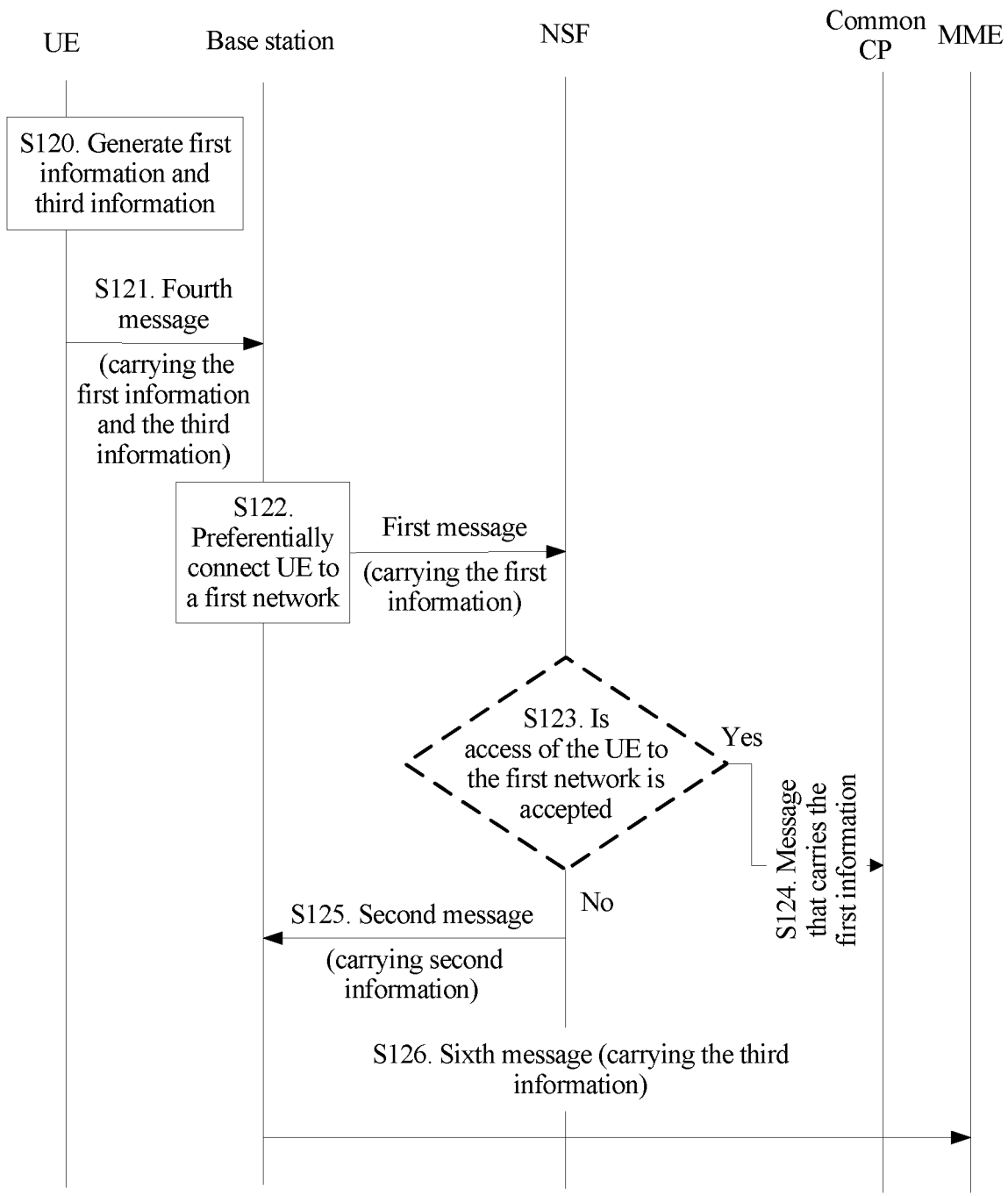
FIG. 12 is a schematic flowchart 5 of a network selection method according to an embodiment of the present invention.

As shown in FIG. 12, in a scenario in which an NSF and a common CP are independently disposed and the NSF is not connected to an MME, a network selection method provided in another embodiment of the present invention includes the following operations.

Operation S120. UE generates first information corresponding to a first network and third information corresponding to a second network.

Operation S121. The UE sends, to a base station that serves the UE, a fourth message that carries the first information and the third information.

Operation S122. The base station preferentially connects the UE to the first network, and sends, to the NSF, a first message that carries the first information.

The NSF belongs to the first network.

Operation S123. The NSF determines whether to accept access of the UE to the first network.

S123 is an optional operation, and therefore is represented by a dashed line in FIG. 12.

Operation S124. When the NSF accepts the access of the UE to the first network, the NSF sends, to the common CP, a message that carries the first information, so as to enter a corresponding access procedure.

Operation S125. When the NSF does not accept the access of the UE to the first network, the NSF sends, to the base station, a second message that carries second information.

The second information is used to instruct to connect the UE to the second network.

Operation S126. The base station sends a sixth message to the MME based on the second information.

The MME belongs to the second network, and the sixth message carries the third information.

It can be learned that this embodiment is similar to the embodiment shown in FIG. 9, and a difference lies only in that in the embodiment shown in FIG. 9, the NSF and the common CP are integrated into a same device, and in this embodiment, the NSF and the common CP are independently disposed.

In conclusion, in the network selection method provided in this embodiment of the present invention, a to-be-accessed network can be determined for the UE in a process of accessing a network by the UE.

An embodiment of the present invention provides a core network device, where the core network device is configured to perform operations performed by the first core network device or the second core network device in the foregoing network selection method. The core network device provided in this embodiment of the present invention may include a module corresponding to a corresponding operation.

In the embodiments of the present invention, the core network device may be divided into functional modules based on the foregoing method example. For example, each functional module may be obtained through division based on each corresponding function, or two or more functions may be integrated into one processing module. The integrated module may be implemented in a form of hardware, or may be implemented in a form of a software functional module. The module division in the embodiments of the present invention is an example, and is merely logical function division, and may be other division in actual implementation.

Figure 13:
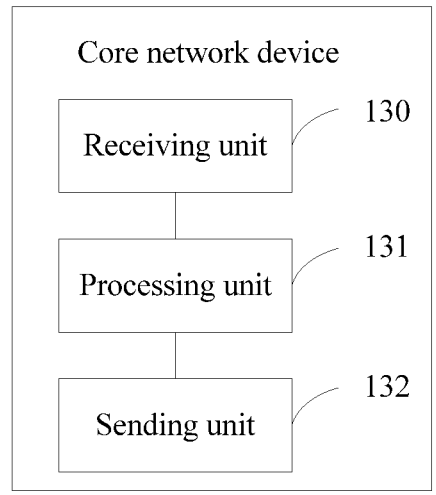
FIG. 13 is a schematic structural diagram 1 of a core network device according to an embodiment of the present invention.

When each functional module is obtained through division based on each corresponding function, FIG. 13 is a possible schematic structural diagram of the core network device in the foregoing embodiment. As shown in FIG. 13, the core network device includes a receiving unit 130, a processing unit 131, and a sending unit 132. The receiving unit 130 is configured to instruct the core network device to perform S803 in FIGS. 8, S902 and S906 in FIGS. 9, S102 and S105 in FIG. 10, S112, S114, and S116 in FIG. 11, and S122, S124, and S126 in FIG. 12. The processing unit 131 is configured to support the core network device in performing S804 and S806 in FIGS. 8, S903 and S905 in FIGS. 9, S103 and S105 in FIGS. 10, S113 and S115 in FIG. 11, and S123 and S125 in FIG. 12. The sending unit 132 is configured to support the core network device in performing S805 and S806 in FIGS. 8, S904 and S905 in FIGS. 9, S104 and S105 in FIGS. 10, S114 and S115 in FIG. 11, and S124 and S125 in FIG. 12. All related content of each operation in the foregoing method embodiment may be cited in function descriptions of a corresponding functional module, and details are not described herein. The core network device may further include a storage unit 133. The storage unit 133 is configured to store first information or third information, and may be further configured to store a software program and an application module.

Figure 14:
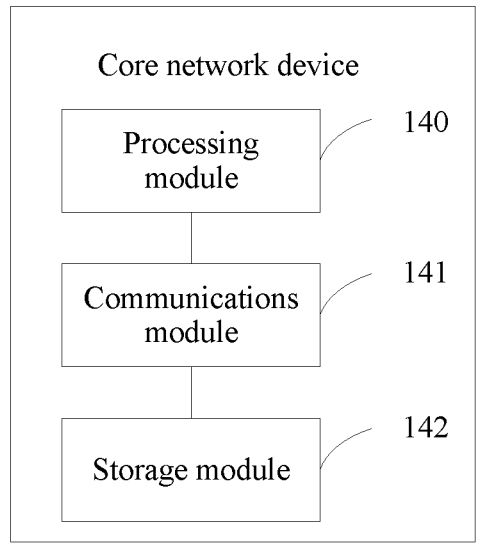
FIG. 14 is a schematic structural diagram 2 of a core network device according to an embodiment of the present invention.

When an integrated unit is used, FIG. 14 is a possible schematic structural diagram of the core network device in the foregoing embodiment. As shown in FIG. 14, the core network device includes a processing module 140 and a communications module 141. The processing module 140 is configured to control and manage actions of the core network device. For example, the processing module 140 is configured to support the core network device in performing S804 and S806 in FIGS. 8, S903 and S905 in FIGS. 9, S103 and S105 in FIGS. 10, S113 and S115 in FIGS. 11, S123 and S125 in FIG. 12, and/or another process of the technology described in this specification. The communications module 141 is configured to support the core network device in communicating with a base station. For example, the communications module 141 is configured to support the core network device in performing S803, S805, and S806 in FIG. 8, S902, S906, S904, and S905 in FIG. 9, S102, S104, and S105 in FIG. 10, S112, S114, S115, and S116 in FIG. 11, and S122, S124, S125, and S126 in FIG. 12. The core network device may further include a storage module 142. The storage module 142 is configured to store first information or third information, and may be further configured to store program code and data of the core network device.

The processing module 140 may be a processor or a controller, for example, may be a central processing unit (CPU for short) or a digital signal processor (DSP for short). The controller/processor may implement or execute various example logical blocks, modules, and circuits described with reference to content disclosed in this embodiment of the present invention. The communications module 141 may be a transceiver, a transceiver circuit, or the like. The storage module 142 may be a memory.

Figure 15:
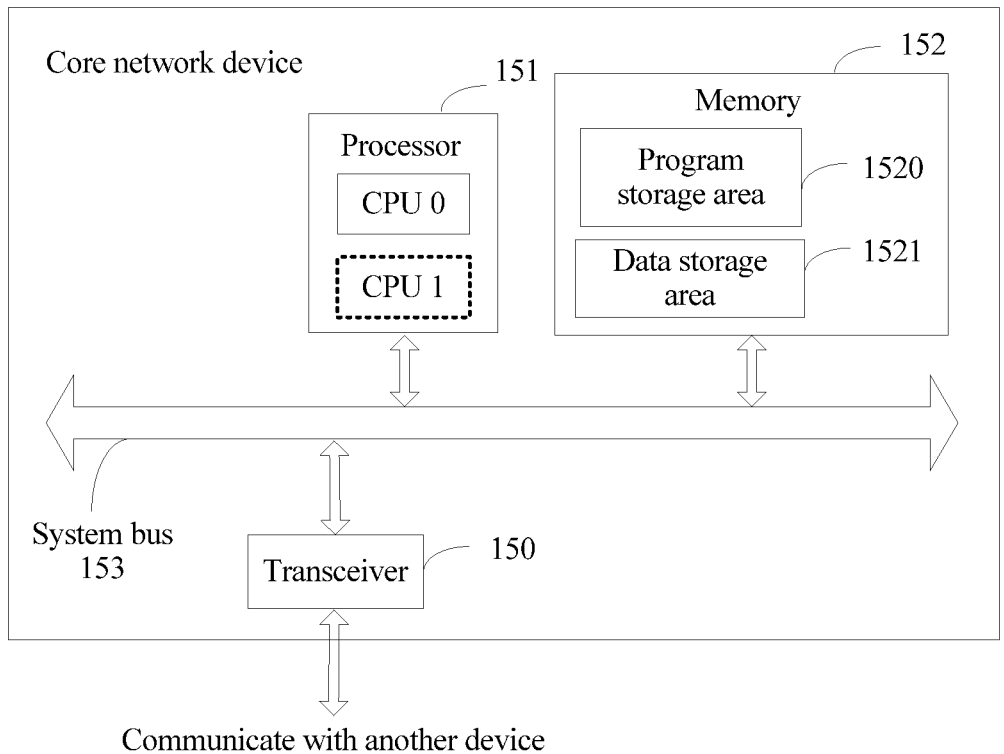
FIG. 15 is a schematic structural diagram 3 of a core network device according to an embodiment of the present invention.

When the processing module 140 is a processor, the communications module 141 is a transceiver, and the storage module 142 is a memory, the core network device in this embodiment of the present invention may be a core network device shown in FIG. 15.

As shown in FIG. 15, the core network device may include a transceiver 150, a processor 151, and a memory 152. The transceiver 150, the processor 151, and the memory 152 are connected to each other by using a system bus 153 and complete mutual communication.

When the core network device runs, the core network device performs the network selection method in the embodiment shown in any one of FIG. 8 to FIG. 12. For a specific network selection method, refer to the related descriptions in the embodiment shown in any one of FIG. 8 to FIG. 12. Details are not described herein again.

The transceiver 150 is configured to communicate with another device or a communications network, such as the Ethernet or a WLAN.

The memory 152 is configured to store first information or third information, and may be further configured to store a software program and an application module. The processor 151 executes various function applications of the core network device and data processing by running the software program and the application module that are stored in the memory 152.

The memory 152 may mainly include a program storage area 1520 and a data storage area 1521. The program storage area 1520 may store an operating system, and an application program required by at least one function, for example, sending a second message. The data storage area 1521 may store the first information and/or the third information received by the core network device.

The memory 152 may be a read-only memory (ROM for short) or another type of static storage device that can store static information and instructions, a random access memory (RAM for short) or another type of dynamic storage device that can store information and instructions, or may be an electrically erasable programmable read-only memory (EEPROM for short), a magnetic disk storage medium or another magnetic storage device, or any other medium that can be used to carry or store expected program code in a form of an instruction or a data structure and that can be accessed by the core network device, but is not limited thereto.

The memory 152 may exist independently, and is connected to the processor 151 by using the system bus 153. Alternatively, the memory 152 may be integrated with the processor 151.

The processor 151 is a control center of the core network device. The processor 151 connects various parts of the entire core network device by using various interfaces and lines, and performs various functions of the core network device and data processing by running or executing the software program and/or the application module stored in the memory 152 and by invoking data stored in the memory 152, to perform overall monitoring on the core network device.

In specific implementation, in an embodiment, the processor 151 may include one or more CPUs. For example, the processor 151 in FIG. 15 includes a CPU 0 and a CPU 1.

The system bus 153 may be classified into an address bus, a data bus, a control bus, and the like. For clear description, various buses are all marked as the system bus 153 in FIG. 15 in this embodiment of the present invention.

Correspondingly, an embodiment of the present invention further provides a computer-readable storage medium. The computer-readable storage medium includes one or more pieces of program code, and when a processor in a core network device executes the program code, the core network device performs the network selection method shown in any one of FIG. 8 to FIG. 12.

An embodiment of the present invention provides a core network device. The core network device may be a first core network device. The first core network device receives a first message that carries first information and that is sent by a radio access network device, where the first information is used to indicate that a terminal device requests to access a first network to which the first core network device belongs. When the first core network device does not accept access of the terminal device to the first network, the first core network device sends, to the radio access network device, a second message that carries second information, where the second information is used to instruct to connect the terminal device to a second network.

The first information carried in the first message in this embodiment of the present invention is used to indicate that the terminal device requests to access the first network to which the first core network device belongs, and indirectly indicates that the terminal device independently chooses to access the first network. When the first core network device does not accept the access of the terminal device to the first network, the first core network device sends the second message that carries the second information used to instruct to connect the terminal device to the second network, so that a device receiving the second message performs, based on the second information, a procedure for triggering the terminal device to access the second network, thereby completing the access of the terminal device. In other words, in the network selection method provided in this embodiment of the present invention, while the terminal device independently selects a network that is to be accessed by the terminal device, the first core network device also selects a to-be-accessed network for the terminal device. Therefore, selection on a terminal device side and selection on a network side are comprehensively considered, so that a network to be accessed by the terminal device can be accurately determined.

An embodiment of the present invention provides a radio access network device, where the radio access network device is configured to perform operations performed by the base station in the foregoing network selection method. The radio access network device provided in this embodiment of the present invention may include a module corresponding to a corresponding operation.

In the embodiments of the present invention, the radio access network device may be divided into functional modules based on the foregoing method example. For example, each functional module may be obtained through division based on each corresponding function, or two or more functions may be integrated into one processing module. The integrated module may be implemented in a form of hardware, or may be implemented in a form of a software functional module. The module division in the embodiments of the present invention is an example, and is merely logical function division, and may be other division in actual implementation.

Figure 16:
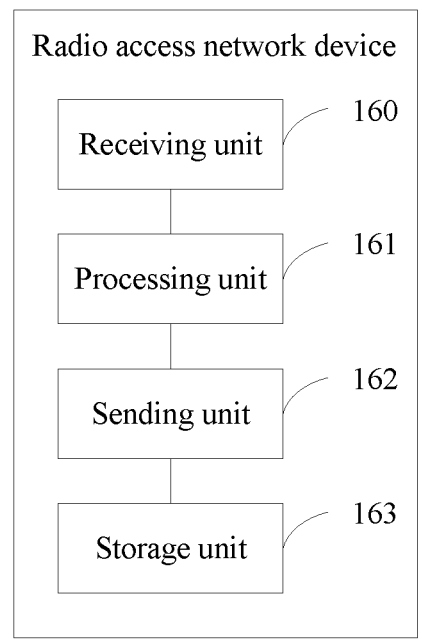
FIG. 16 is a schematic structural diagram 1 of a base station according to an embodiment of the present invention.

When each functional module is obtained through division based on each corresponding function, FIG. 16 is a possible schematic structural diagram of the radio access network device in the foregoing embodiment. As shown in FIG. 16, the radio access network device includes a receiving unit 160, a processing unit 161, and a sending unit 162. The receiving unit 160 is configured to instruct the radio access network device to perform S802, S805, S806, and S808 in FIG. 8, S901, S904, and S905 in FIG. 9, S101 in FIGS. 10, S111 and S115 in FIG. 11, and S121 and S125 in FIG. 12. The processing unit 161 is configured to support the radio access network device in performing S902 in FIG. 9 and S122 in FIG. 12. The sending unit 162 is configured to support the radio access network device in performing S800, S803, and S807 in FIGS. 8, S907 and S906 in FIG. 9, S102 in FIGS. 10, S112 and S116 in FIG. 11, and S122 and S126 in FIG. 12. All related content of each operation in the foregoing method embodiment may be cited in function descriptions of a corresponding functional module, and details are not described herein. The radio access network device may further include a storage unit 163. The storage unit 163 may be configured to store a software program and an application module.

Figure 17:
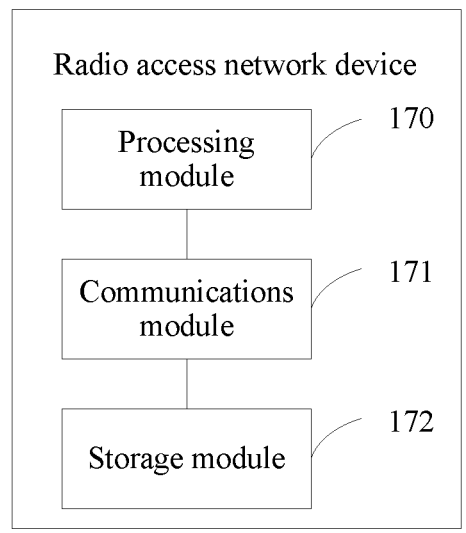
FIG. 17 is a schematic structural diagram 2 of a base station according to an embodiment of the present invention.

When an integrated unit is used, FIG. 17 is a possible schematic structural diagram of the radio access network device in the foregoing embodiment. As shown in FIG. 17, the radio access network device includes a processing module 170 and a communications module 171. The processing module 170 is configured to control and manage actions of the radio access network device. For example, the processing module 170 is configured to support the radio access network device in performing S902 in FIG. 9 and S122 in FIG. 12 and/or another process of the technology described in this specification. The communications module 171 is configured to support the radio access network device in communicating with a terminal device. For example, the communications module 171 is configured to support the radio access network device in performing S802, S805, S806, S808, S800, S803, and S807 in FIG. 8, S901, S904, S905, S906, and S907 in FIGS. 9, S101 and S102 in FIG. 10, S111, S112, S115, and S116 in FIG. 11, and S121, S122, S125, and S126 in FIG. 12. The radio access network device may further include a storage module 172, and the storage module 172 may be configured to store program code and data of the radio access network device.

The processing module 170 may be a processor or a controller, for example, may be a central processing unit (CPU for short) or a digital signal processor (DSP for short). The controller/processor may implement or execute various example logical blocks, modules, and circuits described with reference to content disclosed in this embodiment of the present invention. The communications module 171 may be a transceiver, a transceiver circuit, or the like. The storage module 172 may be a memory.

Figure 18:
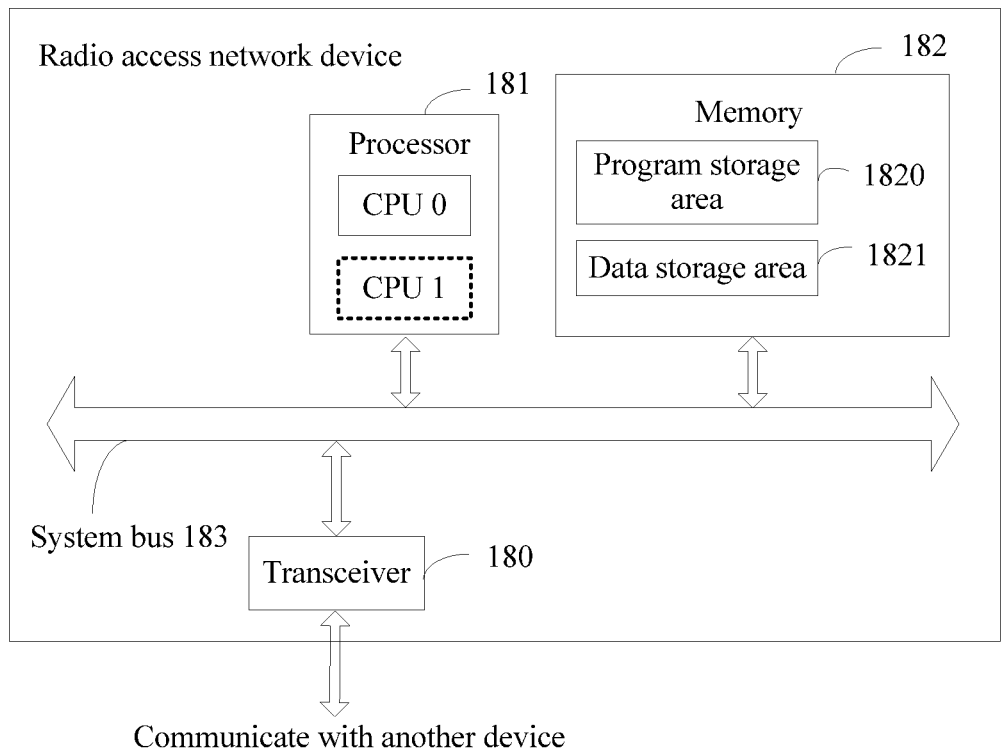
FIG. 18 is a schematic structural diagram 3 of a base station according to an embodiment of the present invention.

When the processing module 170 is a processor, the communications module 171 is a transceiver, and the storage module 172 is a memory, the radio access network device in this embodiment of the present invention may be a radio access network device shown in FIG. 18.

As shown in FIG. 18, the radio access network device includes a transceiver 180, a processor 181, and a memory 182. The transceiver 180, the processor 181, and the memory 182 are connected to each other by using a system bus 183 and complete mutual communication.

When the radio access network device runs, the radio access network device performs the network selection method in the embodiment shown in any one of FIG. 8 to FIG. 12. For a specific network selection method, refer to the related descriptions in the embodiment shown in any one of FIG. 8 to FIG. 12. Details are not described herein again.

The transceiver 180 is configured to communicate with another device or a communications network, such as the Ethernet or a WLAN.

The memory 182 is configured to store first information or third information, and may be further configured to store a software program and an application module. The processor 181 executes various function applications of the radio access network device and data processing by running the software program and the application module that are stored in the memory 182.

The memory 182 may mainly include a program storage area 1820 and a data storage area 1821. The program storage area 1820 may store an operating system, and an application program required by at least one function, for example, sending a first message. The data storage area 1821 may store the first information and/or the third information received by the radio access network device.

The memory 182 may be a ROM or another type of static storage device that can store static information and instructions, a RAM or another type of dynamic storage device that can store information and instructions, or may be an EEPROM, a magnetic disk storage medium or another magnetic storage device, or any other medium that can be used to carry or store expected program code in a form of an instruction or a data structure and that can be accessed by the radio access network device, but is not limited thereto.

The memory 182 may exist independently, and is connected to the processor 181 by using the system bus 183. Alternatively, the memory 182 may be integrated with the processor 181.

The processor 181 is a control center of the radio access network device. The processor 181 connects various parts of the entire radio access network device by using various interfaces and lines, and performs various functions of the radio access network device and data processing by running or executing the software program and/or the application module stored in the memory 182 and by invoking data stored in the memory 182, to perform overall monitoring on the radio access network device.

In specific implementation, in an embodiment, the processor 181 may include one or more CPUs. For example, the processor 181 in FIG. 18 includes a CPU 0 and a CPU 1.

The system bus 183 may be classified into an address bus, a data bus, a control bus, and the like. For clear description, various buses are all marked as the system bus 183 in FIG. 18 in this embodiment of the present invention.

Correspondingly, an embodiment of the present invention further provides a computer-readable storage medium. The computer-readable storage medium includes one or more pieces of program code, and when a processor in a radio access network device executes the program code, the radio access network device performs the network selection method shown in any one of FIG. 8 to FIG. 12.

First information carried in a first message in this embodiment of the present invention is used to indicate that user equipment requests to access a first network to which a first core network device belongs, and indirectly indicates that the user equipment independently chooses to access the first network. When the first core network device does not accept access of the terminal device to the first network, the first core network device sends a second message that carries second information used to instruct to connect the user equipment to a second network, so that a device receiving the second message performs, based on the second information, a procedure for triggering the user equipment to access the second network, thereby completing the access of the user equipment. In other words, in the network selection method provided in this embodiment of the present invention, while the user equipment independently selects a network that is to be accessed by the user equipment, the first core network device also selects a to-be-accessed network for the user equipment. Therefore, selection on a user equipment side and selection on a network side are com- prehensively considered, so that a network to be accessed by the user equipment can be accurately determined.

An embodiment of the present invention provides a terminal device, where the terminal device is configured to perform operations performed by the UE in the foregoing network selection method. The terminal device provided in this embodiment of the present invention may include a module corresponding to a corresponding operation.

The terminal device may be designed to include at least one processor, a memory, and a transceiver. The memory is configured to store an instruction, the transceiver is used by the terminal device to communicate with another device, and the instruction stored in the memory is directly or indirectly executed in the at least one processor, so that the terminal device performs any one of processing and operations on a terminal device side in the foregoing embodiment.

For the terminal device, a chip system is further designed. The chip system includes at least one processor, and the at least one processor is configured to execute an instruction, so that the terminal device performs any one of processing and operations on the terminal device side in the foregoing embodiment.

For the terminal device, a computer program product is further designed. The computer program product includes a program instruction, and when the instruction is executed, the terminal device performs any one of processing and operations on the terminal device side in the foregoing embodiment.

For the terminal device, a computer-readable storage medium is further designed. The computer-readable storage medium includes a program instruction, and when the instruction is executed, the terminal device may perform any one of processing and operations on the terminal device side in the foregoing embodiment.

In the embodiments of the present invention, the terminal device may be divided into functional modules based on the foregoing method example. For example, each functional module may be obtained through division based on each corresponding function, or two or more functions may be integrated into one processing module. The integrated module may be implemented in a form of hardware, or may be implemented in a form of a software functional module. The module division in the embodiments of the present invention is an example, and is merely logical function division, and may be other division in actual implementation.

Figure 19:
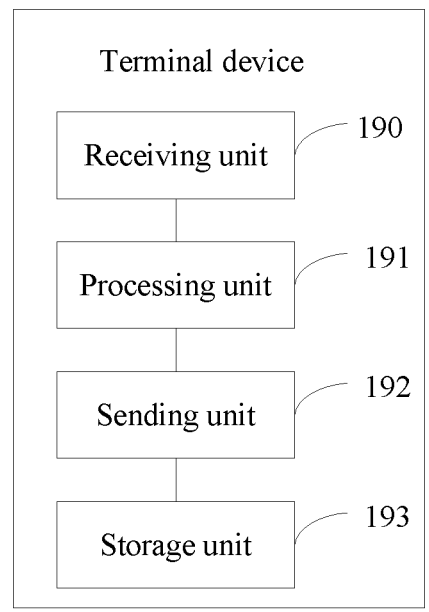
FIG. 19 is a schematic structural diagram 1 of user equipment according to an embodiment of the present invention.

When each functional module is obtained through division based on each corresponding function, FIG. 19 is a possible schematic structural diagram of the terminal device in the foregoing embodiment. As shown in FIG. 19, the terminal device includes a receiving unit 190, a processing unit 191, and a sending unit 192. The receiving unit 190 is configured to instruct the terminal device to perform S800, S805, and S807 in FIG. 8, and S904 and S907 in FIG. 9. The processing unit 191 is configured to support the terminal device in performing S801 and S808 in FIG. 8, S900 in FIG. 9, S100 in FIG. 10, S110 in FIG. 11, and S120 in FIG. 12. The sending unit 192 is configured to support the terminal device in performing S802 and S808 in FIG. 8, S901 in FIG. 9, S101 in FIG. 10, S111 in FIG. 11, and S121 in FIG. 12. All related content of each operation in the foregoing method embodiment may be cited in function descriptions of a corresponding functional module, and details are not described herein. The terminal device may further include a storage unit 193. The storage unit 193 is configured to store first information or third information, and may be further configured to store a software program and an application module.

Figure 20:
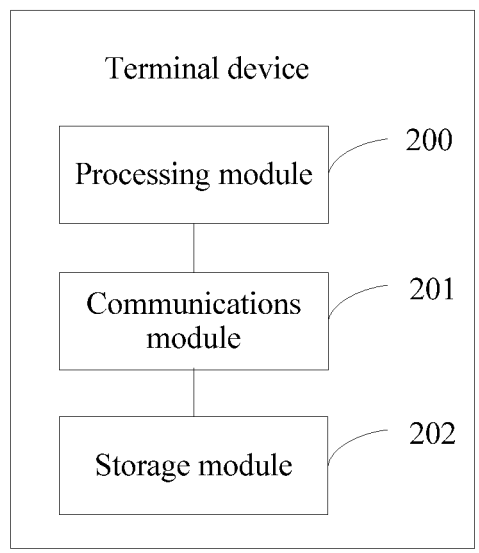
FIG. 20 is a schematic structural diagram 2 of user equipment according to an embodiment of the present invention.

When an integrated unit is used, FIG. 20 is a possible schematic structural diagram of the terminal device in the foregoing embodiment. As shown in FIG. 20, the terminal device includes a processing module 200 and a communications module 201. The processing module 200 is configured to control and manage actions of the terminal device. For example, the processing module 200 is configured to support the terminal device in performing S801 and S808 in FIG. 8, S900 in FIG. 9, S100 in FIG. 10, S110 in FIG. 11, and S120 in FIG. 12, and/or another process of the technology described in this specification. The communications module 201 is configured to support the terminal device in communicating with a base station. For example, the communications module 201 is configured to support the terminal device in performing S800, S802, S805, S807, and S808 in FIG. 8, S901, S904, and S907 in FIG. 9, S101 in FIG. 10, S111 in FIG. 11, and S121 in FIG. 12. The terminal device may further include a storage module 202. The storage module 202 is configured to store first information or third information, and may be further configured to store program code and data of the terminal device.

The processing module 200 may be a processor or a controller, for example, may be a CPU or a DSP. The controller/processor may implement or execute various example logical blocks, modules, and circuits described with reference to content disclosed in this embodiment of the present invention. The communications module 201 may be a transceiver, a transceiver circuit, or the like. The storage module 202 may be a memory.

Figure 21:
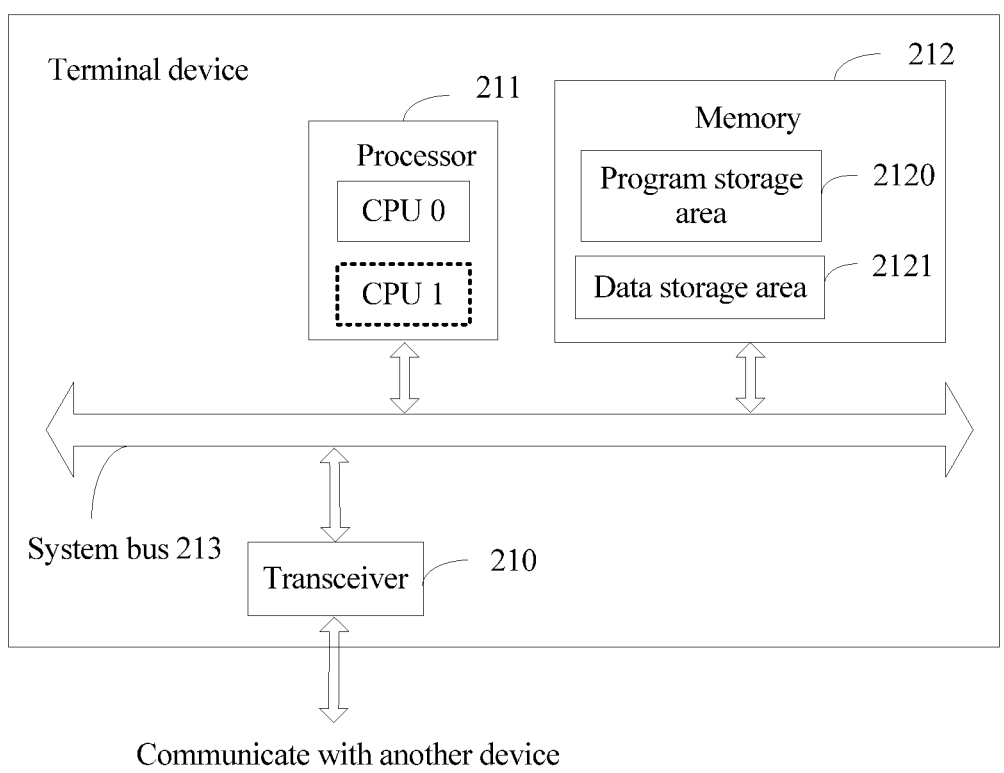
FIG. 21 is a schematic structural diagram 3 of user equipment according to an embodiment of the present invention.

When the processing module 200 is a processor, the communications module 201 is a transceiver, and the storage module 202 is a memory, the terminal device in this embodiment of the present invention may be a terminal device shown in FIG. 21.

As shown in FIG. 21, the terminal device included a transceiver 210, a processor 211, and a memory 212. The transceiver 210, the processor 211, and the memory 212 are connected to each other by using a system bus 213 and complete mutual communication.

When the terminal device runs, the terminal device performs the network selection method in the embodiment shown in any one of FIG. 8 to FIG. 12. For a specific network selection method, refer to the related descriptions in the embodiment shown in any one of FIG. 8 to FIG. 12. Details are not described herein again.

The transceiver 210 is configured to communicate with another device or a communications network, such as the Ethernet or a WLAN.

The memory 212 is configured to store first information or third information, and may be further configured to store a software program and an application module. The processor 211 executes various function applications of the terminal device and data processing by running the software program and the application module that are stored in the memory 212.

The memory 212 may mainly include a program storage area 2120 and a data storage area 2121. The program storage area 2120 may store an operating system, and an application program required by at least one function, for example, generating the first information and/or the third information. The data storage area 2121 may store the first information and/or the third information.

The memory 212 may be a ROM or another type of static storage device that can store static information and instructions, a RAM or another type of dynamic storage device that can store information and instructions, or may be an EEPROM, a magnetic disk storage medium or another magnetic storage device, or any other medium that can be used to carry or store expected program code in a form of an instruction or a data structure and that can be accessed by the terminal device, but is not limited thereto.

The memory 212 may exist independently, and is connected to the processor 211 by using the system bus 213. Alternatively, the memory 212 may be integrated with the processor 211.

The processor 211 is a control center of the terminal device. The processor 211 connects various parts of the entire terminal device by using various interfaces and lines, and performs various functions of the terminal device and data processing by running or executing the software program and/or the application module stored in the memory 212 and invoking data stored in the memory 212, to perform overall monitoring on the terminal device.

In specific implementation, in an embodiment, the processor 211 may include one or more CPUs. For example, the processor 211 in FIG. 21 includes a CPU 0 and a CPU 1.

The system bus 213 may be classified into an address bus, a data bus, a control bus, and the like. For clear description, various buses are all marked as the system bus 213 in FIG. 21 in this embodiment of the present invention.

Correspondingly, an embodiment of the present invention further provides a computer-readable storage medium. The computer-readable storage medium includes one or more pieces of program code, and when a processor in a terminal device executes the program code, the terminal device performs the network selection method shown in any one of FIG. 8 to FIG. 12.

First information carried in a first message in this embodiment of the present invention is used to indicate that the terminal device requests to access a first network to which a first core network device belongs, and indirectly indicates that the terminal device independently chooses to access the first network. When the first core network device does not accept access of the terminal device to the first network, the first core network device sends a second message that carries second information used to instruct to connect the terminal device to a second network, so that a device receiving the second message performs, based on the second information, a procedure for triggering the terminal device to access the second network, thereby completing the access of the terminal device. In other words, in the network selection method provided in this embodiment of the present invention, while the terminal device independently selects a network that is to be accessed by the terminal device, the first core network device also selects a to-be-accessed network for the terminal device. Therefore, selection on a terminal device side and selection on a network side are comprehensively considered, so that a network to be accessed by the terminal device can be accurately determined.

Method or algorithm operations described in combination with the content disclosed in the present invention may be implemented by hardware, or may be implemented by a processor by executing a software instruction. The software instruction may include a corresponding software module. The software module may be stored in a RAM, a flash memory, a ROM, an erasable programmable read only memory (EPROM for short), an EEPROM, a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented based on a requirement, in other words, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the operations of the methods described in the embodiments of the present invention. The foregoing storage medium includes any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network selection method, comprising:
    receiving, by a terminal device, a first message from a radio access network device, wherein the first message carries access reference information;
    generating, by the terminal device, a first information based on the access reference information, wherein the first information indicates that the terminal device requests to access a first network;
    sending, by the terminal device, a second message to the radio access network device, wherein the second message carries the first information;
    determining, by a first non-access stratum of the terminal device, that the terminal device requests to access the first network;
    sending, by the first non-access stratum of the terminal device, a first indication to an access stratum of the terminal device, wherein the first indication comprises any one or any combination of the following information: a selected public land mobile network (PLMN), radio access technology information corresponding to the selected PLMN, core network type information, or a list of equivalent PLMNs, and the core network type information comprises any one or any combination of the following information: selected core network type information, accessible core network type information, or information about accessible types of core networks arranged in a priority order, wherein a function of the first non-access stratum of the terminal device comprises one or more of the following functions: PLMN selection, cell selection/reselection, or core network type selection;
    obtaining, by the access stratum of the terminal device, the access reference information; and
    searching, by the access stratum of the terminal device, for a suitable cell according to the first indication, and, camping, by the terminal device, on the suitable cell.

2. The method according to claim 1, wherein a function of the access stratum of the terminal device comprises one or more of the following functions: measurement, receiving of system information, and information exchange with the first non-access stratum of the terminal device and/or another non-access stratum of the terminal device, and the access stratum of the terminal device comprises a radio resource control (RRC) protocol layer.

3. The method according to claim 2, further comprising:
    obtaining, by the access stratum of the terminal device, the access reference information; and
    sending, by the access stratum of the terminal device, all or a part of content comprised in the access reference information to the first non-access stratum of the terminal device, to assist the first non-access stratum of the terminal device in determining the first indication.

4. The method according to claim 2, further comprising:
    generating, by a second non-access stratum of the terminal device, the first information, wherein the first information indicating that the terminal device requests to access the first network, wherein
    the second non-access stratum of the terminal device is configured to transmit non-radio signaling between the terminal device and a core network device in the first network.

5. The method according to claim 1, wherein the access reference information comprises any one or any combination of the following information: cell barred information, radio access network information, base station information, core network information, core network load information, core network service support capability information, or information about a type of a slice supported by a core network.

6. The method according to claim 5, wherein
the core network information comprises any one or any combination of the following information: an evolved packet core (EPC), a 5th generation core (5GC), and an EPC and a 5GC; and
when the first message comprises a plurality of public land mobile networks (PLMNs), the access reference information comprises core network information corresponding to each of the plurality of PLMNs.

7. The method according to claim 1, wherein
the second message is a radio resource control (RRC) message, and comprises core network type information of the first network, the core network type information is used by the radio access network device to send the first information to a first core network device, and the first core network device belongs to the first network.

8. An apparatus for a terminal device, comprising:
an interface circuitry, configured to receive a first message from a radio access network device, wherein the first message carries access reference information;
a processor, configured to generate a first information based on the access reference information received by the interface circuitry, wherein the first information indicates that the terminal device requests to access a first network; and
the interface circuitry, configured to send a second message to the radio access network device, wherein the second message carries the first information,
wherein the processor is further configured to determine, for a first non-access stratum of the terminal device, that the terminal device requests to access the first network and send a first indication to an access stratum of the terminal device, wherein the first indication comprises any one or any combination of the following information: a selected public land mobile network (PLMN), radio access technology information corresponding to the selected PLMN, core network type information, or a list of equivalent PLMNs, and the core network type information comprises any one or any combination of the following information: selected core network type information, accessible core network type information, or information about accessible types of core networks arranged in a priority order, wherein a function of the first non-access stratum of the terminal device comprises one or more of the following functions: PLMN selection, cell selection/reselection, or core network type selection, and for the access stratum of the terminal device, obtain the access reference information, search for a suitable cell according to the first indication, and camp on the suitable cell.

9. The apparatus according to claim 8, wherein a function of the access stratum of the terminal device comprises one or more of the following functions: measurement, receiving of system information, and information exchange with the first non-access stratum of the terminal device and/or another non-access stratum of the terminal device, and the access stratum of the terminal device comprises a radio resource control (RRC) protocol layer.

10. The apparatus according to claim 9, wherein, the processor is further configured to, for the access stratum of the terminal device, obtain the access reference information and send all or a part of content of the access reference information to the first non-access stratum of the terminal device, to assist the first non-access stratum of the terminal device in determining the first indication.

11. The apparatus according to claim 9, further comprising:
the processor is further configured to generate, for a second non-access stratum of the terminal device, the first information, wherein the first information indicating that the terminal device requests to access the first network, wherein
the interface circuitry is further configured to, for the second non-access stratum of the terminal device, transmit non-radio signaling between the terminal device and a core network device in the first network.

12. The apparatus according to claim 8, wherein the access reference information comprises any one or any combination of the following information: cell barred information, radio access network information, base station information, core network information, core network load information, core network service support capability information, or information about a type of a slice supported by a core network.

13. The apparatus according to claim 12, wherein
the core network information comprises any one or any combination of the following information: an evolved packet core (EPC), a 5th generation core (5GC), and an EPC and a 5GC; and
when the first message comprises a plurality of public land mobile networks (PLMNs), the access reference information comprises core network information corresponding to each of the plurality of PLMNs.

14. The apparatus according to claim 8, wherein
the second message is a radio resource control (RRC) message, and comprises core network type information of the first network, the core network type information is used by the radio access network device to send the first information to a first core network device, and the first core network device belongs to the first network.

15. A non-transitory computer-readable storage medium, comprising one or more stored instructions, and the one or more stored instructions are executed by a terminal device for performing operations comprising:
receiving, by a terminal device, a first message from a radio access network device, wherein the first message carries access reference information;
generating, by the terminal device, a first information based on the access reference information, wherein the first information indicates that the terminal device requests to access a first network;
sending, by the terminal device, a second message to the radio access network device, wherein the second message carries the first information;
determining, by a first non-access stratum of the terminal device, that the terminal device requests to access the first network; and
sending, by the first non-access stratum of the terminal device, a first indication to an access stratum of the terminal device, wherein the first indication comprises any one or any combination of the following information: a selected public land mobile network (PLMN), radio access technology information corresponding to the selected PLMN, core network type information, or a list of equivalent PLMNs, and the core network type information comprises any one or any combination of the following information: selected core network type information, accessible core network type information, or information about accessible types of core networks arranged in a priority order, wherein a function of the first non-access stratum of the terminal device comprises one or more of the following functions: PLMN selection, cell selection/reselection, or core network type selection;

obtaining, by the access stratum of the terminal device, the access reference information; and searching, by the access stratum of the terminal device, for a suitable cell according to the first indication, and, camping, by the terminal device, on the suitable cell.

16. The non-transitory computer-readable storage medium according to claim 15, wherein a function of the access stratum of the terminal device comprises one or more of the following functions: measurement, receiving of system information, and information exchange with the first non-access stratum of the terminal device and/or another non-access stratum of the terminal device, and the access stratum of the terminal device comprises a radio resource control (RRC) protocol layer.

17. The non-transitory computer-readable storage medium according to claim 16, wherein when the one or more instructions are executed, the terminal device performs the operations comprising:

obtaining, by the access stratum of the terminal device, the access reference information; and sending, by the access stratum of the terminal device, all or a part of content comprised in the access reference information to the first non-access stratum of the terminal device, to assist the first non-access stratum of the terminal device in determining the first indication.

18. The non-transitory computer-readable storage medium according to claim 16, wherein when the one or more instructions are executed, the terminal device performs the operations comprising:

generating, by a second non-access stratum of the terminal device, the first information, wherein the first information indicating that the terminal device requests to access the first network, wherein the second non-access stratum of the terminal device is configured to transmit non-radio signaling between the terminal device and a core network device in the first network.

19. The non-transitory computer-readable storage medium according to claim 15, wherein the access reference information comprises any one or any combination of the following information: cell barred information, radio access network information, base station information, core network information, core network load information, core network service support capability information, or information about a type of a slice supported by a core network.

20. The non-transitory computer-readable storage medium according to claim 19, wherein the core network information comprises any one or any combination of the following information: an evolved packet core (EPC), a 5th generation core (5GC), and an EPC and a 5GC; and when the first message comprises a plurality of public land mobile networks (PLMNs), the access reference information comprises core network information corresponding to each of the plurality of PLMNs.

* * * * *